US012439181B2

(12) United States Patent
Tsujiai et al.

(10) Patent No.: US 12,439,181 B2
(45) Date of Patent: Oct. 7, 2025

(54) LIGHT DETECTION APPARATUS, LIGHT DETECTION SYSTEM, ELECTRONIC EQUIPMENT, AND MOBILE BODY

(71) Applicant: SONY SEMICONDUCTOR SOLUTIONS CORPORATION, Kanagawa (JP)

(72) Inventors: Hideki Tsujiai, Kanagawa (JP); Toshihiko Hayashi, Kanagawa (JP); Kenichi Murata, Kanagawa (JP); Akiko Hirata, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 233 days.

(21) Appl. No.: 18/256,100

(22) PCT Filed: Oct. 20, 2021

(86) PCT No.: PCT/JP2021/038761
§ 371 (c)(1),
(2) Date: Jun. 6, 2023

(87) PCT Pub. No.: WO2022/130776
PCT Pub. Date: Jun. 23, 2022

(65) Prior Publication Data
US 2024/0031703 A1 Jan. 25, 2024

(30) Foreign Application Priority Data
Dec. 16, 2020 (JP) ................... 2020-208717

(51) Int. Cl.
*H04N 25/76* (2023.01)
*H04N 25/62* (2023.01)
*H10F 39/00* (2025.01)

(52) U.S. Cl.
CPC ............. *H04N 25/76* (2023.01); *H04N 25/62* (2023.01); *H10F 39/80* (2025.01)

(58) Field of Classification Search
CPC ...... H04N 25/17; H04N 25/62; H04N 25/705; H04N 25/76; H10F 39/12; H10F 39/80; H10F 39/8053; H10F 39/8057
See application file for complete search history.

(56) References Cited

U.S. PATENT DOCUMENTS 10,141,365 B2 * 11/2018 Watanabe ............. H10F 39/024
11,233,078 B2 * 1/2022 Cho .................... H10F 39/8053
(Continued)

FOREIGN PATENT DOCUMENTS

JP    2006-295125 A    10/2006
JP    2009-111225 A    5/2009
(Continued)

OTHER PUBLICATIONS

International Search Report and Written Opinion of PCT Application No. PCT/JP2021/038761, issued on Dec. 28, 2021, 13 pages of ISRWO.

*Primary Examiner* — Amy R Hsu
(74) *Attorney, Agent, or Firm* — CHIP LAW GROUP

(57) ABSTRACT

Provided is a light detection apparatus with high functionality. The light detection apparatus includes an effective region provided with a photoelectric converter that detects irradiation light and performs photoelectric conversion, and a peripheral region provided adjacent to the effective region. The photoelectric converter has a stacked structure including a first photoelectric conversion unit, a second photoelectric conversion unit, and a first optical filter. The first photoelectric conversion unit detects light in a first wavelength range of the irradiation light and performs photoelectric conversion. The second photoelectric conversion unit is provided so as to overlap with the first photoelectric conversion unit, (Continued)

detects light in a second wavelength range of the irradiation light, and performs photoelectric conversion. The first optical filter is provided between the first photoelectric conversion unit and the second photoelectric conversion unit and through which the light in the second wavelength range transmits more easily than the light in the first wavelength range. The peripheral region is provided with a second optical filter through which the light in the second wavelength range transmits more easily than the light in the first wavelength range.

27 Claims, 54 Drawing Sheets

(56) References Cited

U.S. PATENT DOCUMENTS

| | | | | |
|---|---|---|---|---|
| 2019/0229150 | A1* | 7/2019 | Isono | H10F 39/12 |
| 2020/0286933 | A1* | 9/2020 | Tanaka | H04N 23/57 |
| 2021/0343771 | A1* | 11/2021 | Iida | H10F 39/811 |
| 2022/0246538 | A1* | 8/2022 | Miyamoto | H01L 23/552 |

FOREIGN PATENT DOCUMENTS

| | | |
|---|---|---|
| JP | 2010-123779 A | 6/2010 |
| JP | 2011-198855 A | 10/2011 |
| JP | 2011-199798 A | 10/2011 |
| JP | 2011-243945 A | 12/2011 |
| JP | 2011-244010 A | 12/2011 |
| JP | 2012-227478 A | 11/2012 |
| JP | 2013-070030 A | 4/2013 |
| JP | 2016-046508 A | 4/2016 |
| JP | 2017-038011 A | 2/2017 |
| JP | 2017-208496 A | 11/2017 |
| JP | 2018-063378 A | 4/2018 |
| JP | 2020-010062 A | 1/2020 |
| JP | 2020-150264 A | 9/2020 |
| WO | 2012/070164 A1 | 5/2012 |
| WO | 2020/195564 A1 | 10/2020 |

* cited by examiner

[FIG. 1A]
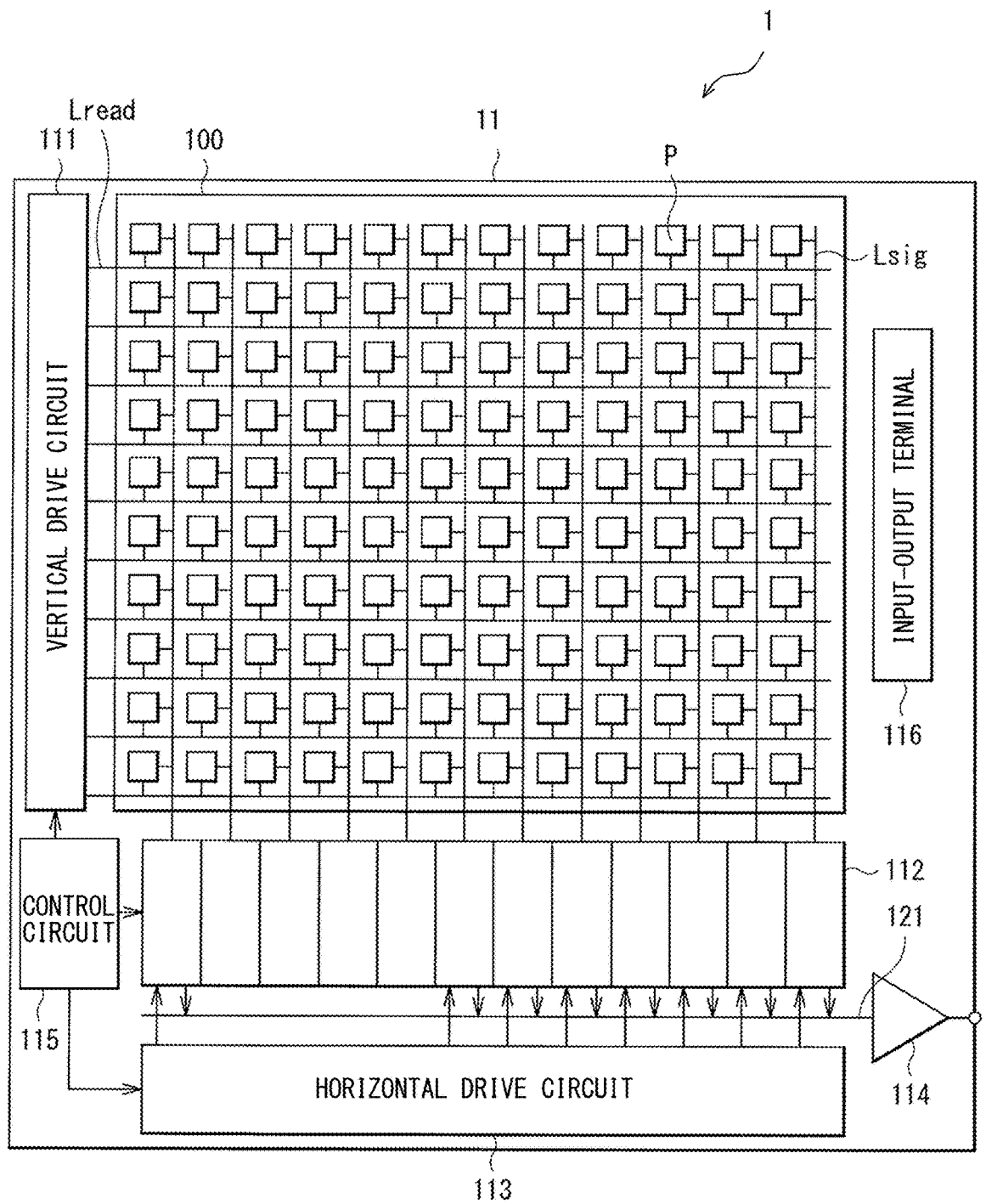

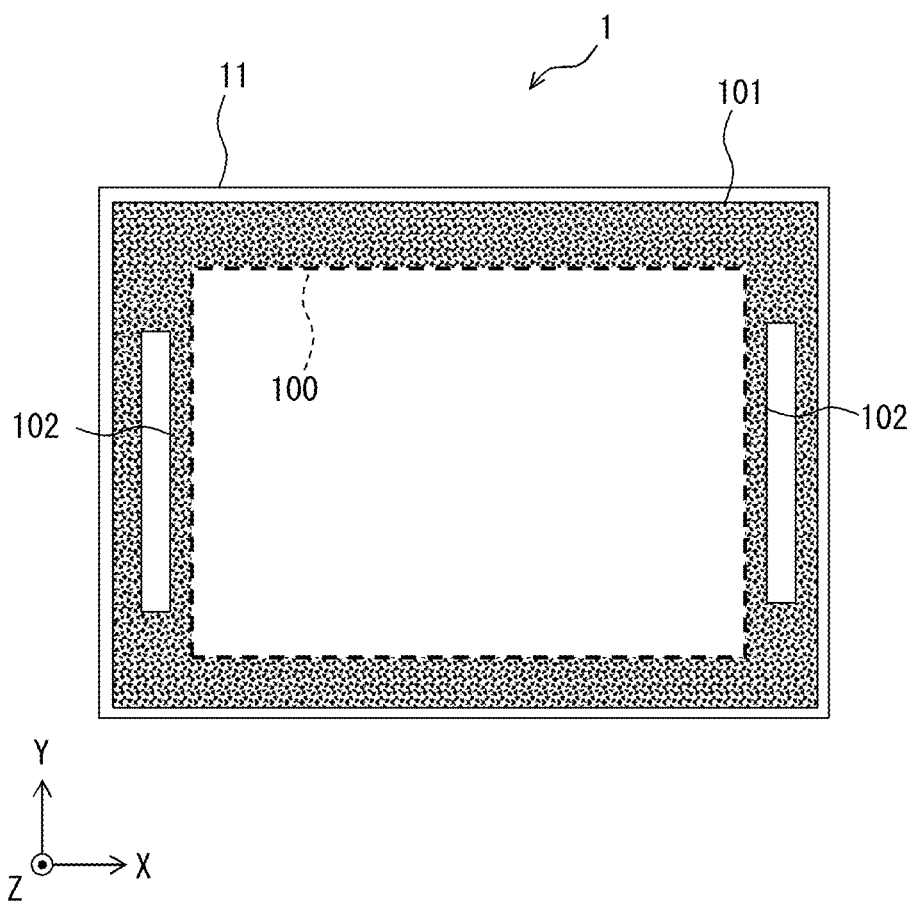

[FIG. 2A]
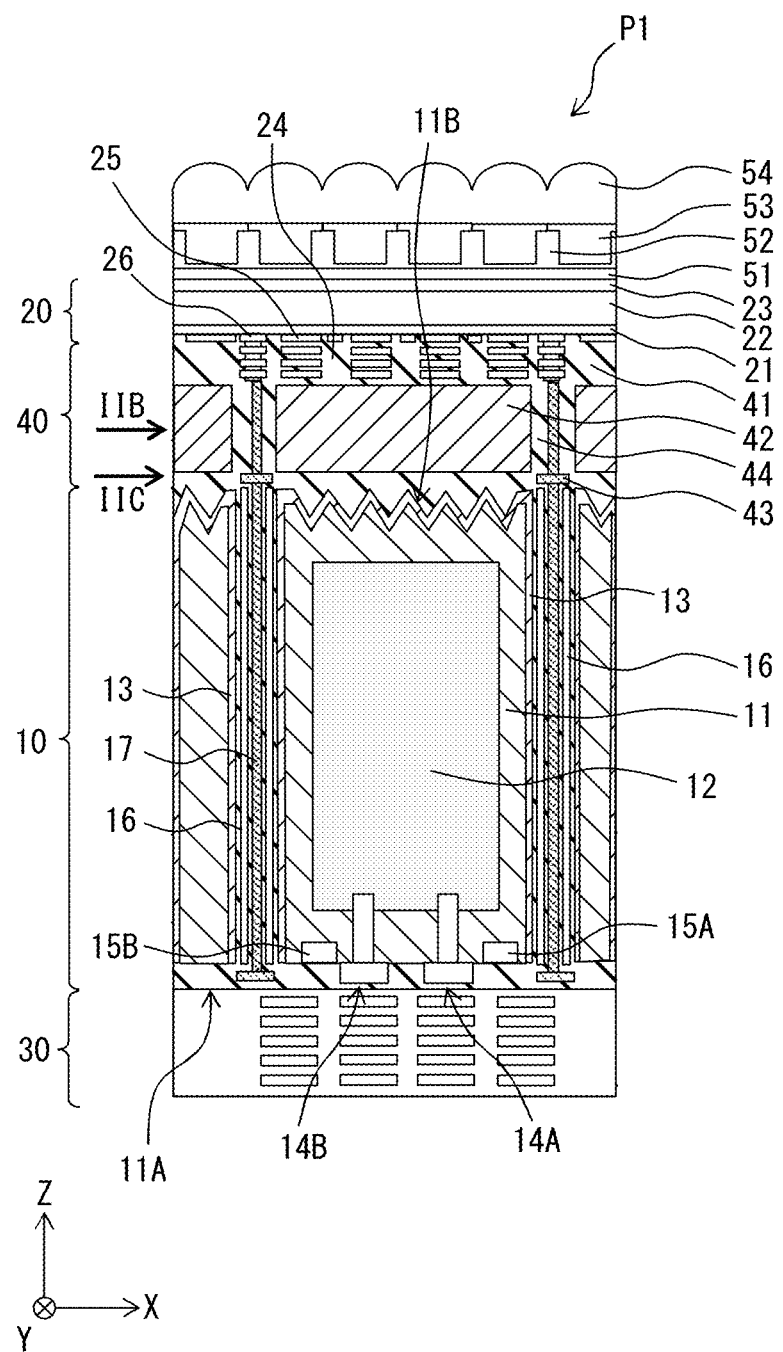

[FIG. 2B]
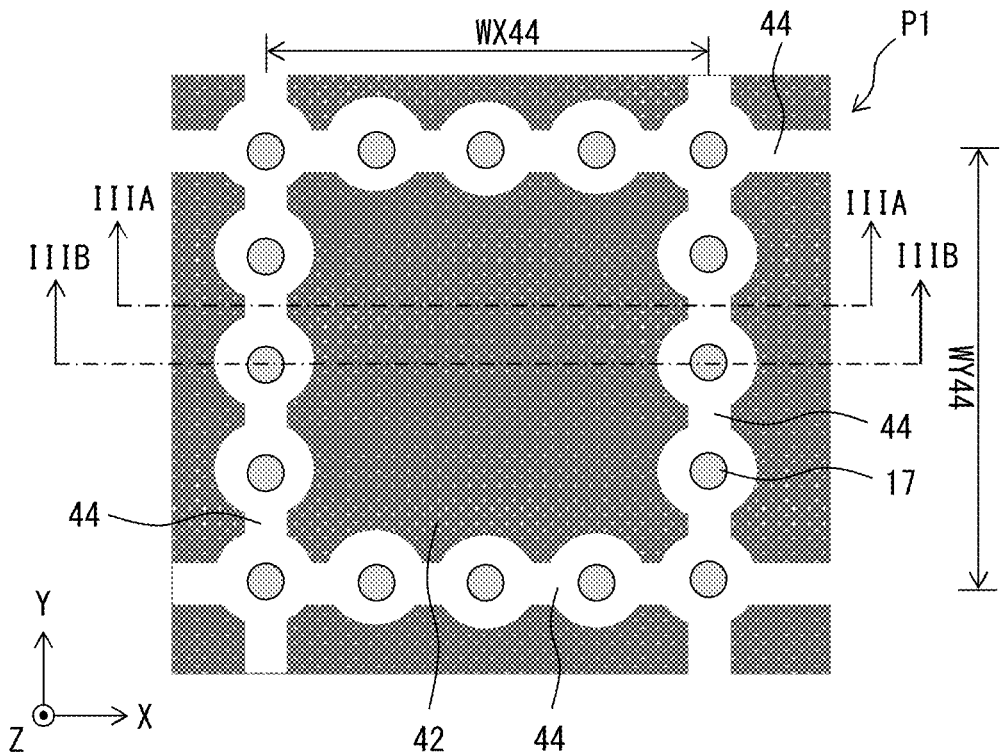
[FIG. 2C]
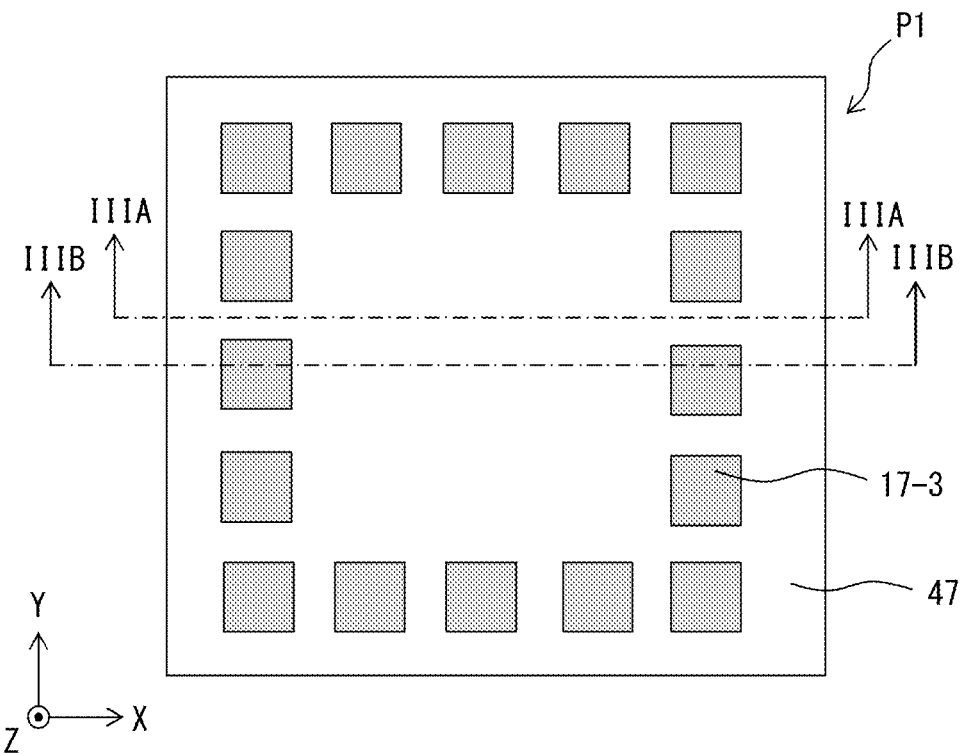

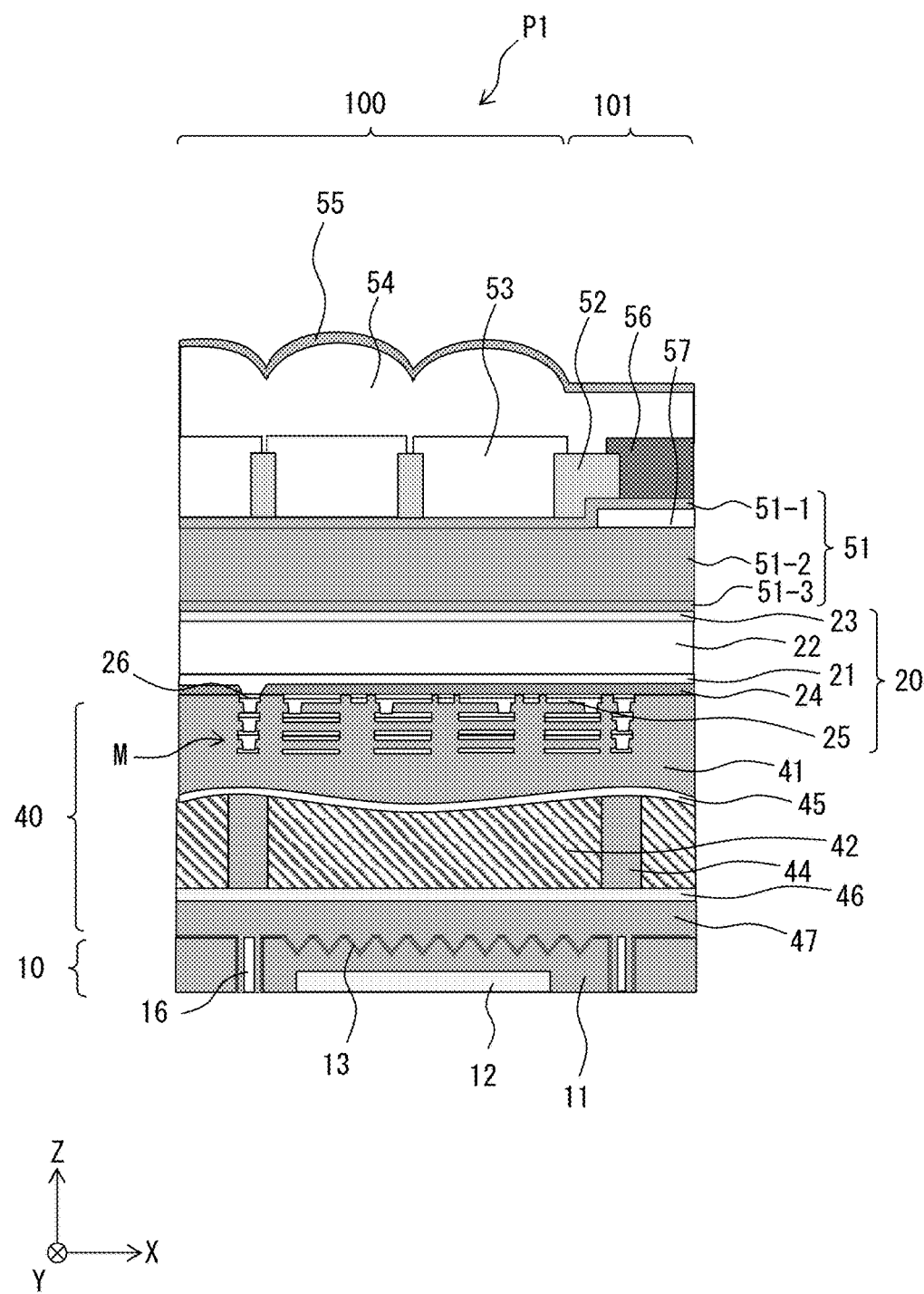
[FIG. 3A]

[FIG. 3B]
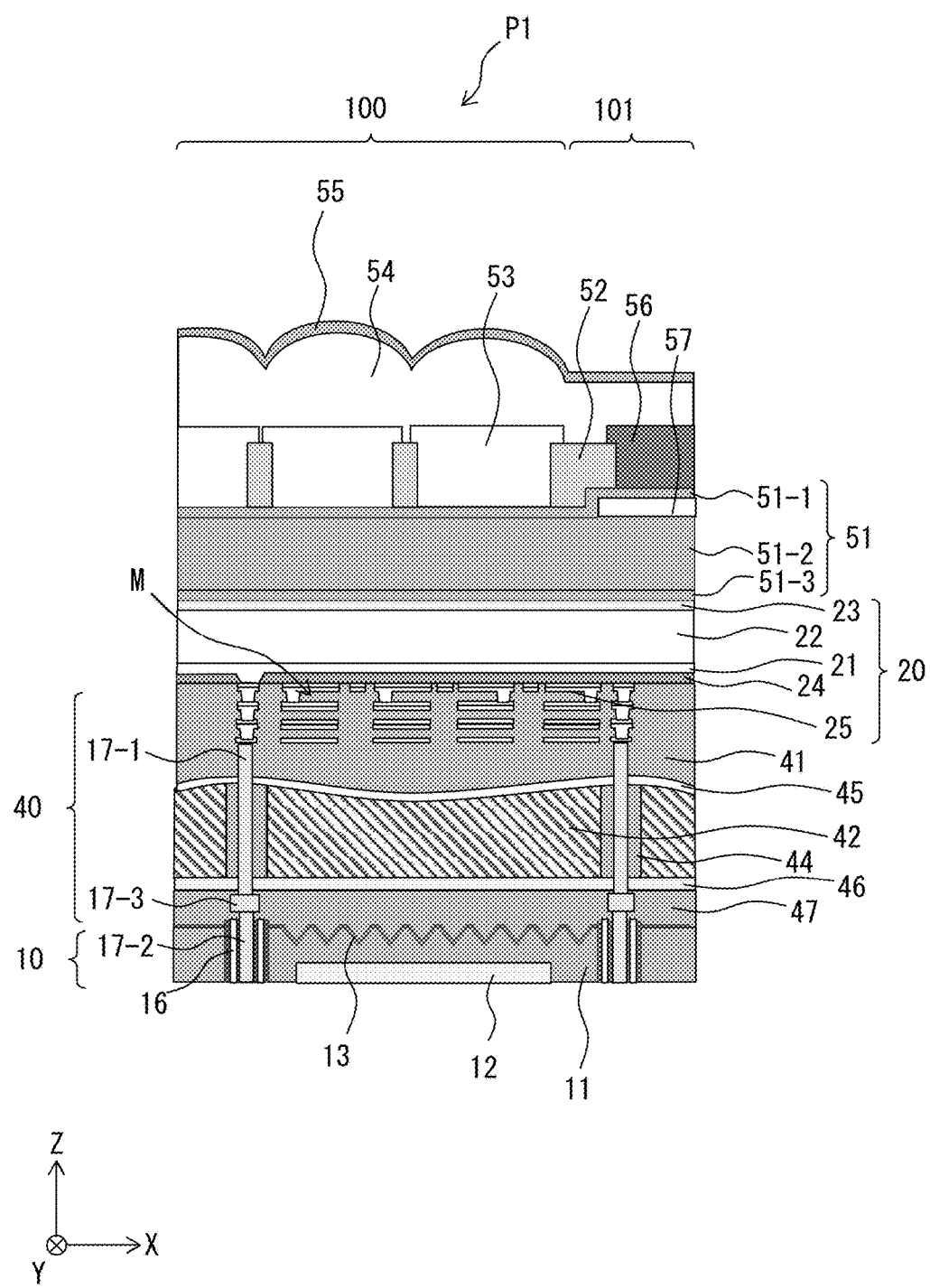

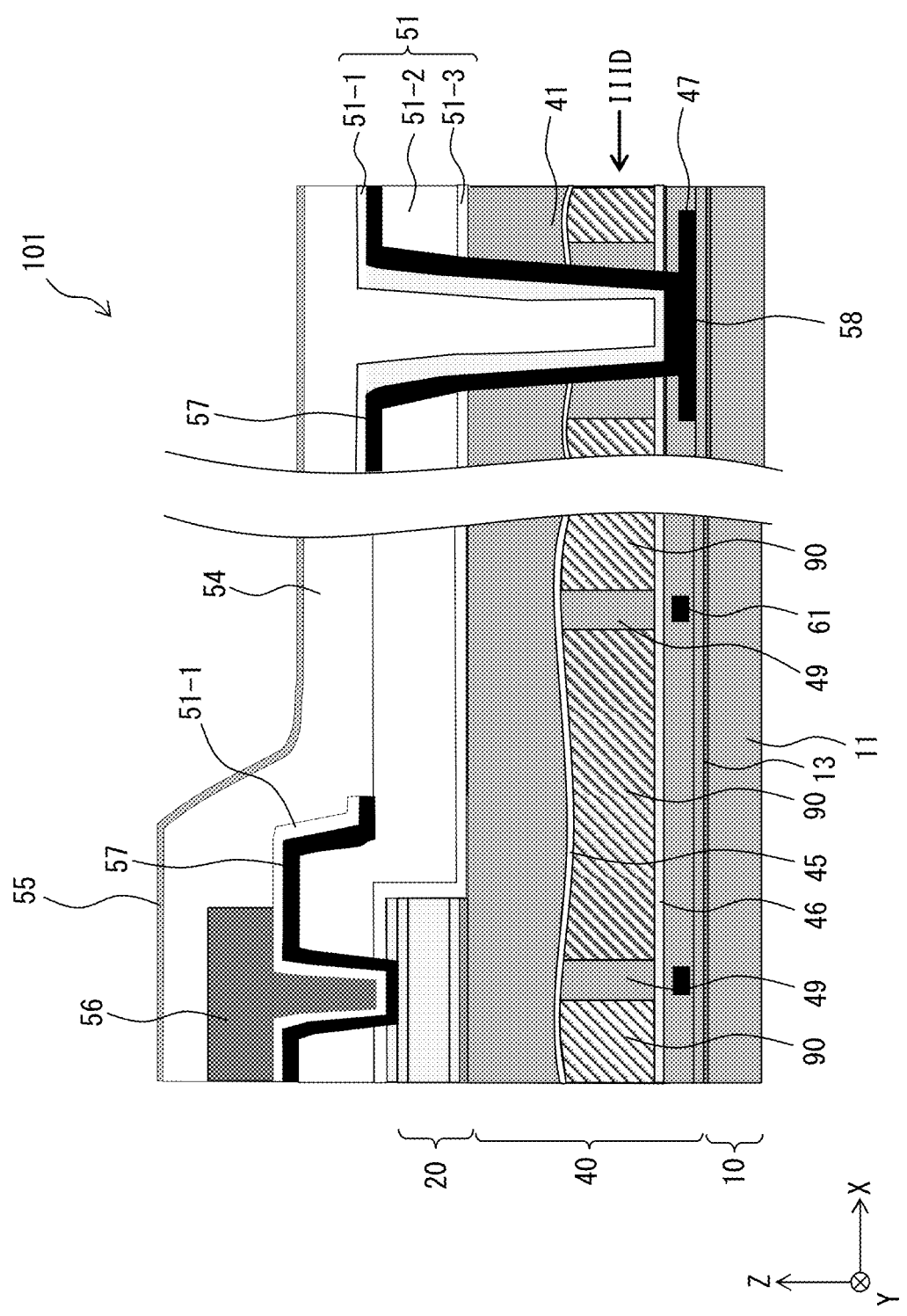
[FIG. 3C]

[FIG. 3D]
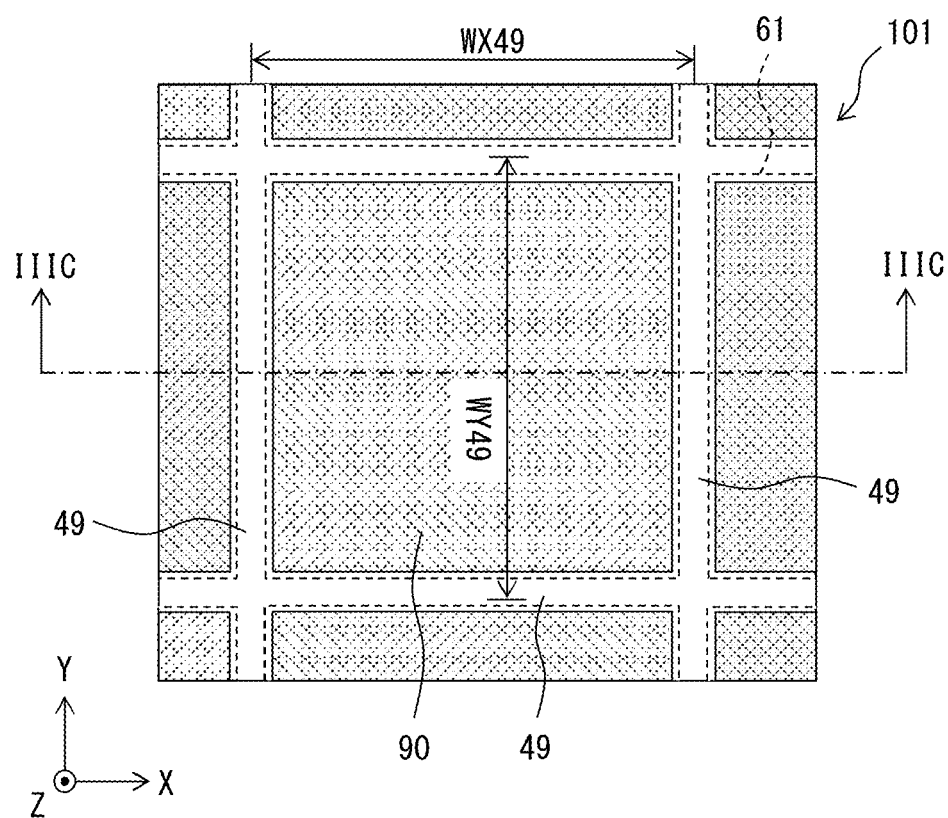

[FIG. 4A]
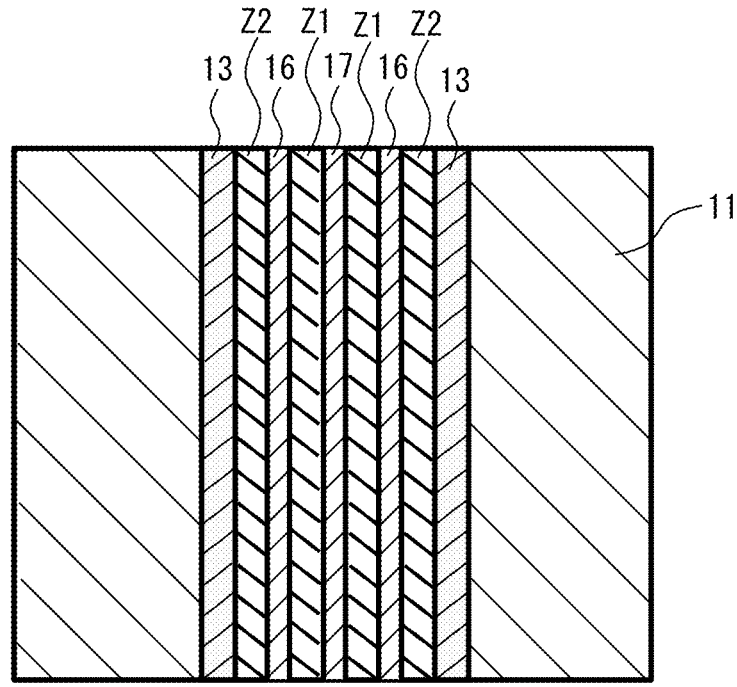
[FIG. 4B]
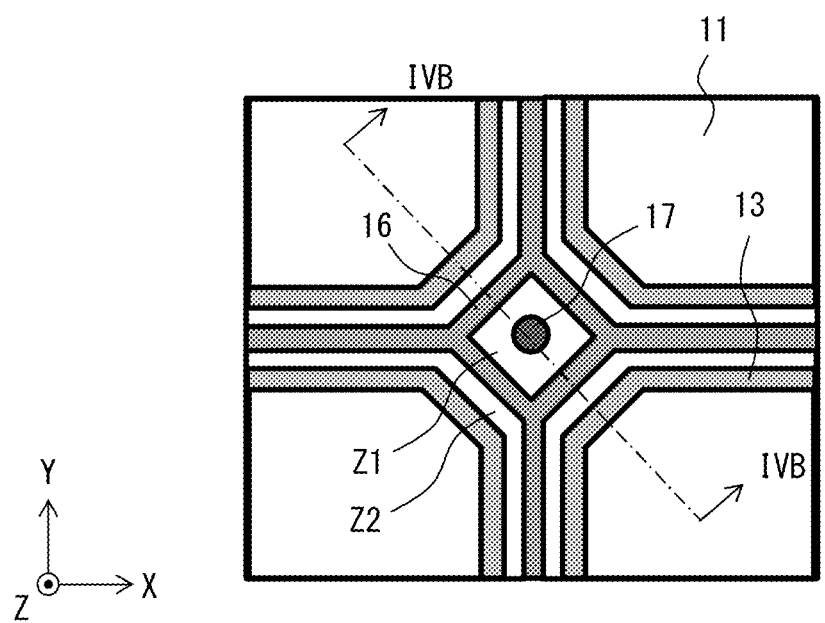

[FIG. 5]
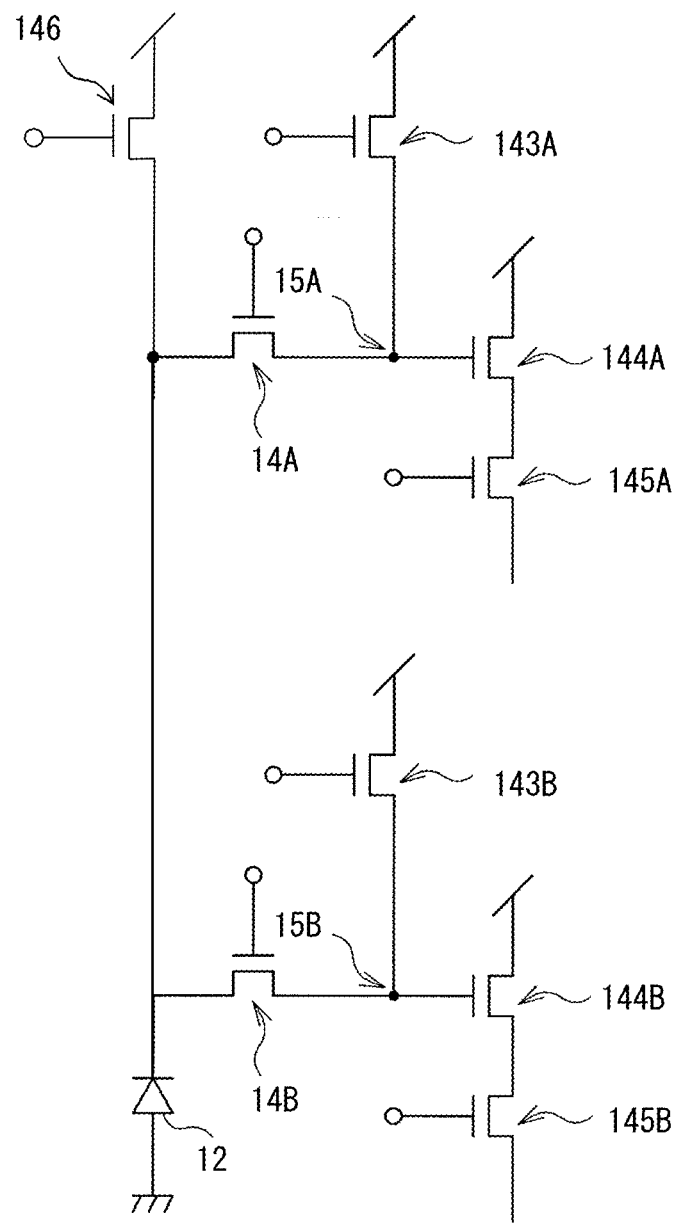

[FIG. 6]
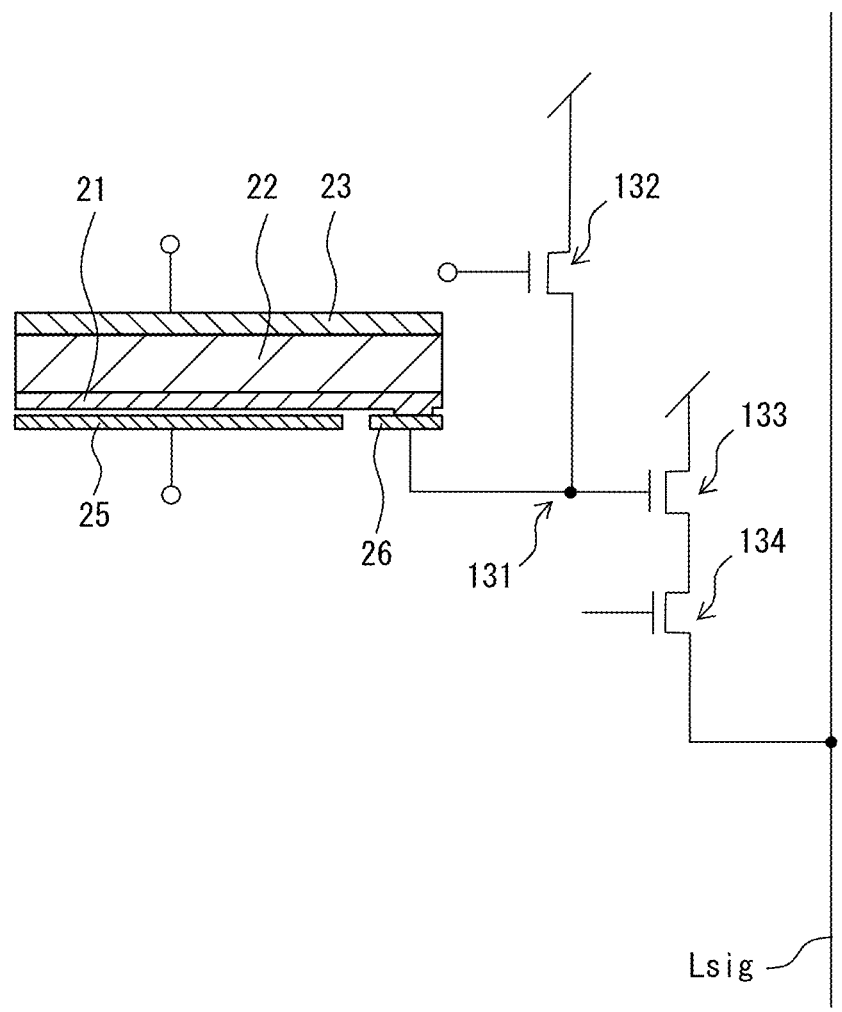

[FIG. 7]
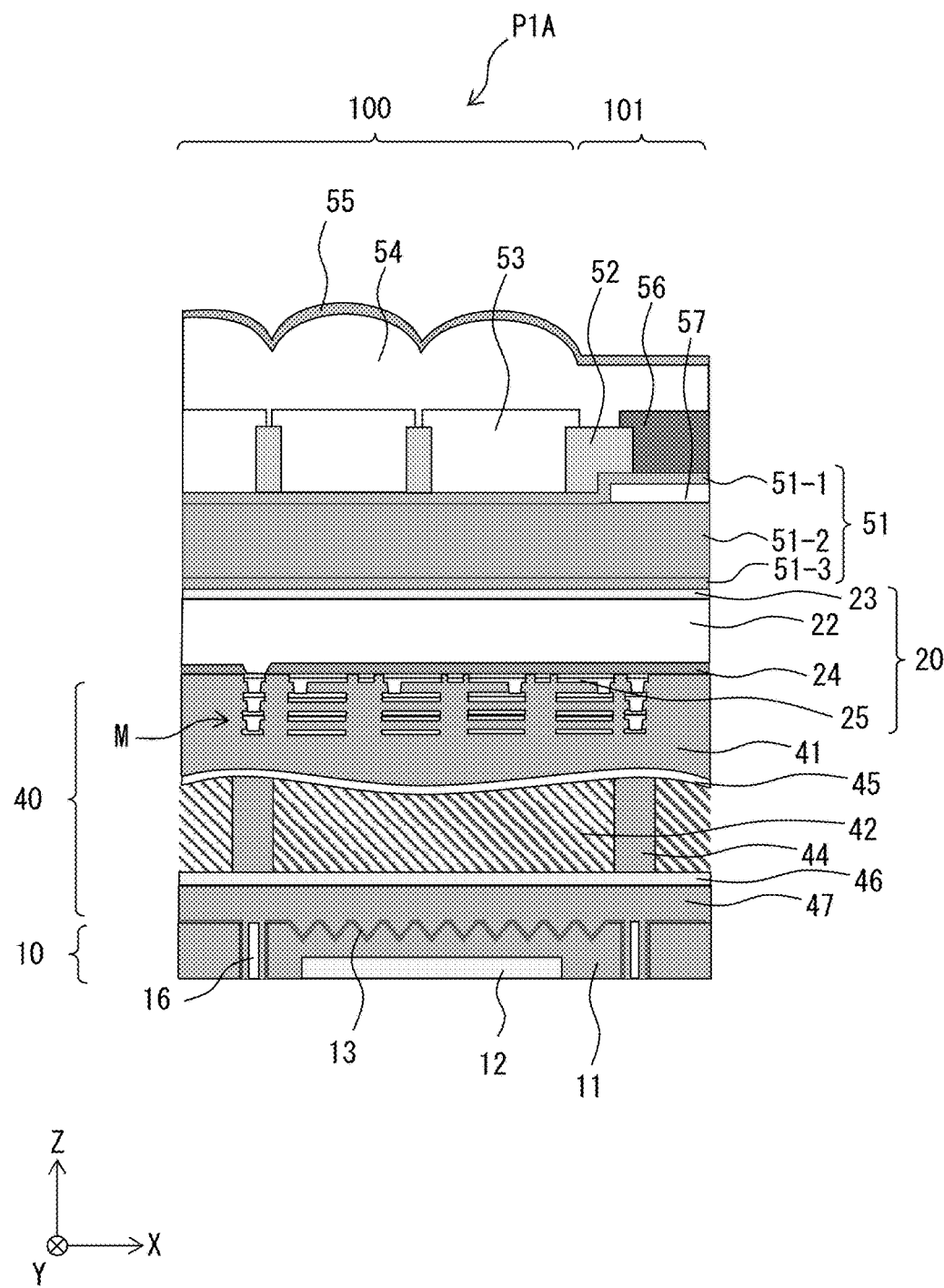

[FIG. 8A]
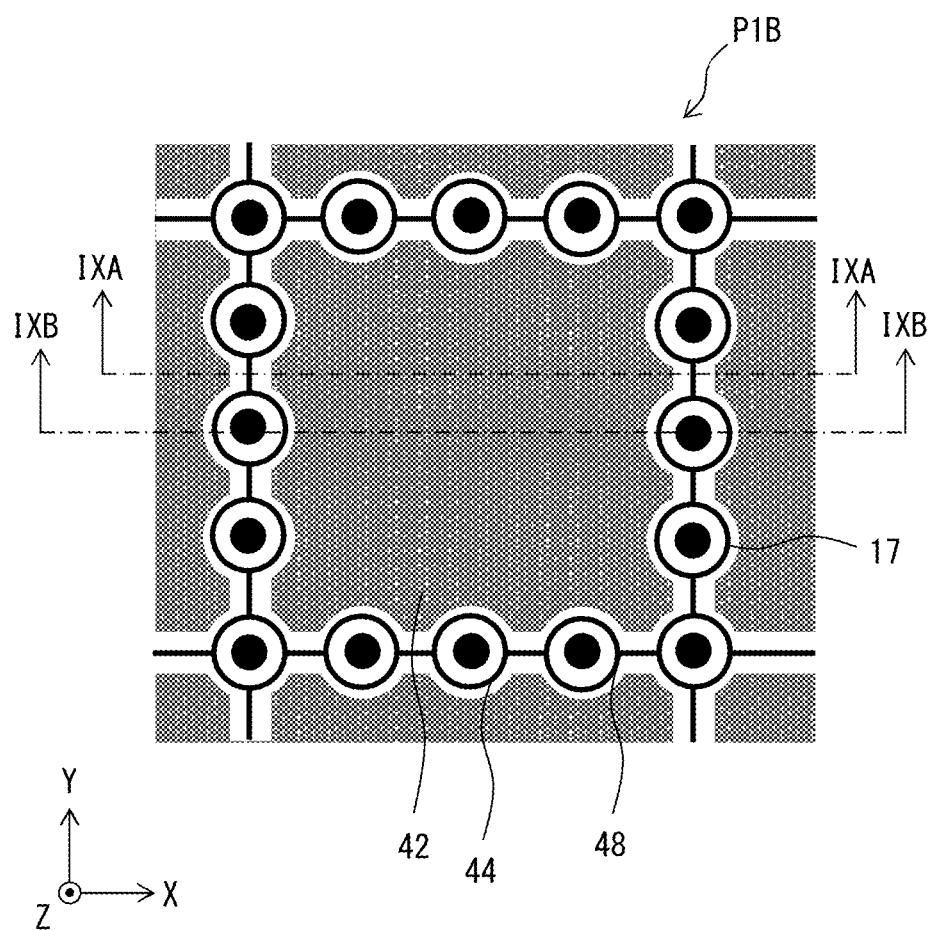

[FIG. 8B]
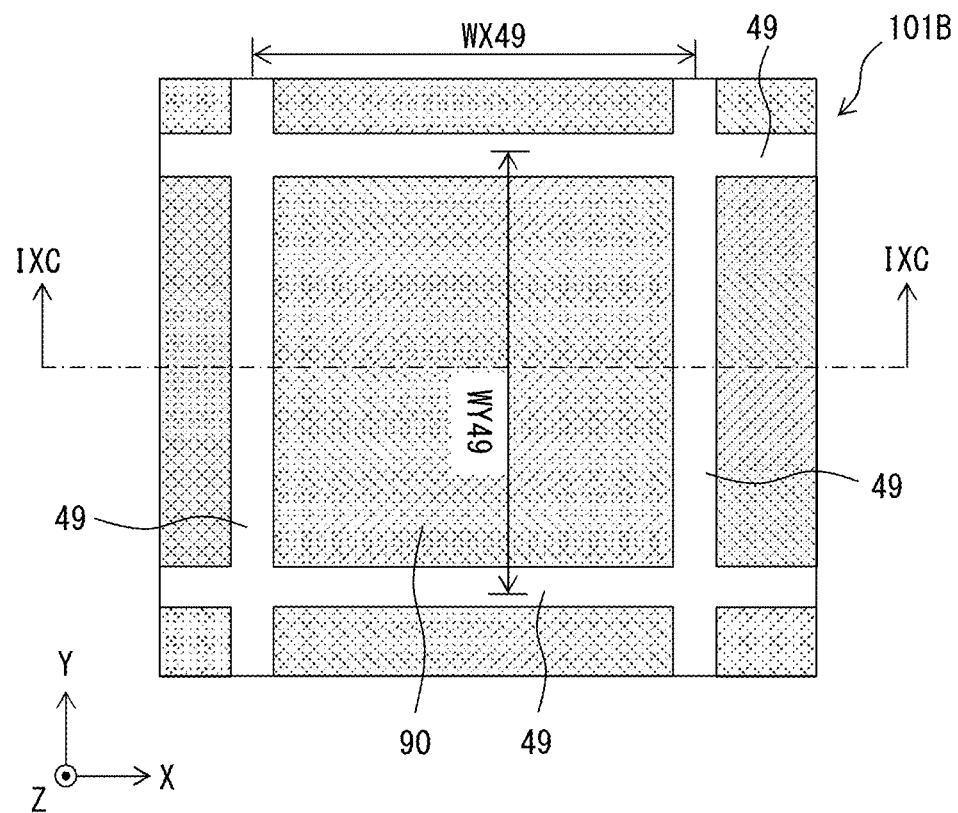

[FIG. 9A]
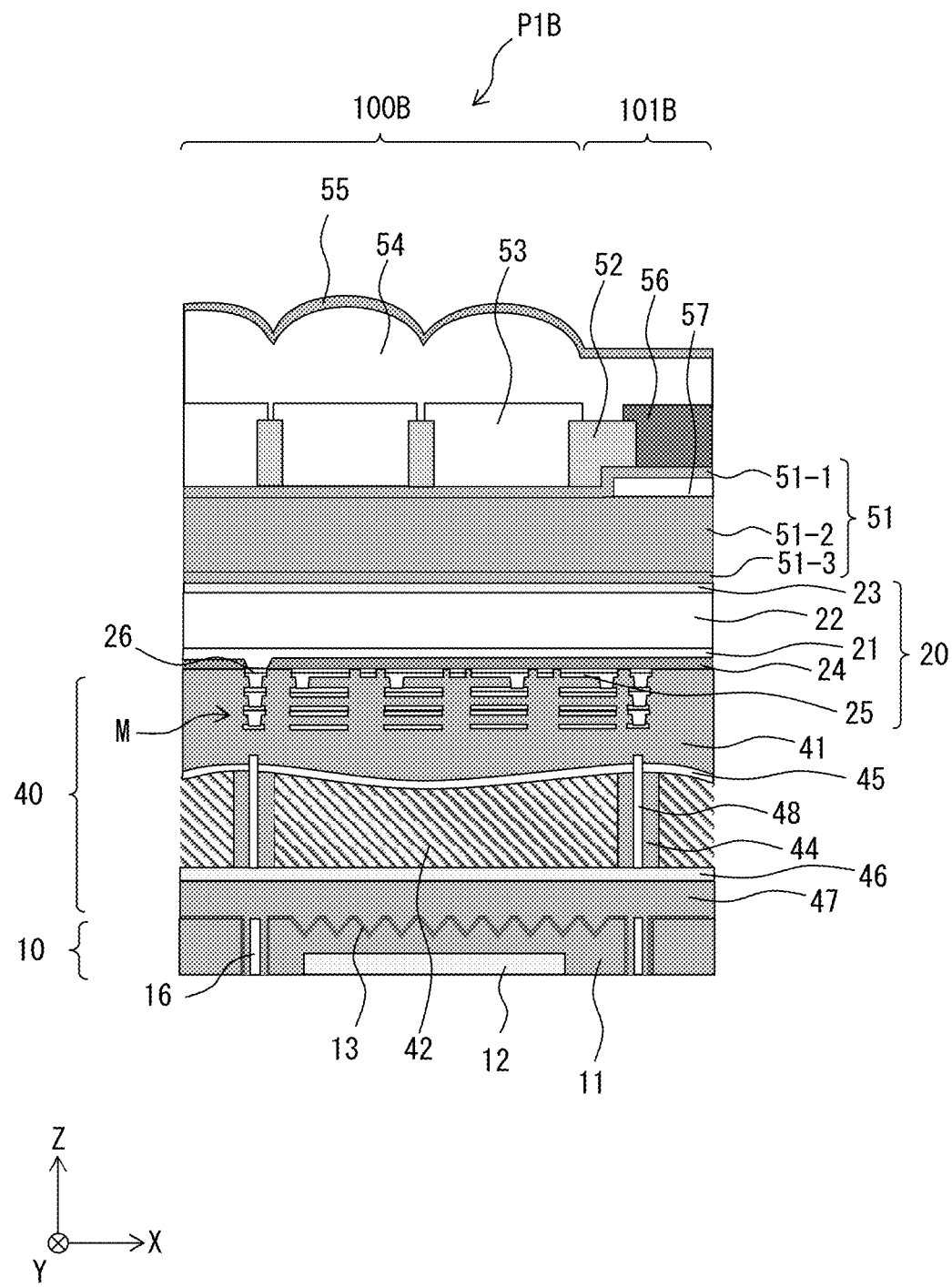

[FIG. 9B]
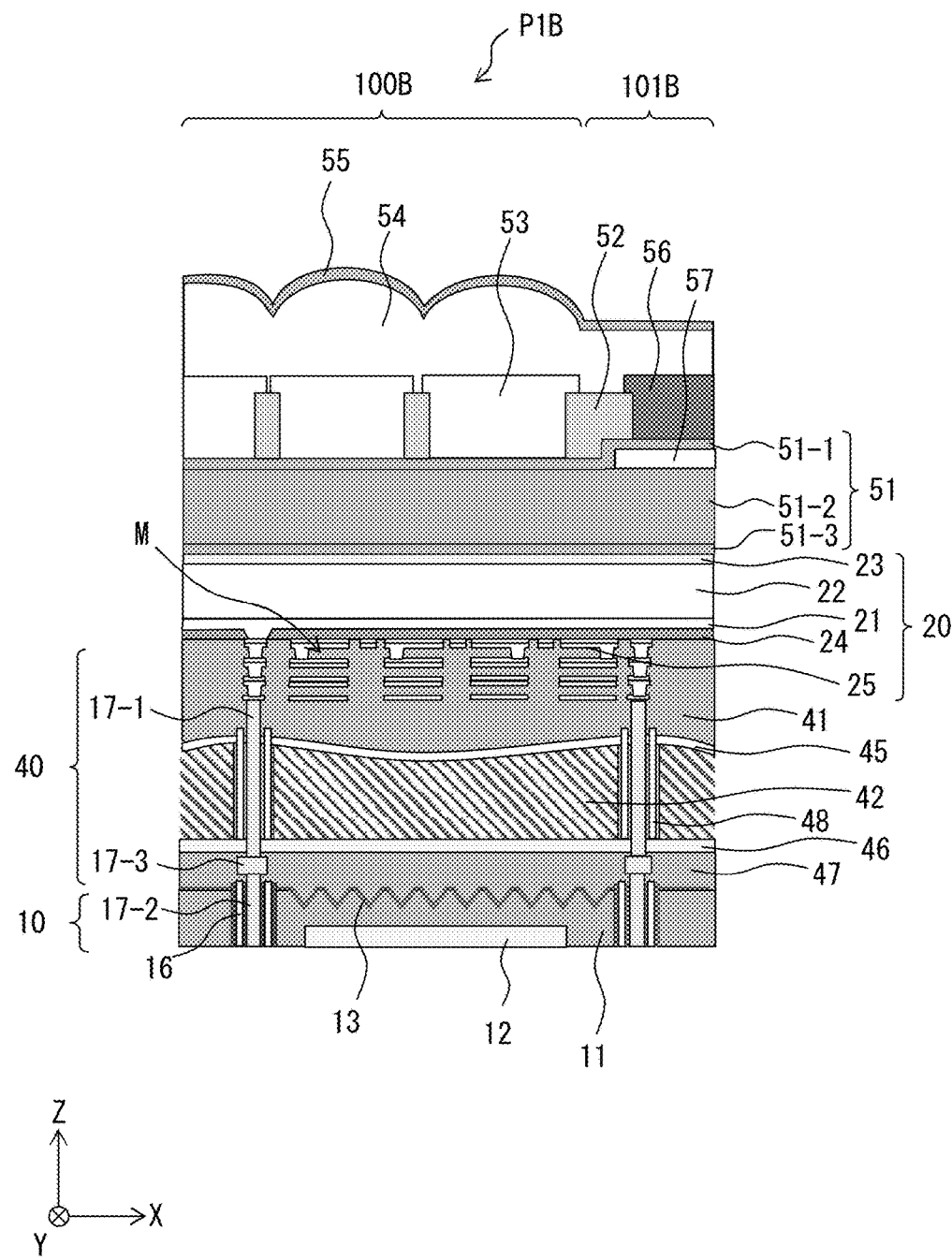

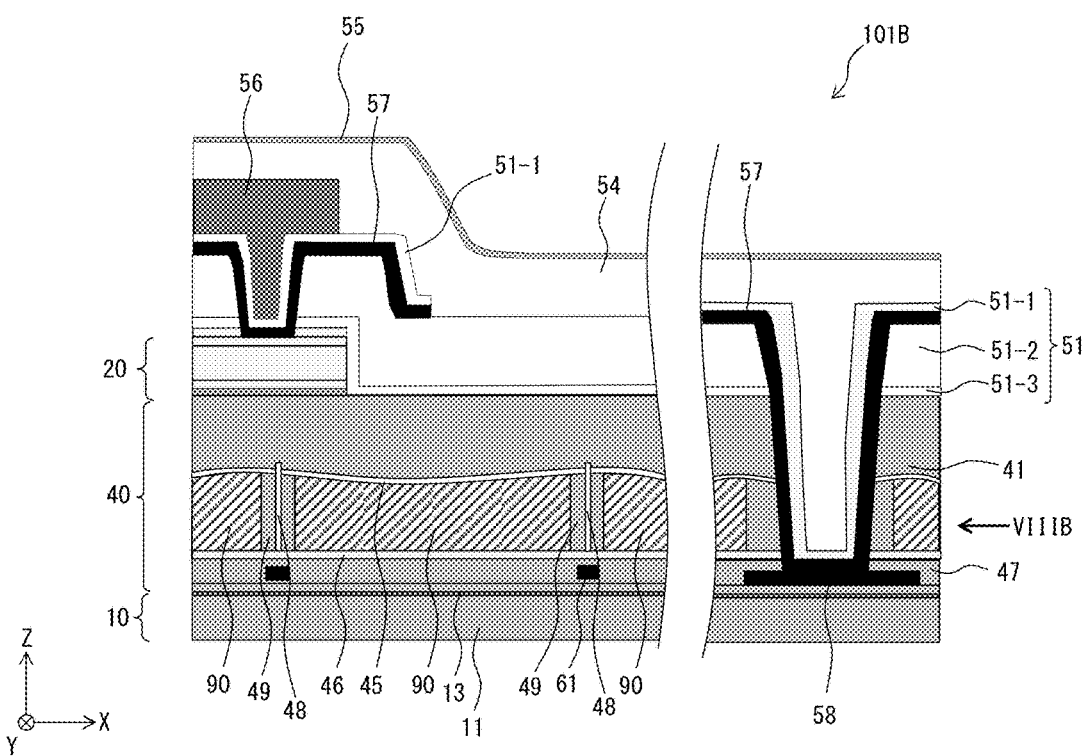
[FIG. 9C]

[FIG. 10A]
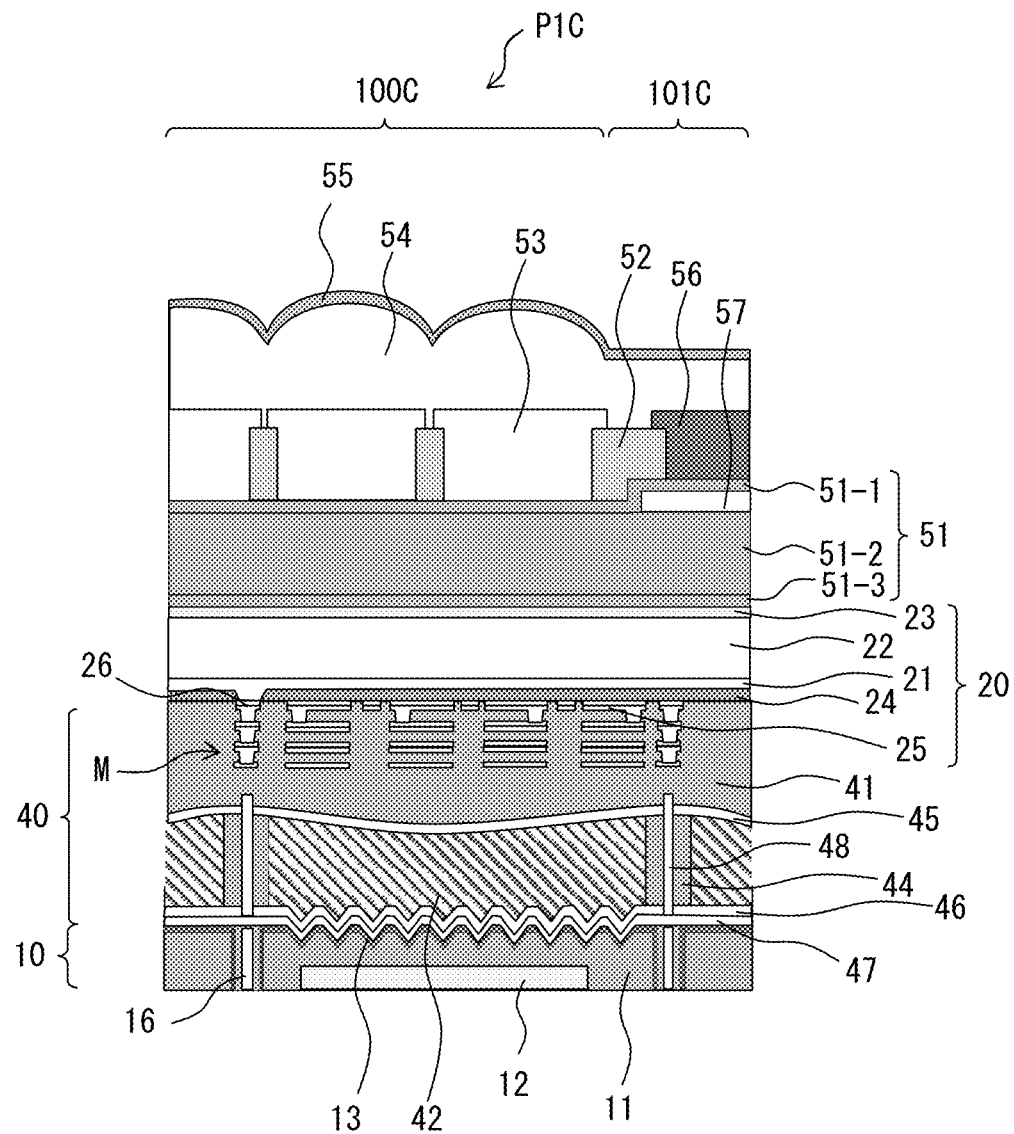

[FIG. 10B]
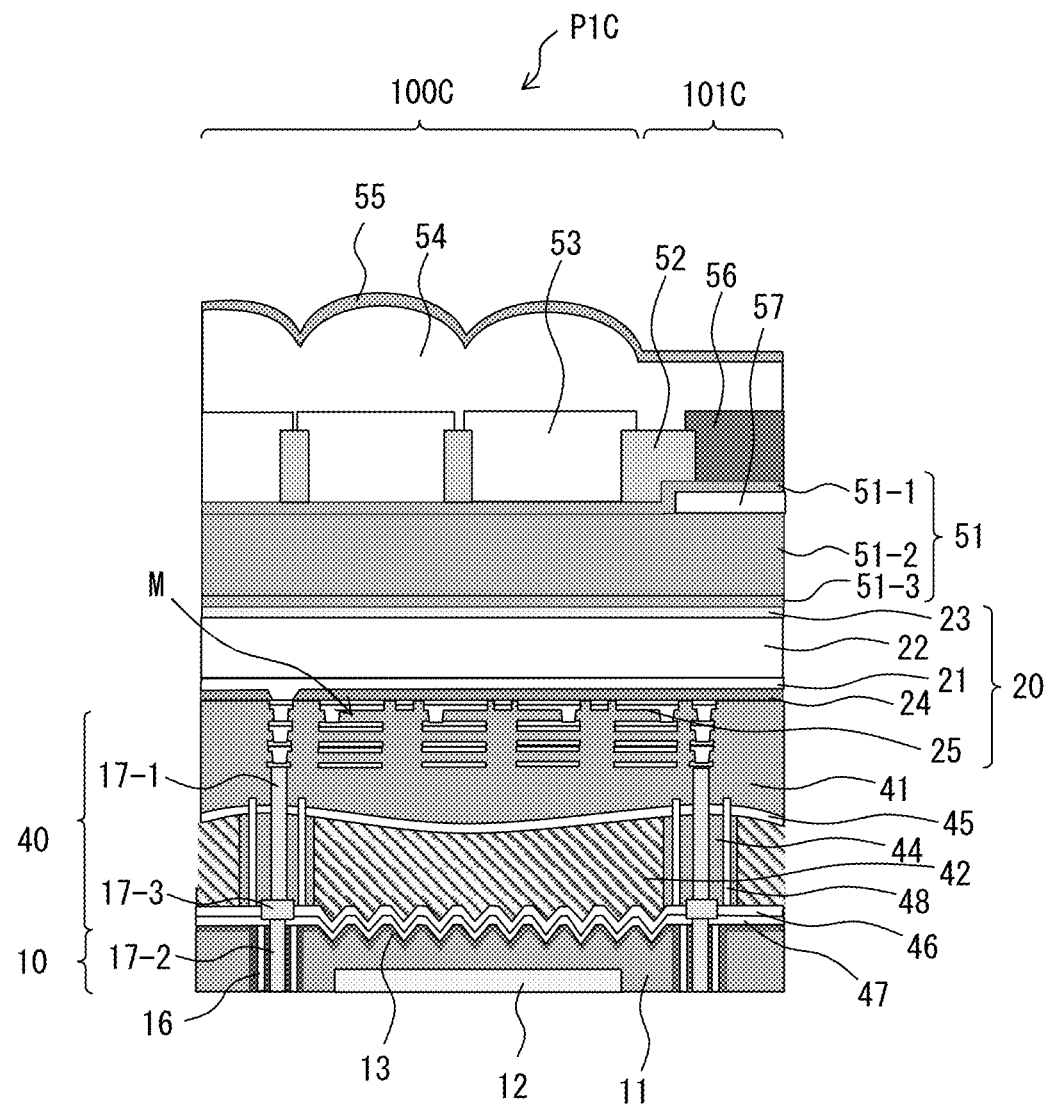

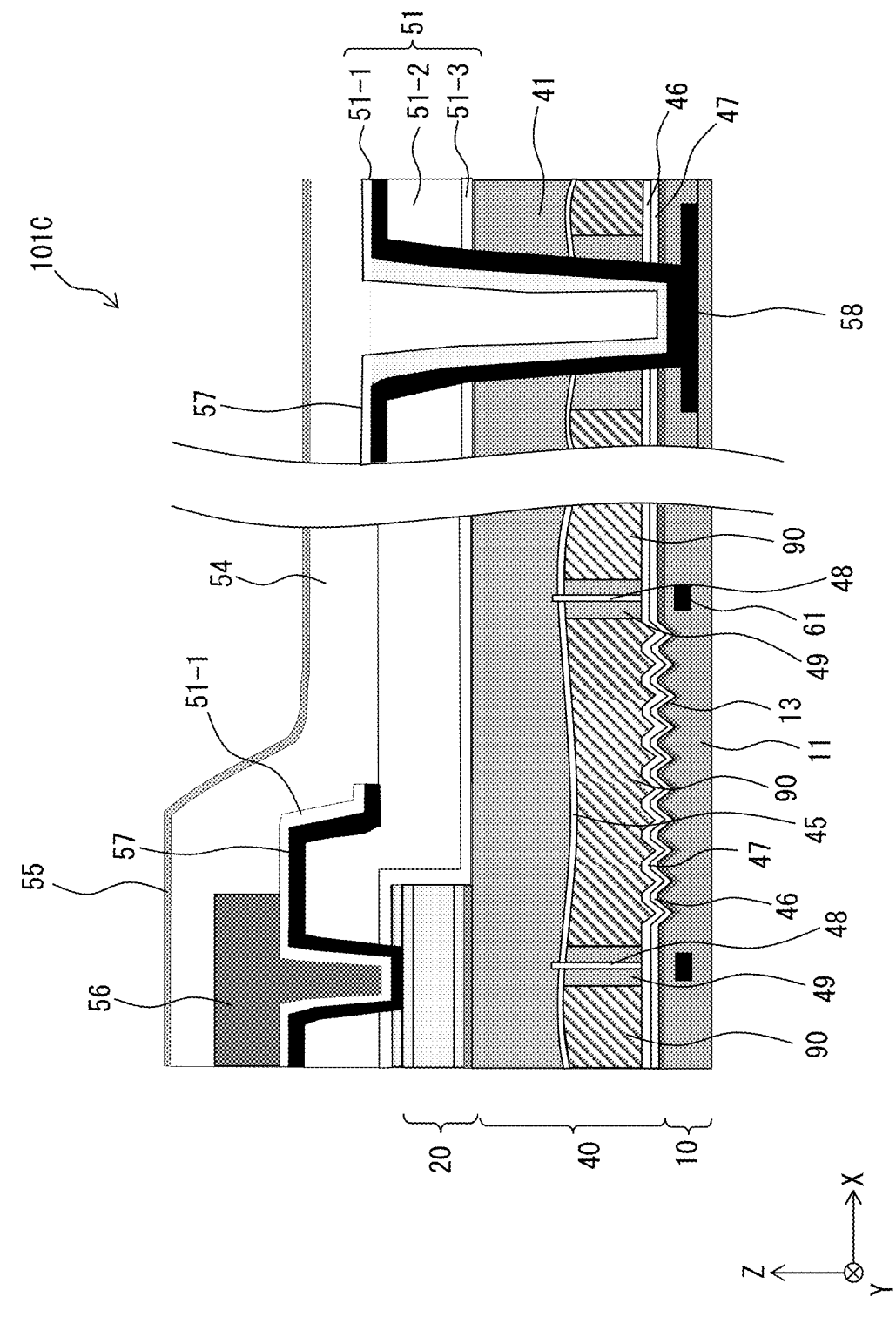
[FIG. 10C]

[FIG. 11A]
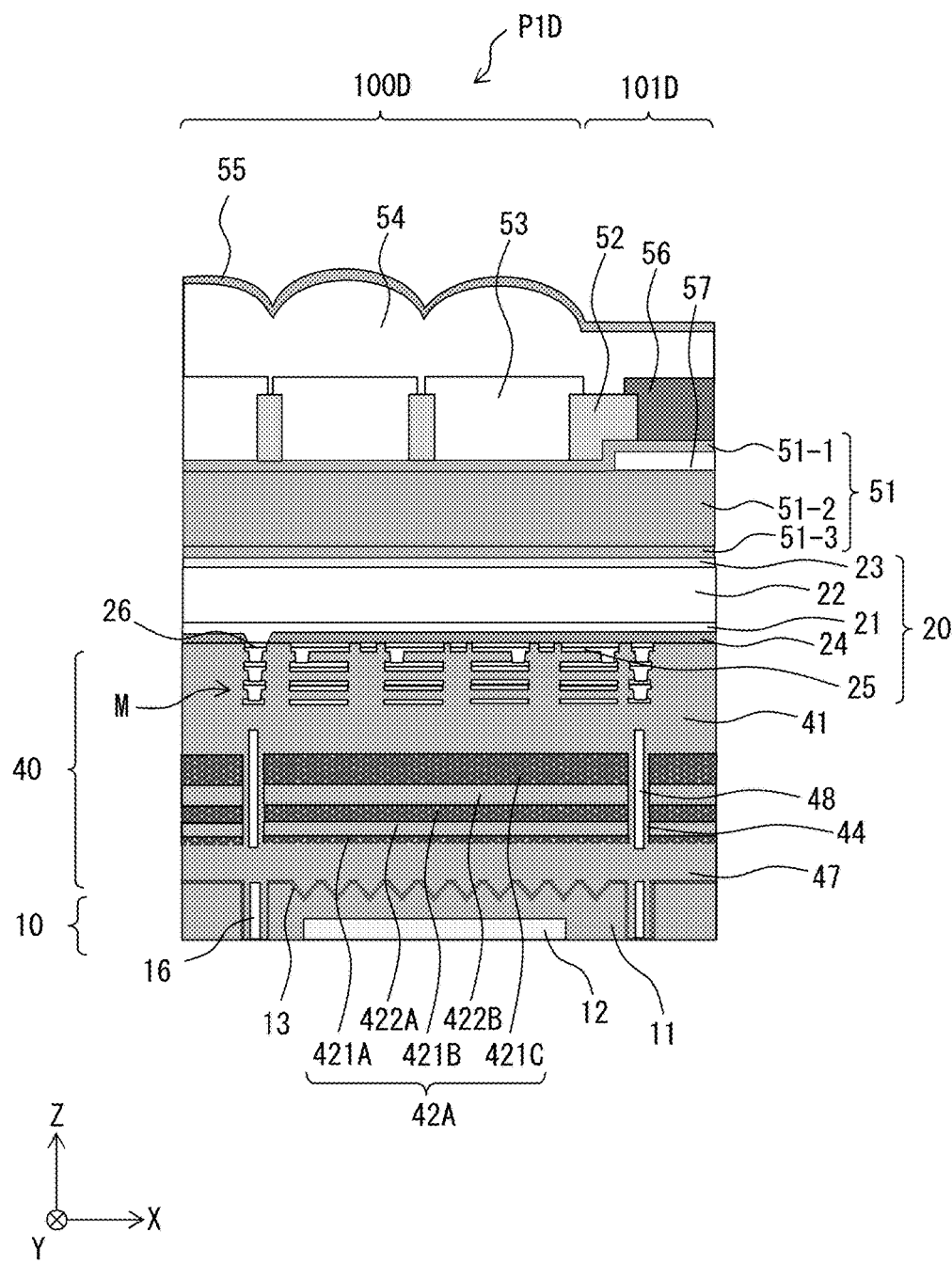

[FIG. 11B]
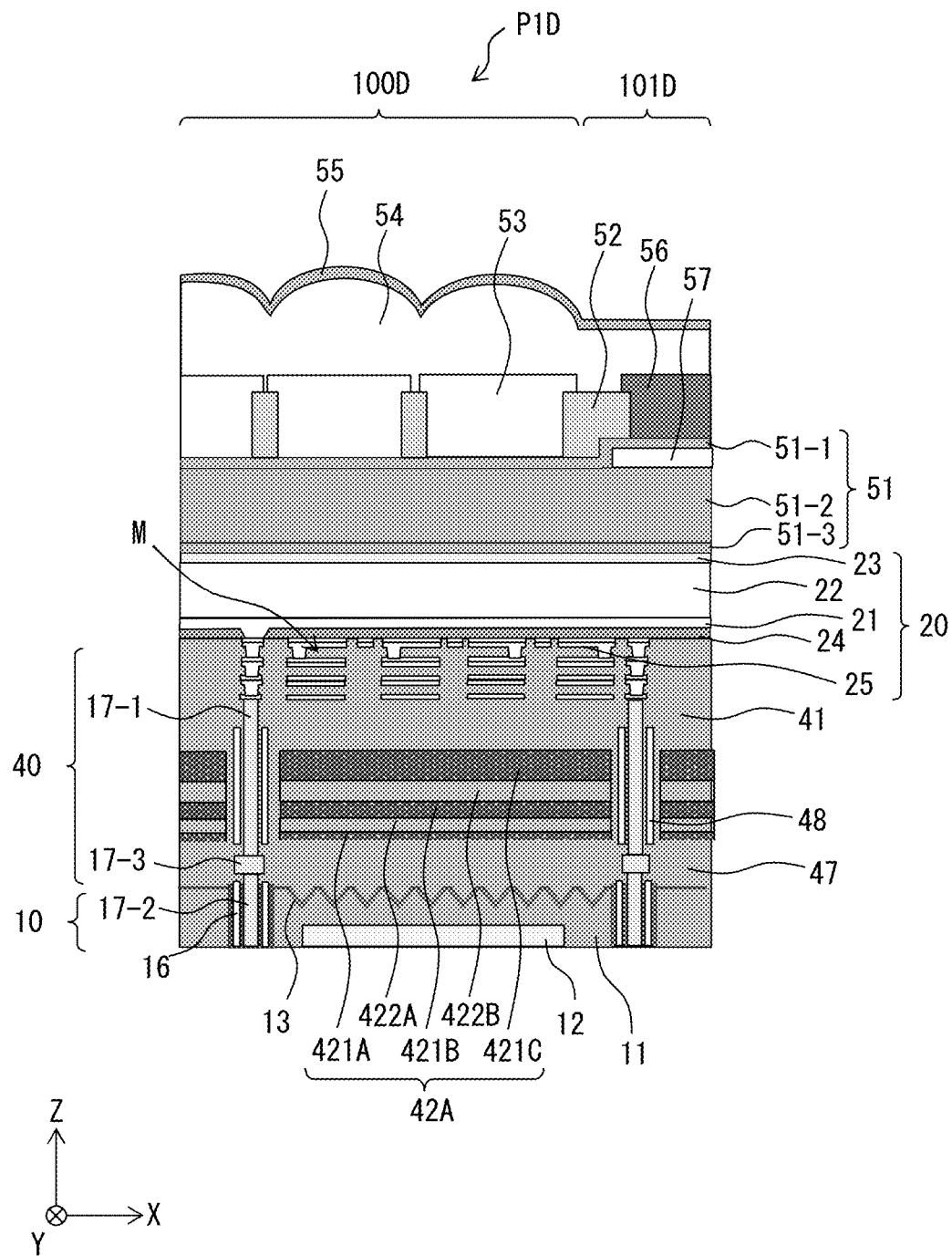

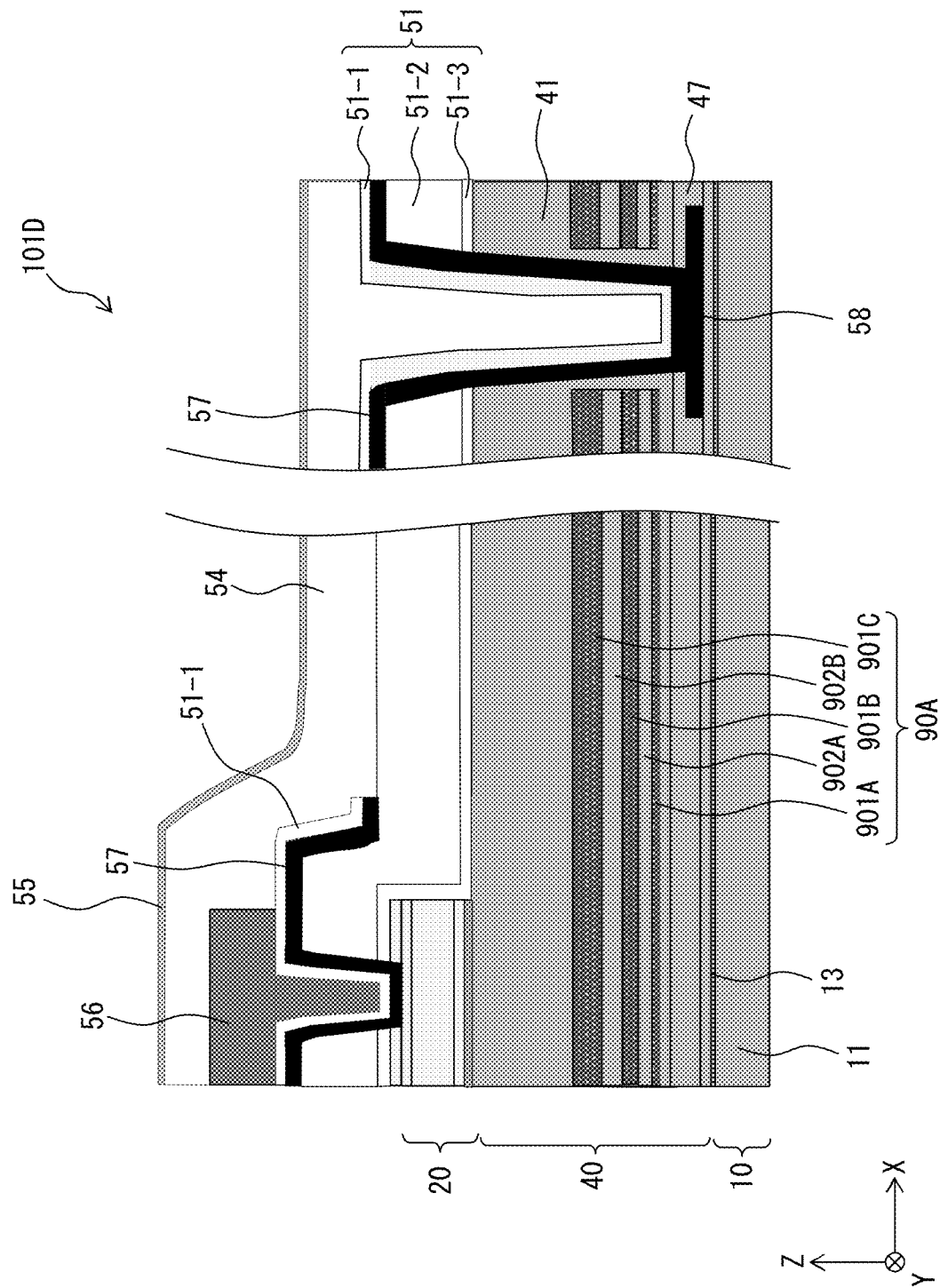

[FIG. 12A]
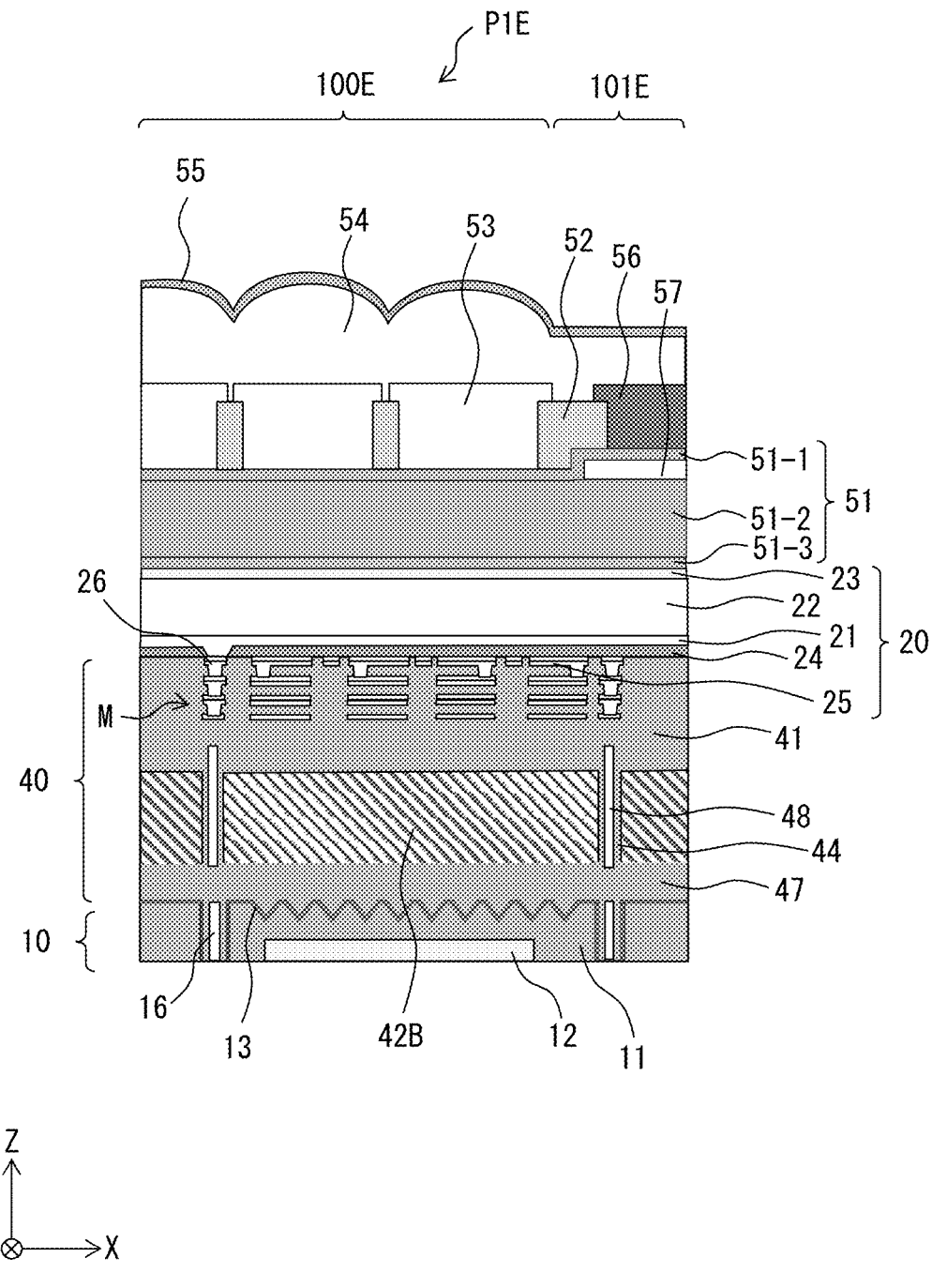

[FIG. 12B]
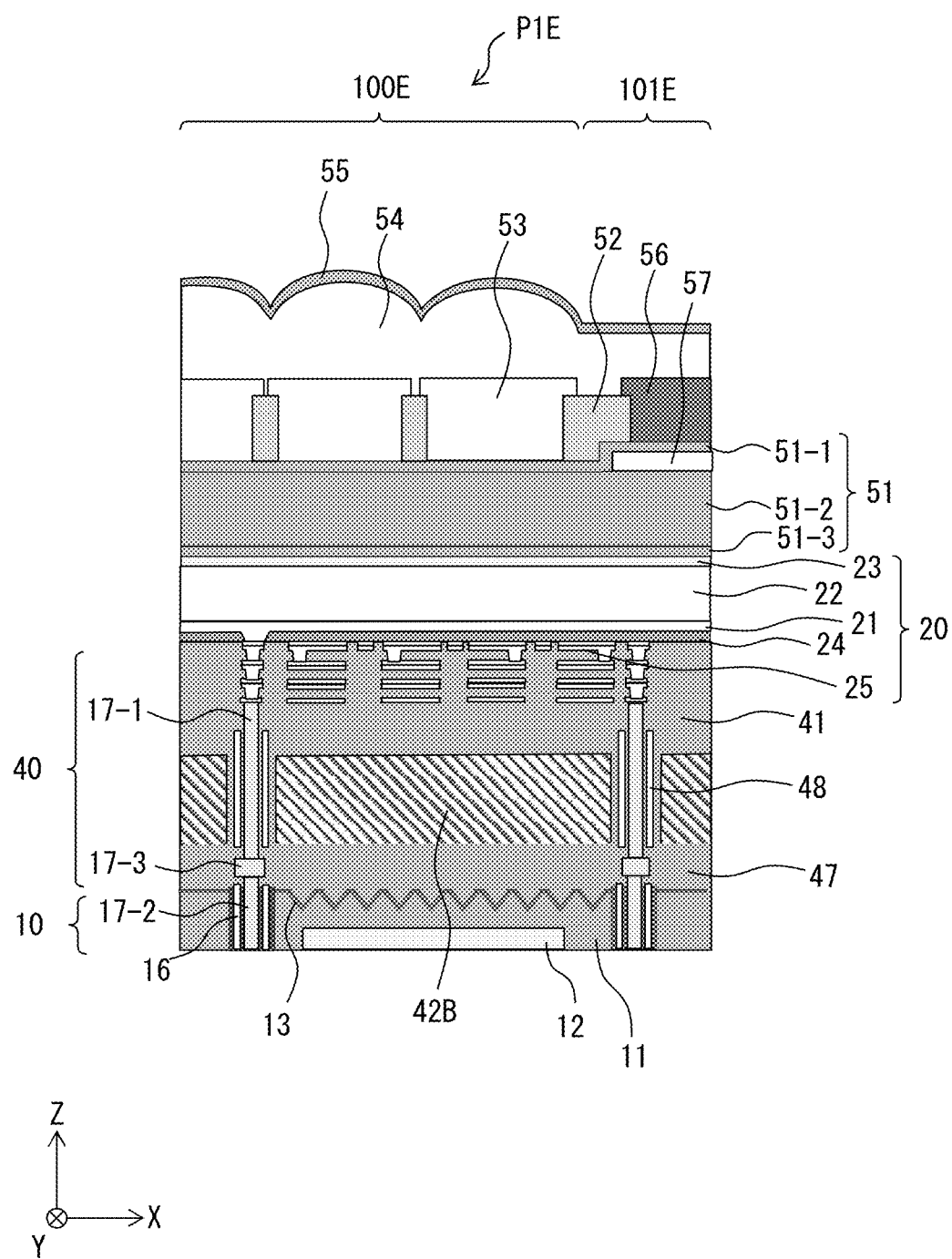

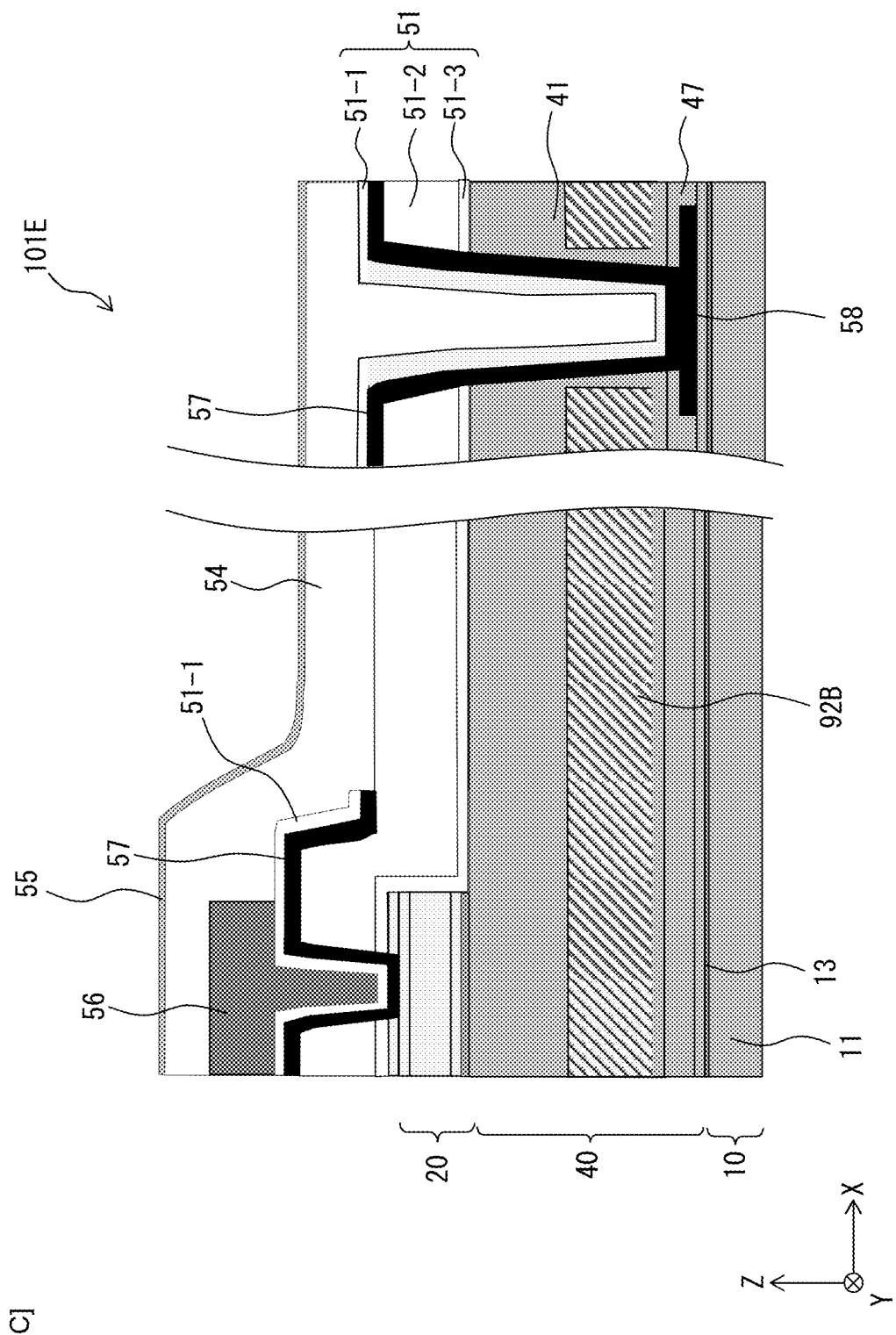
[FIG. 12C]

[FIG. 13]
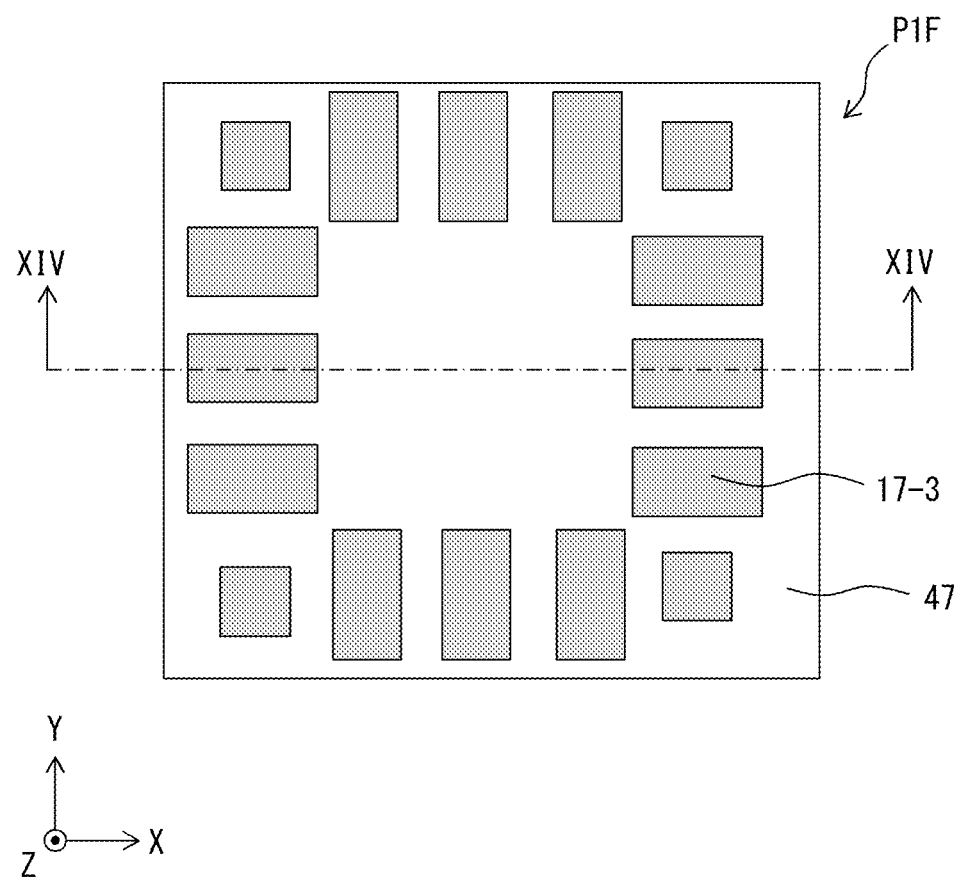

[FIG. 14A]
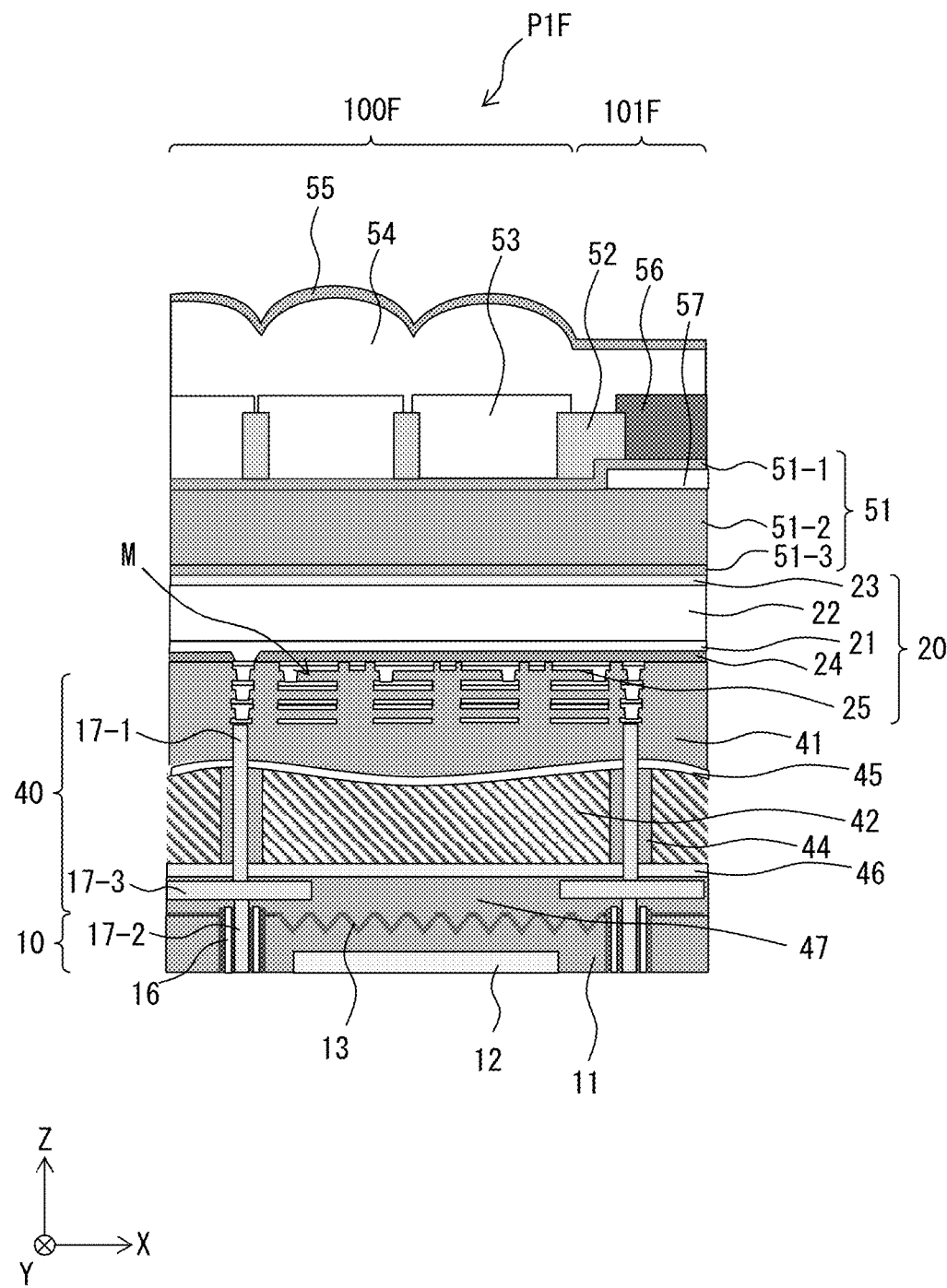

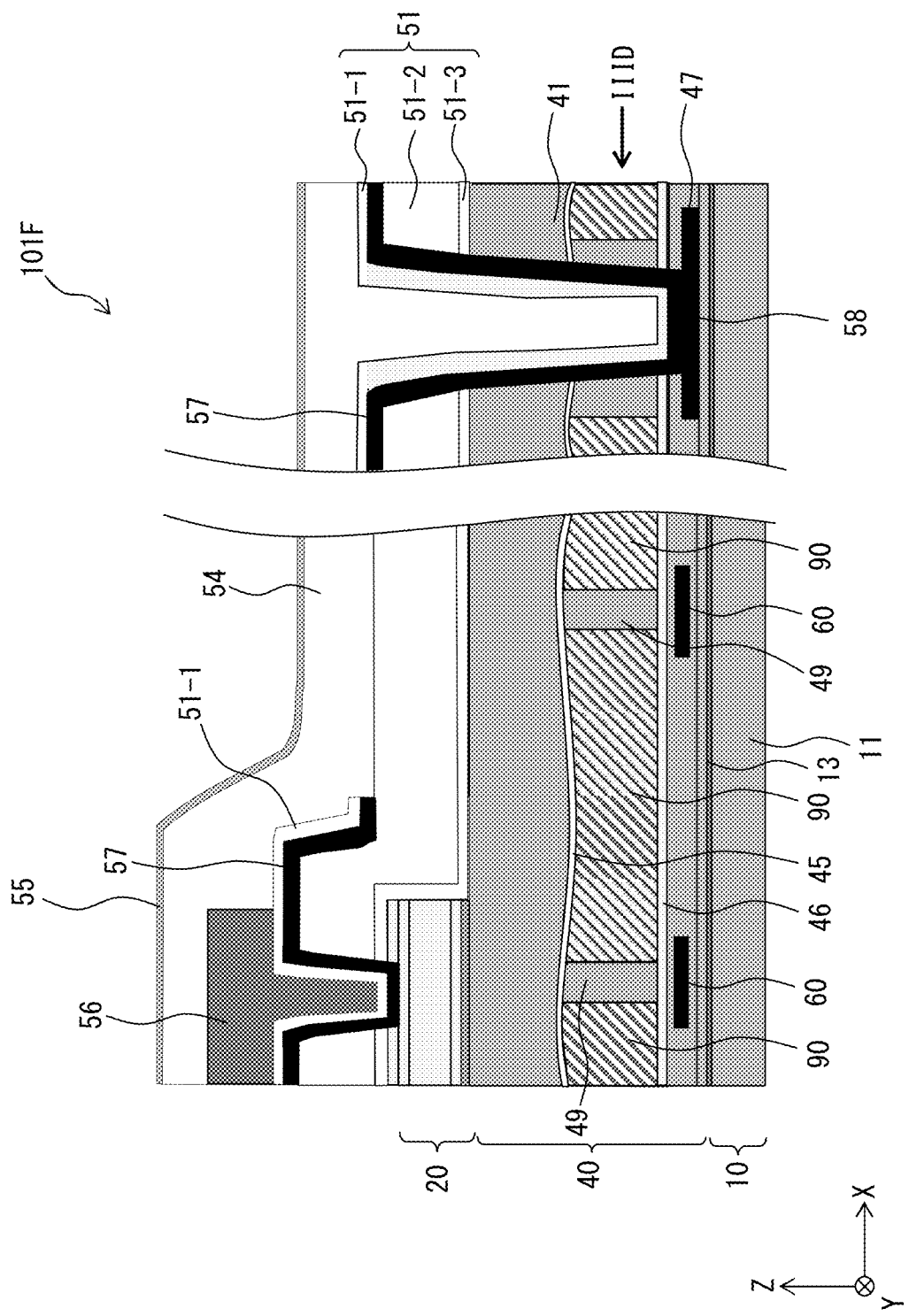
[FIG. 14B]

[FIG. 15A]
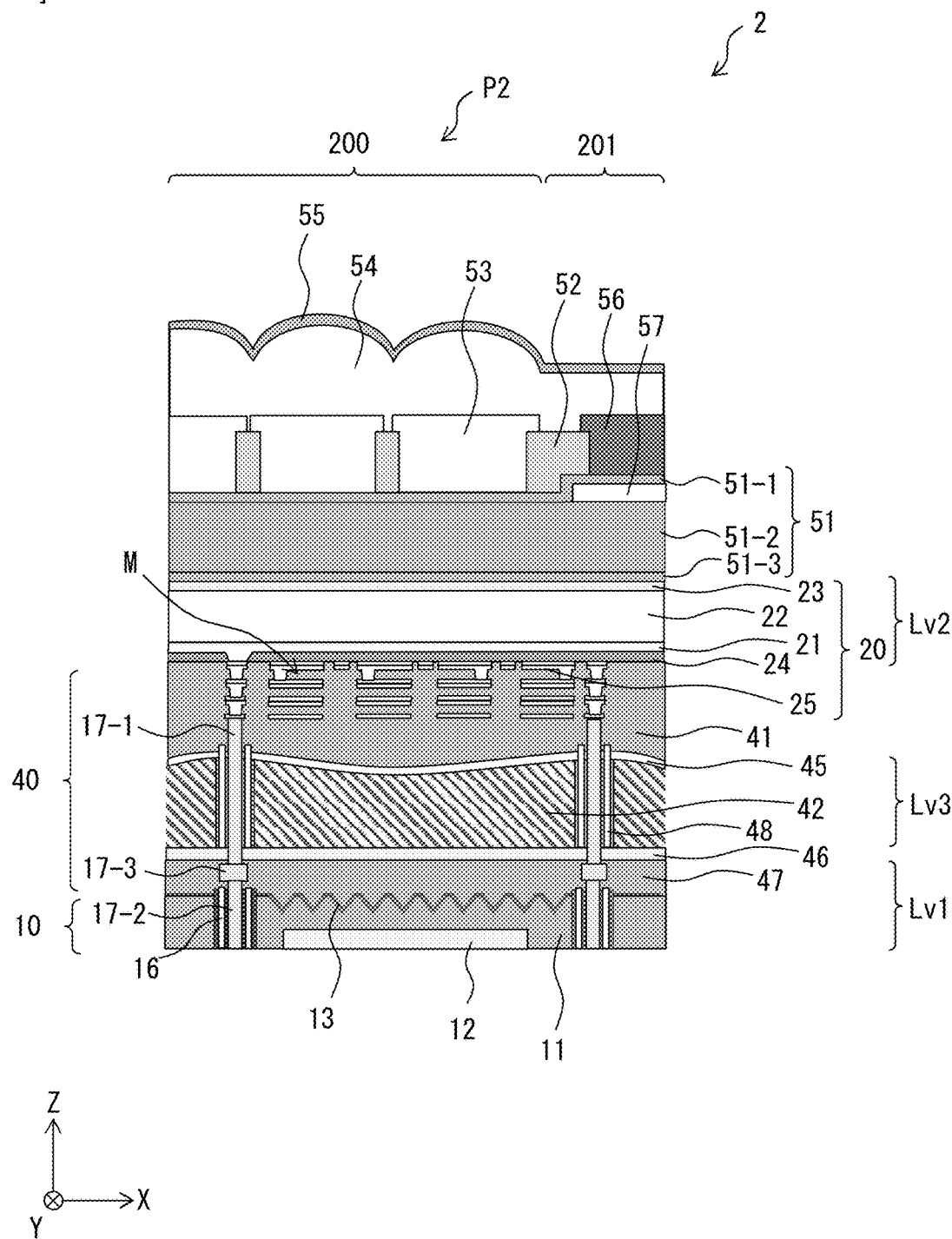

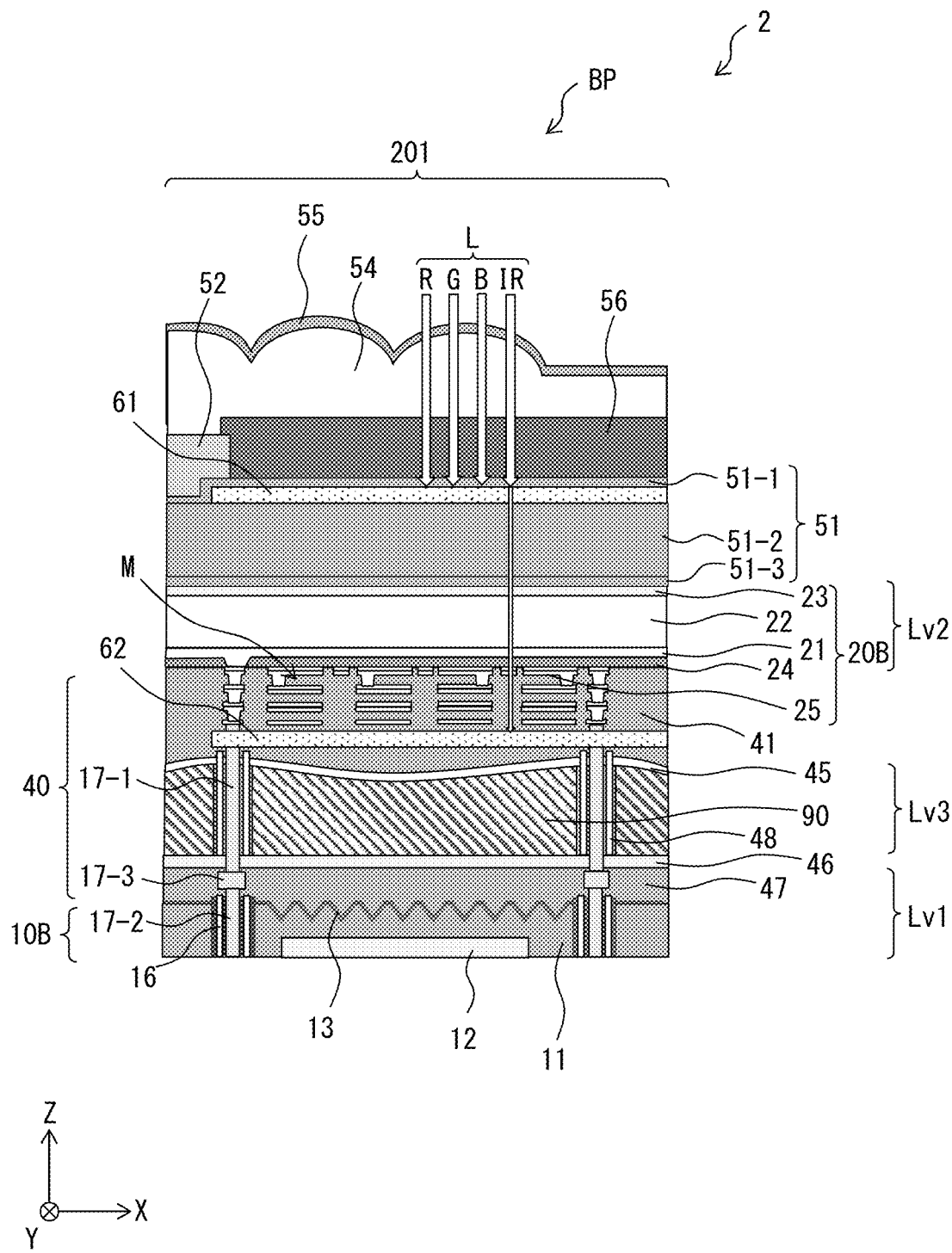
[FIG. 15B]

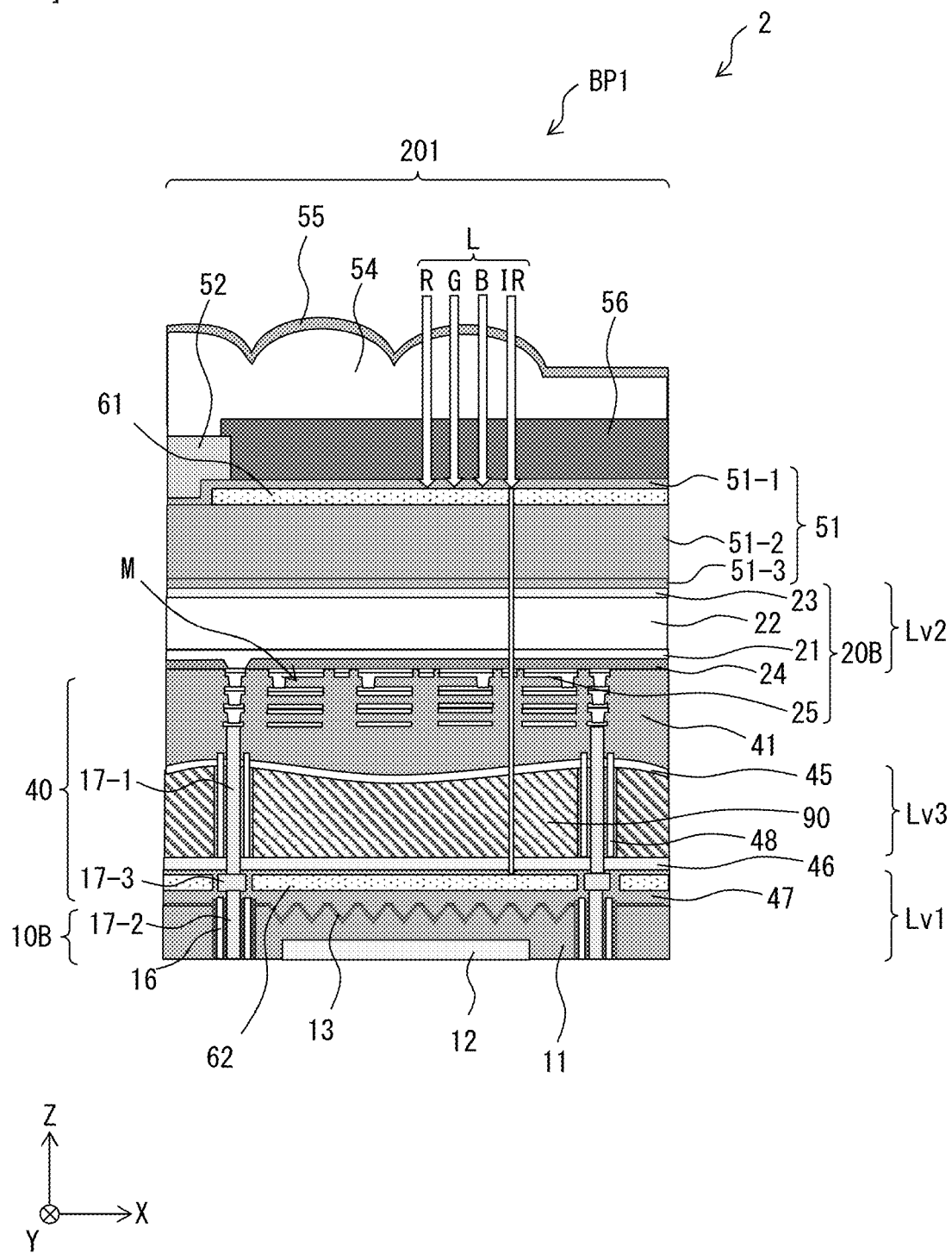
[FIG. 16]

[FIG. 17]
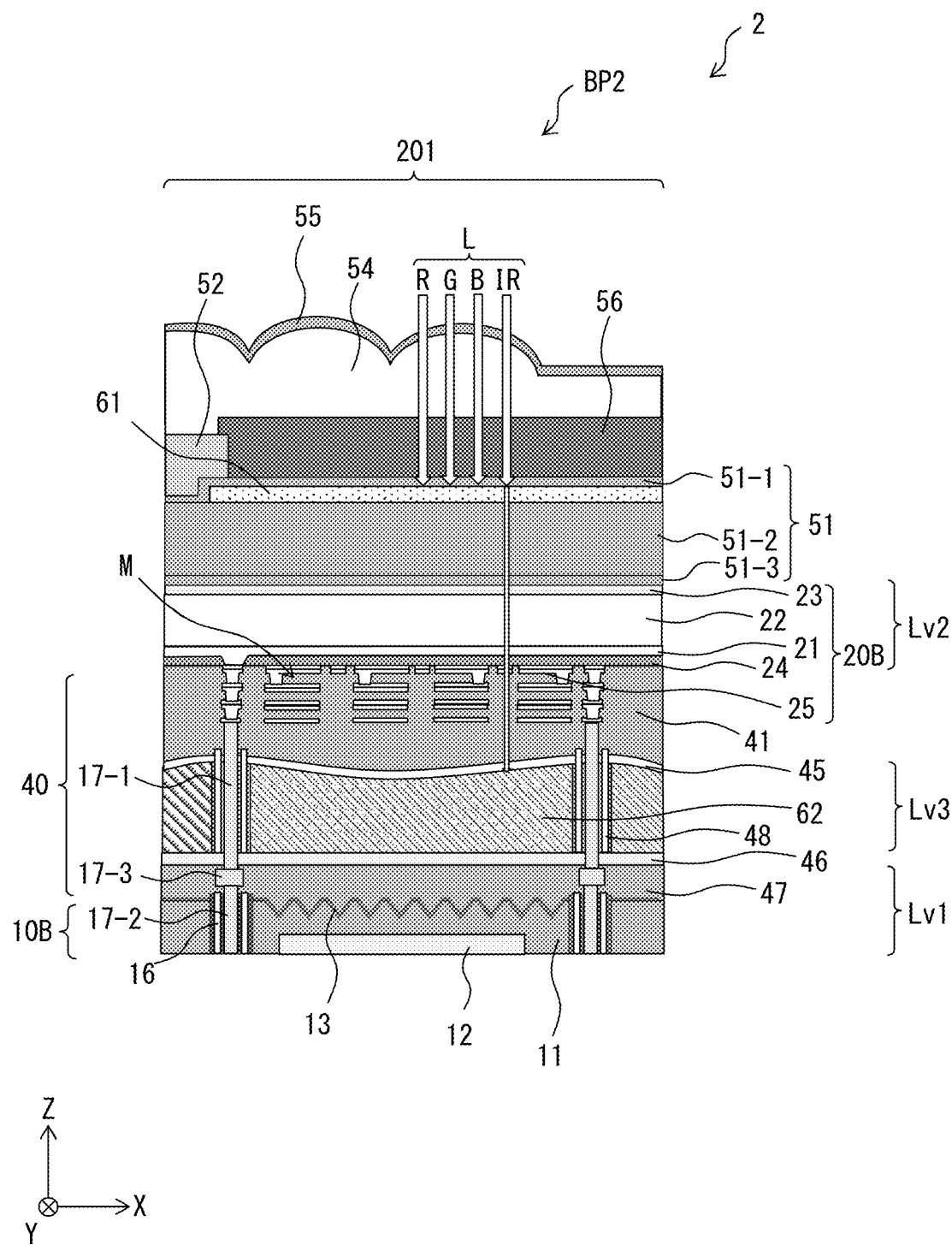

[FIG. 18]
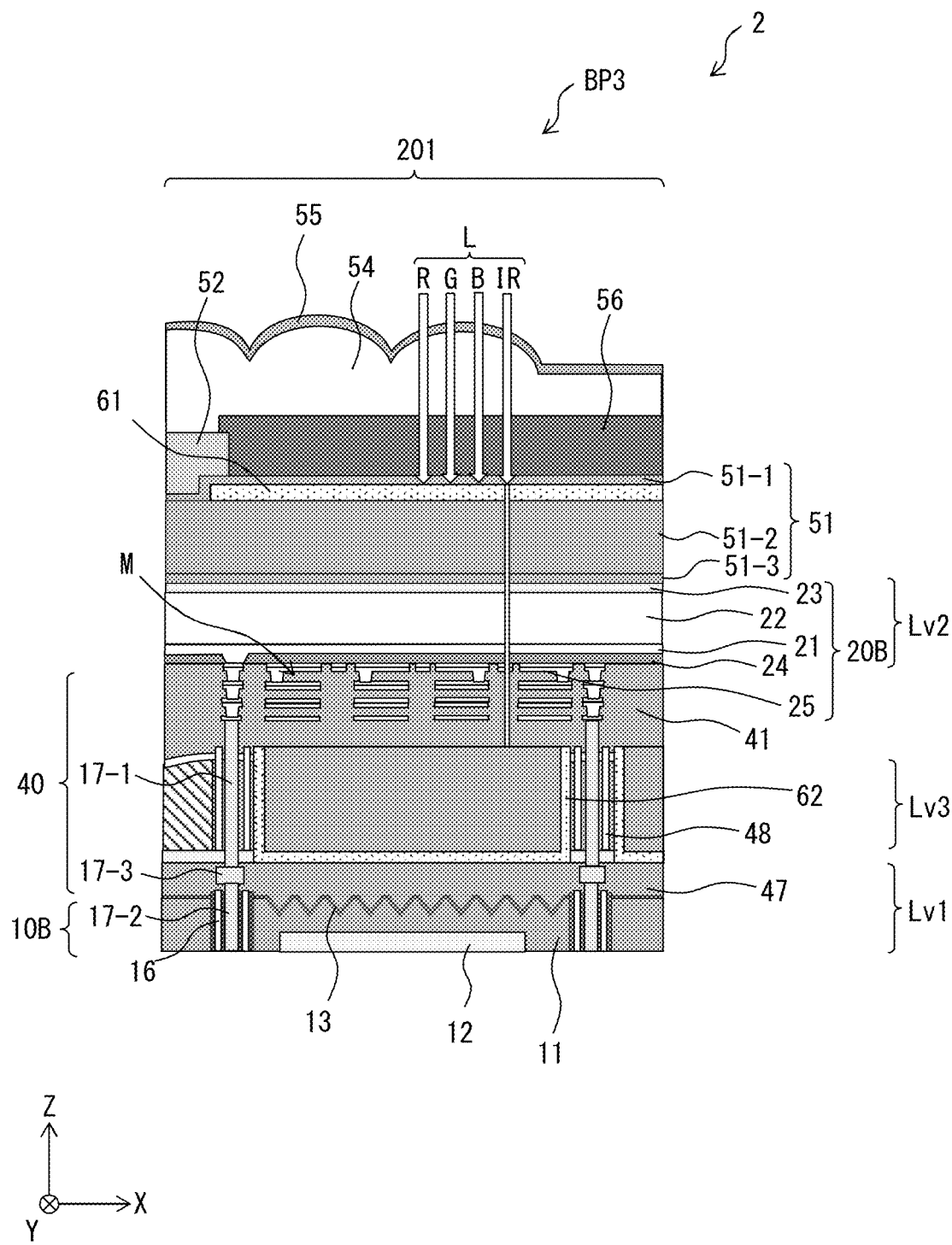

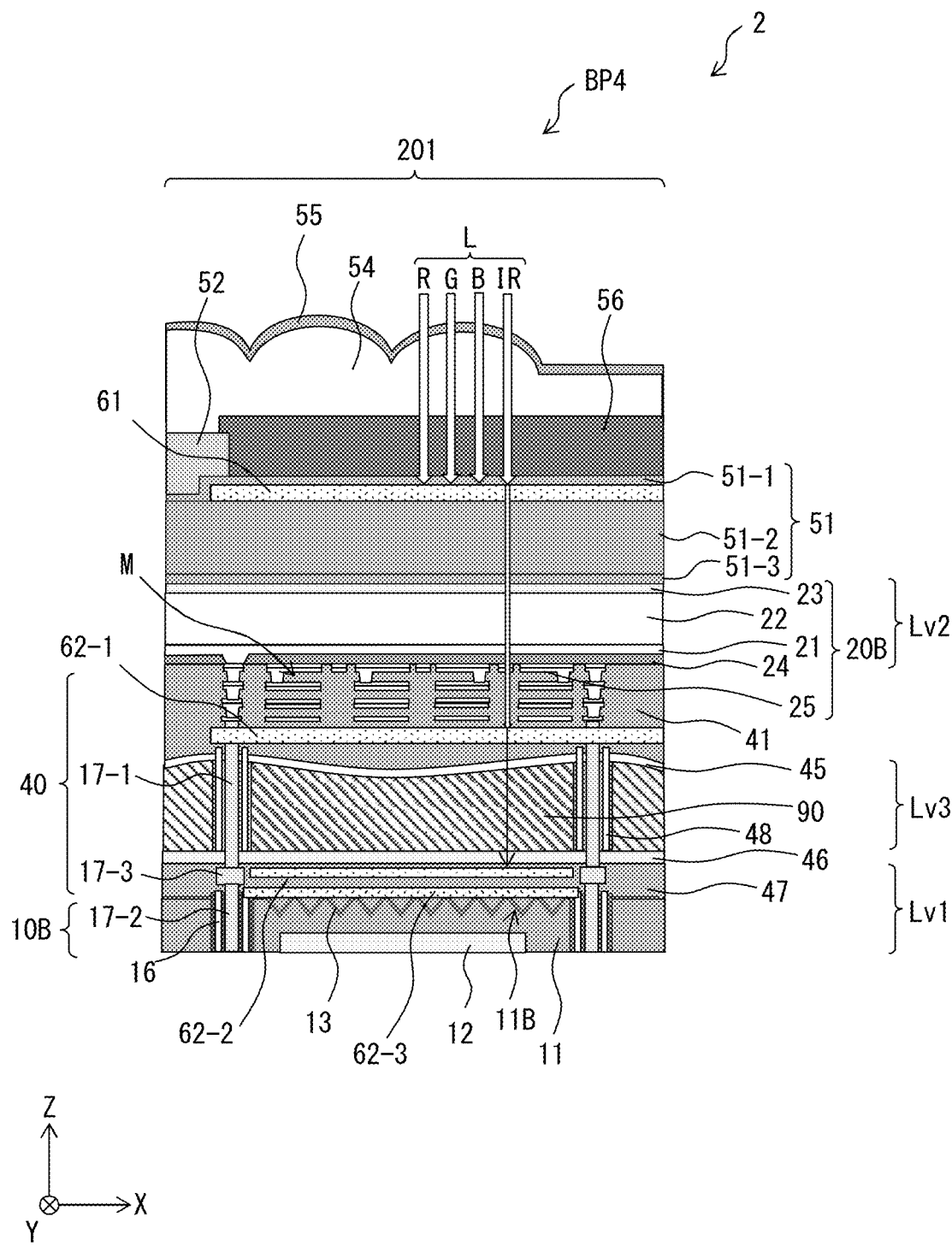
[FIG. 19]

[FIG. 20A]
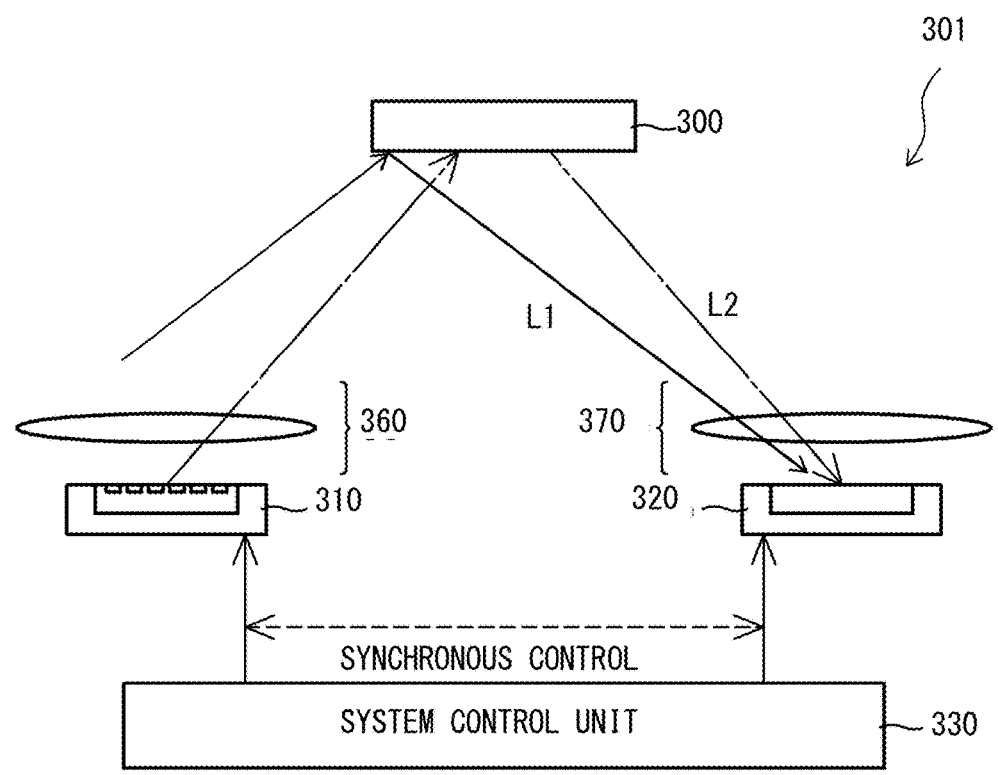
[FIG. 20B]
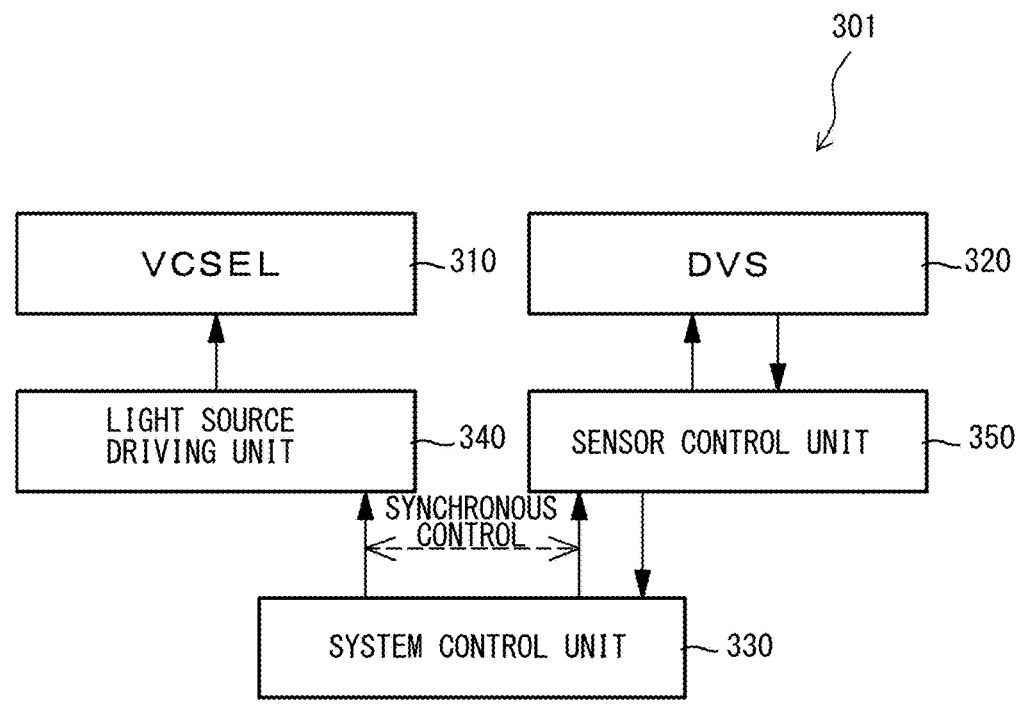

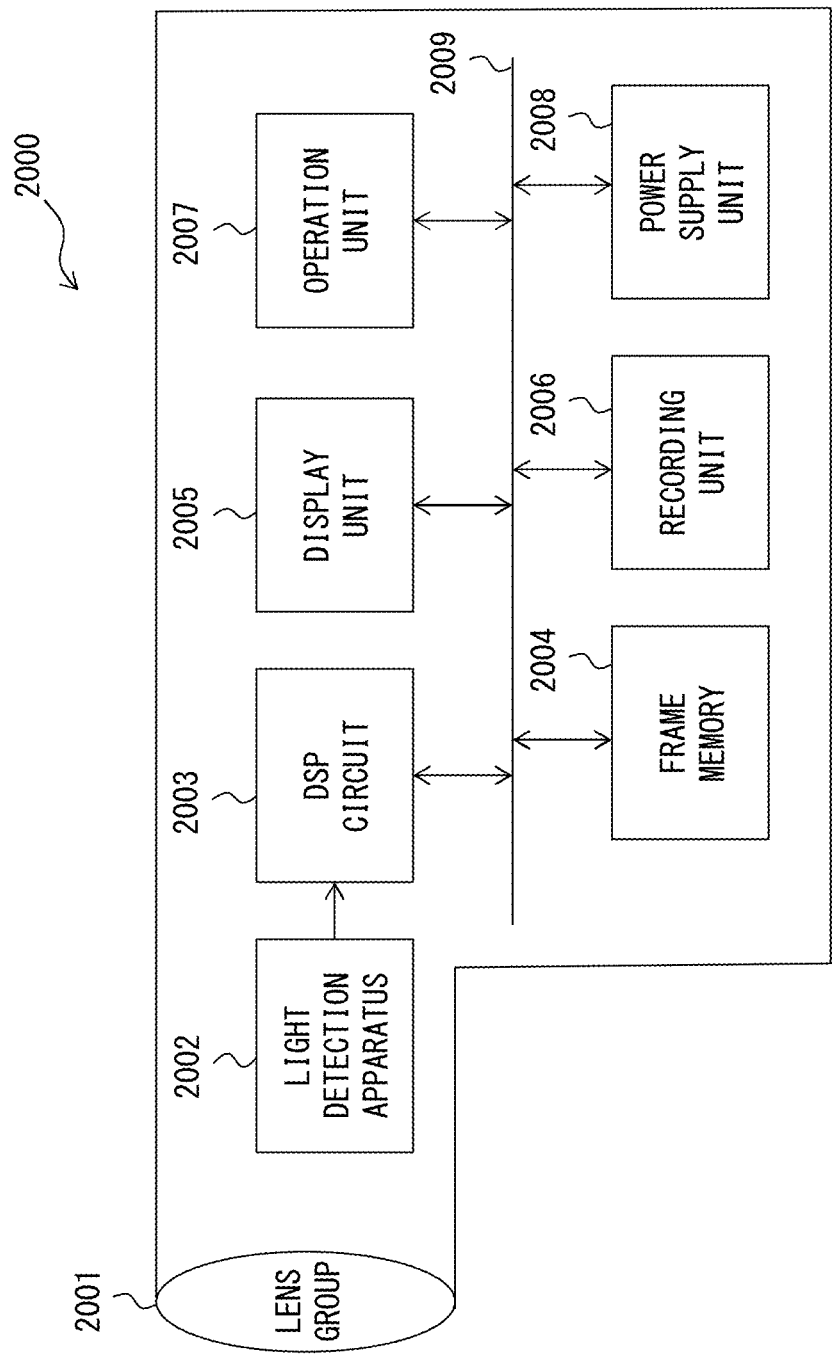
[FIG. 21]

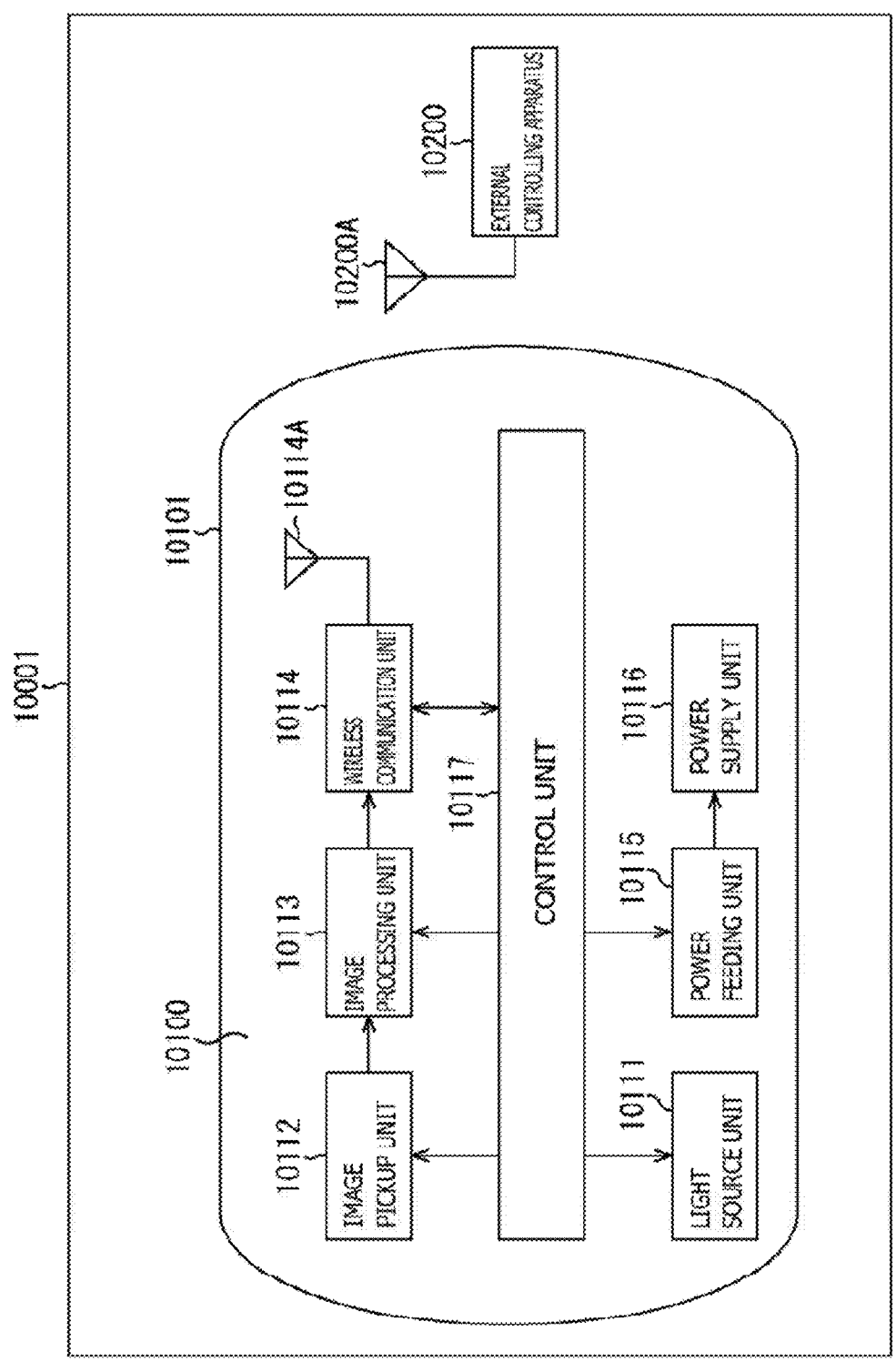
[FIG. 22]

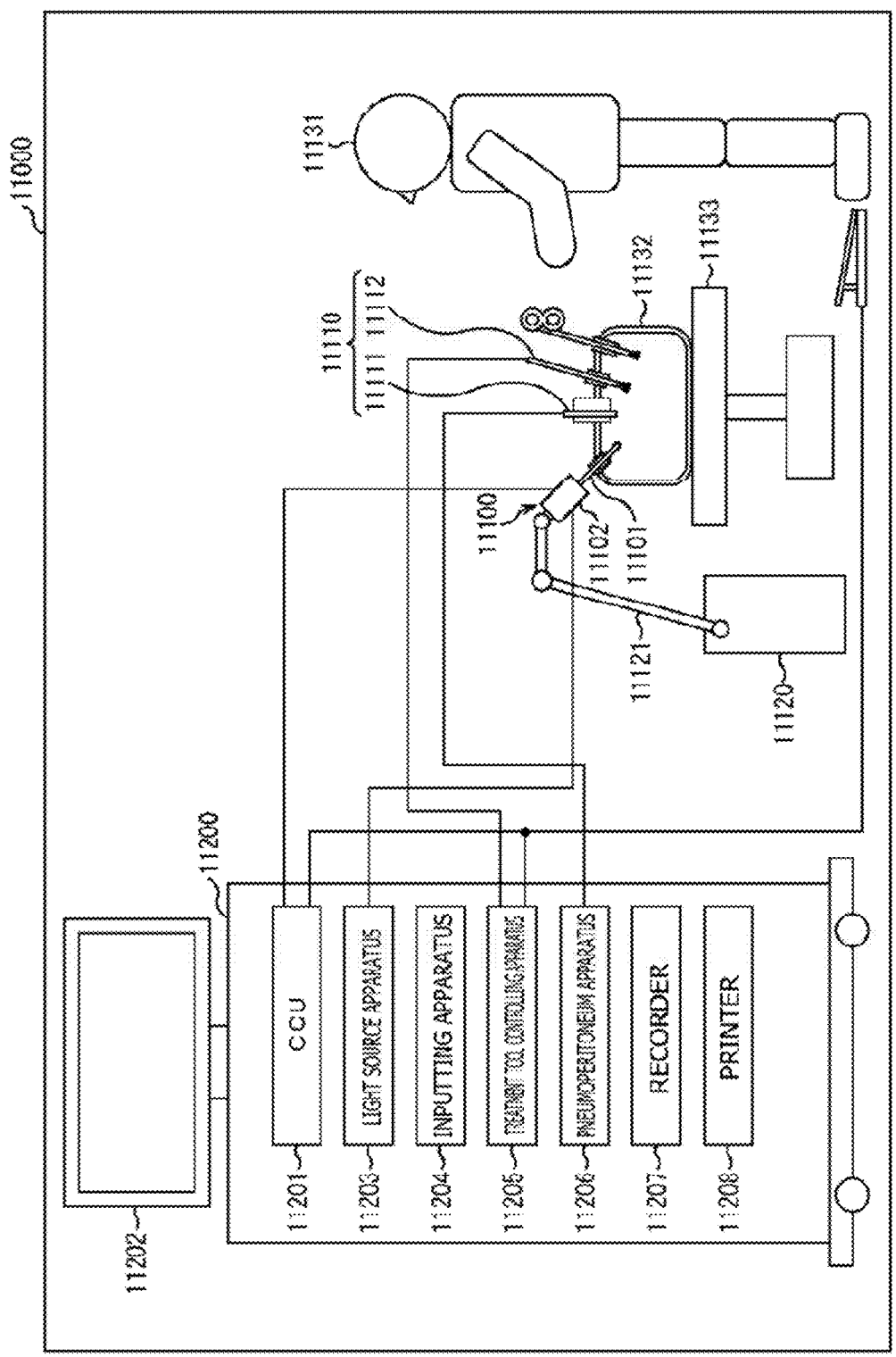
[FIG. 23]

[FIG. 24]
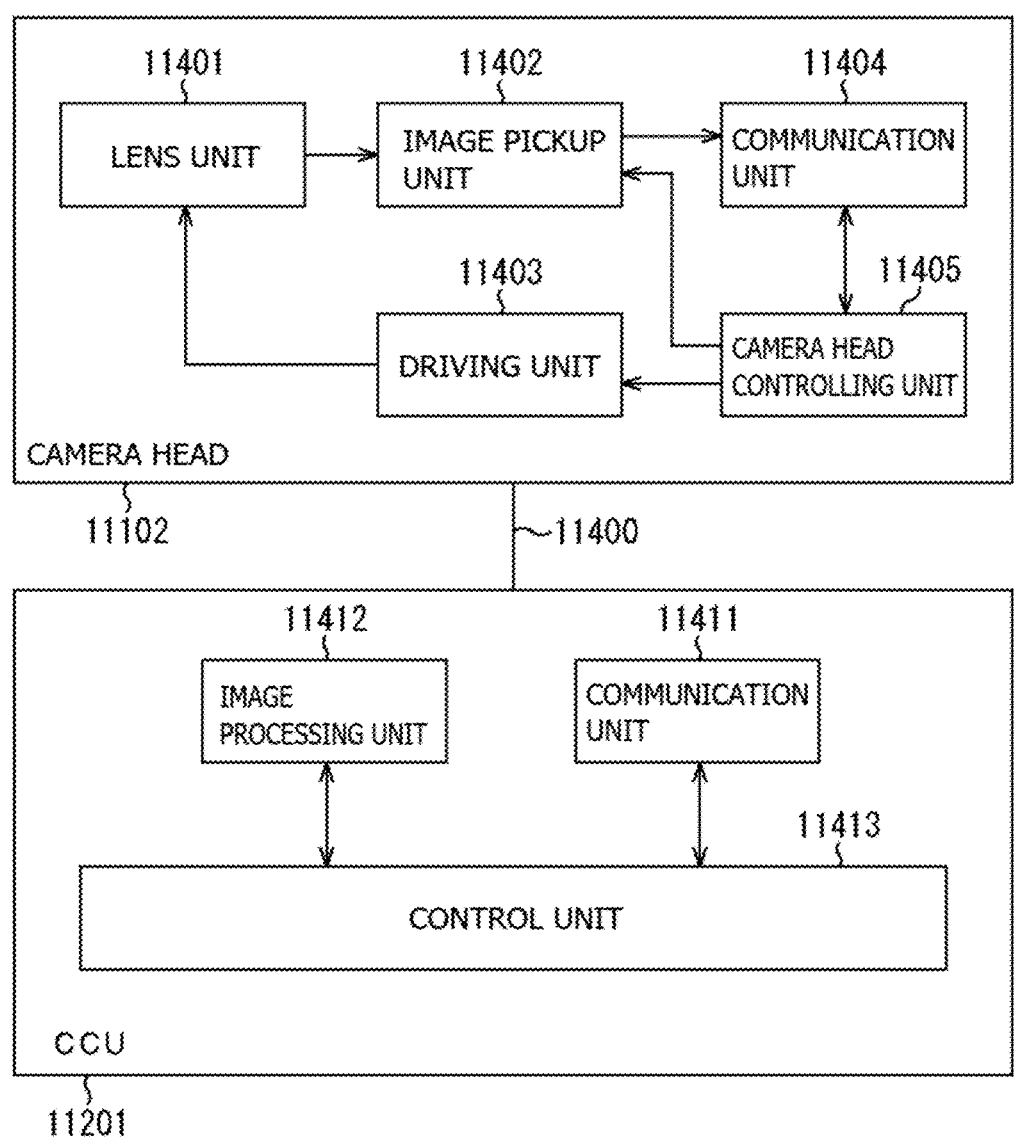

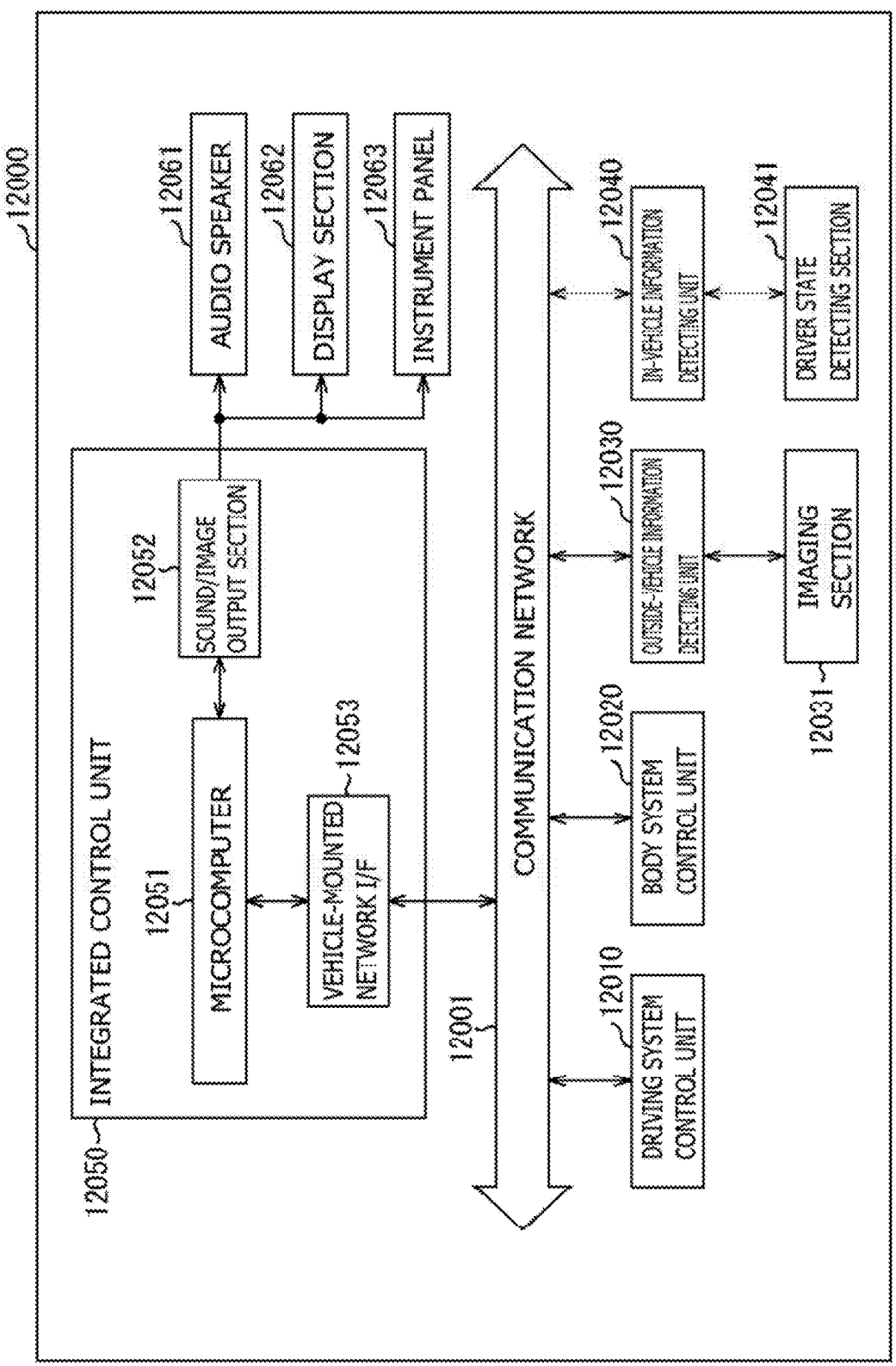
[FIG. 25]

[FIG. 26]
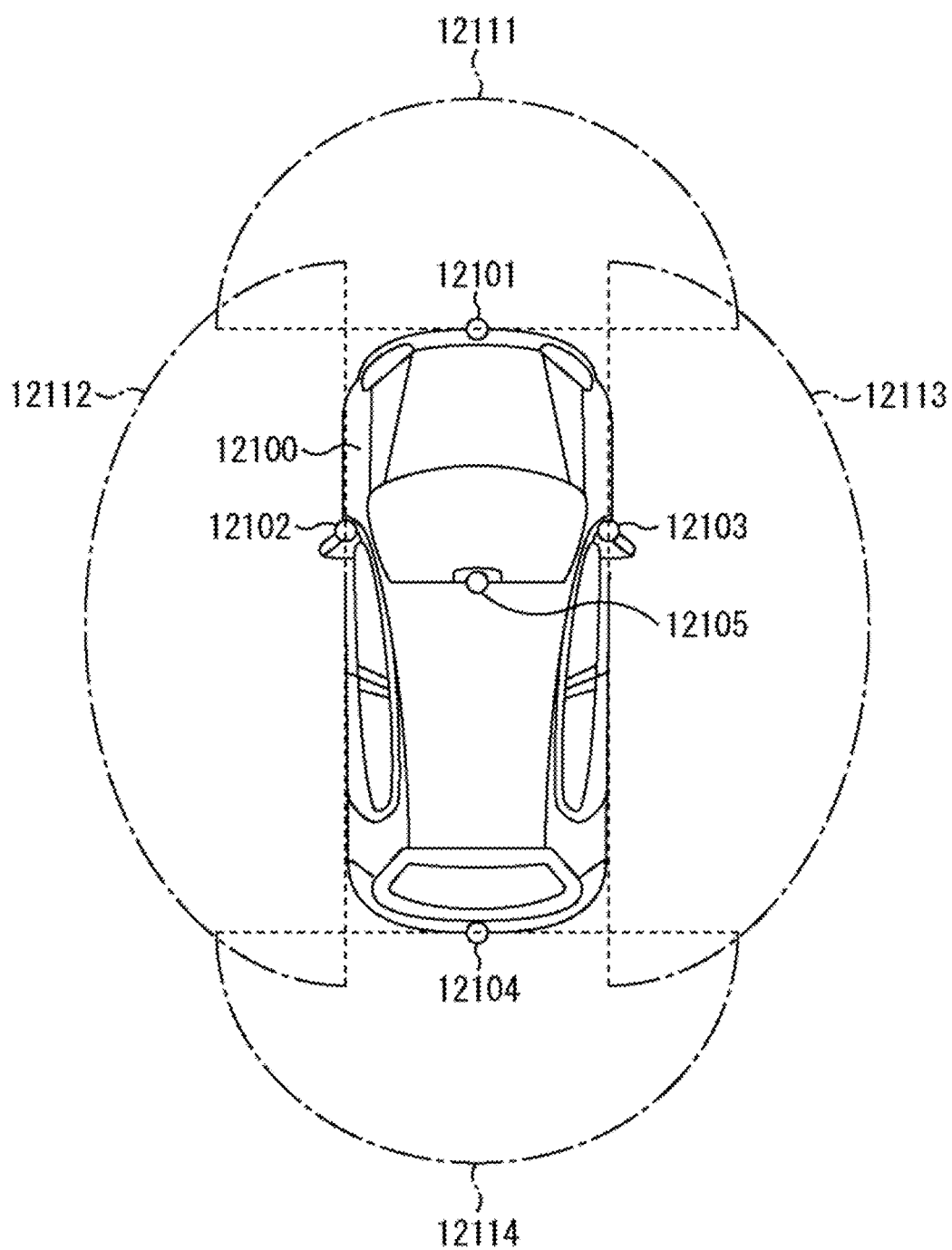

[FIG. 27]
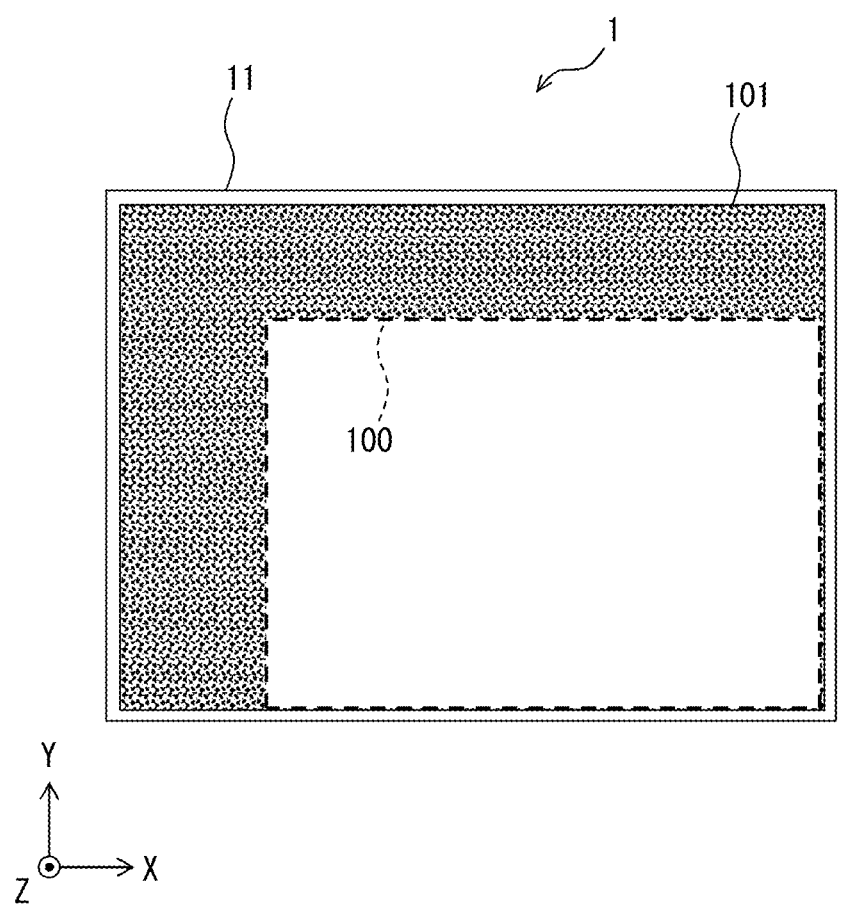

[FIG. 28]
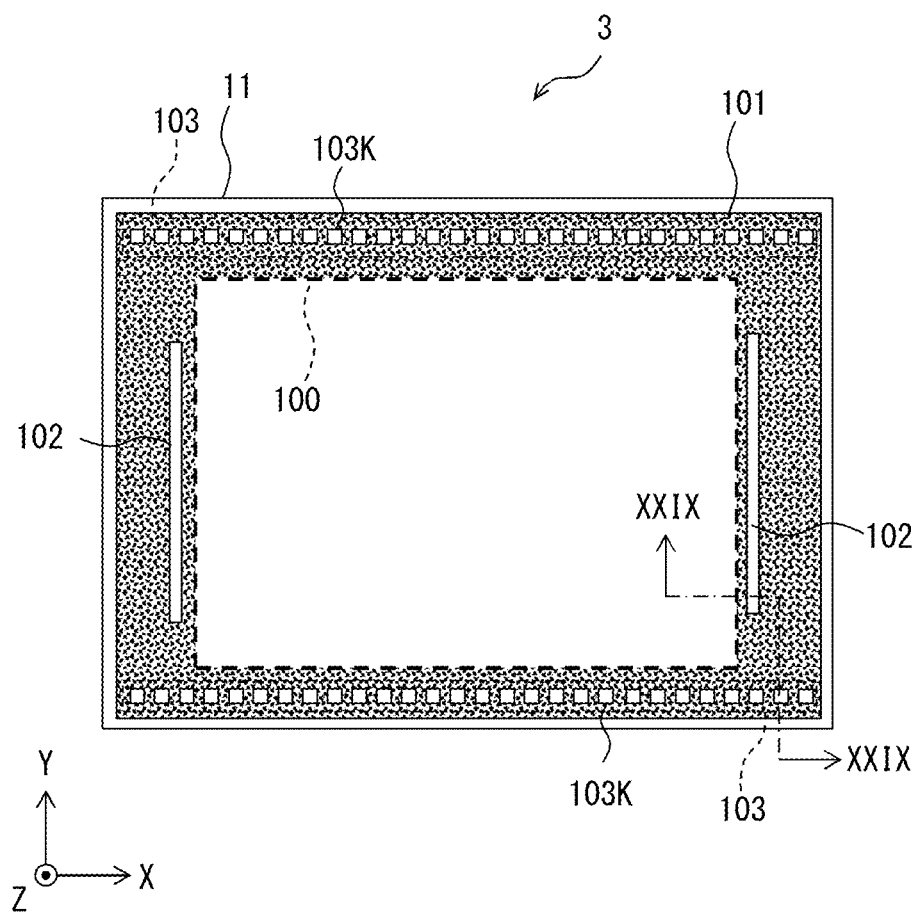

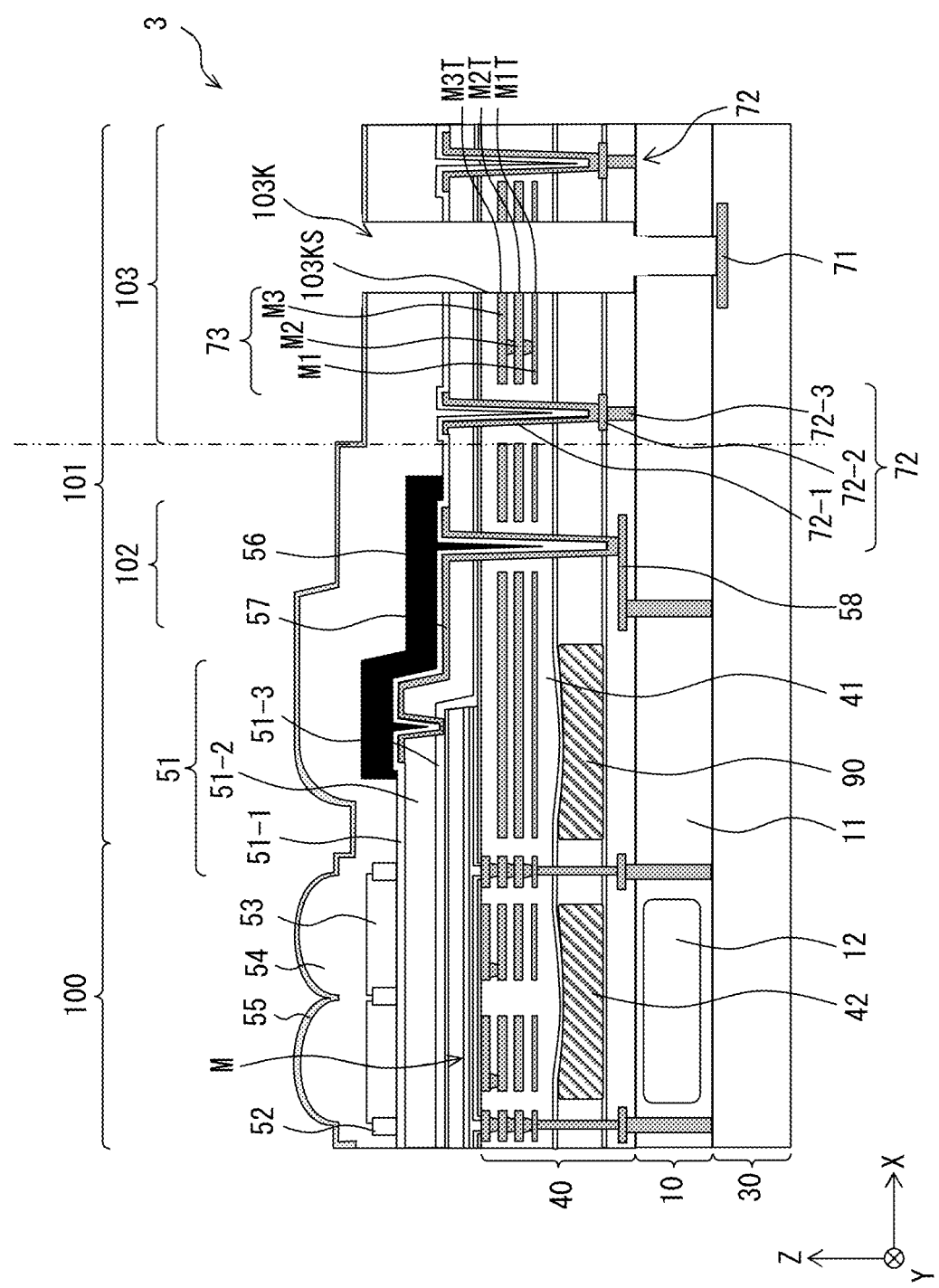
[FIG. 29]

[FIG. 30]
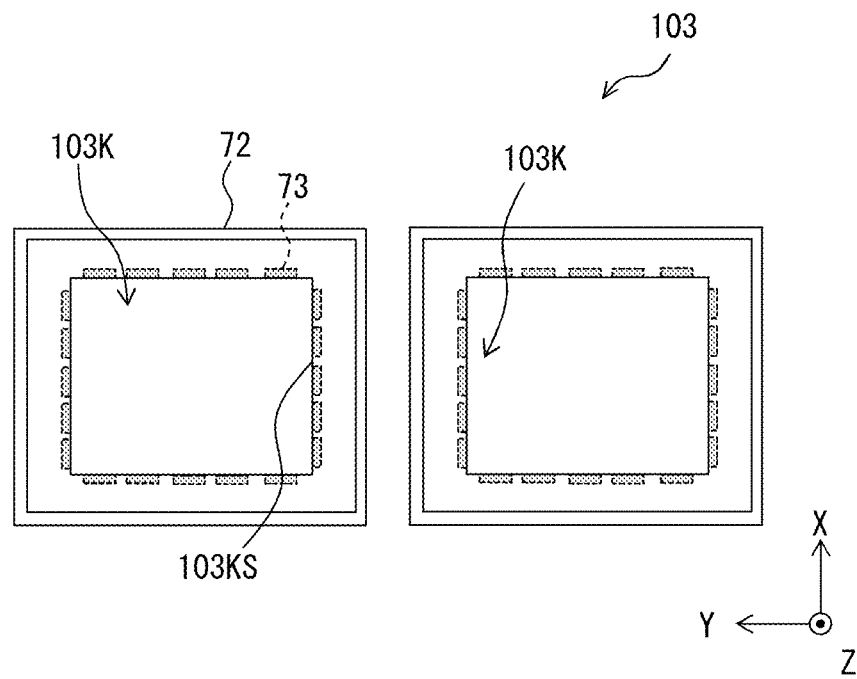
[FIG. 31A]
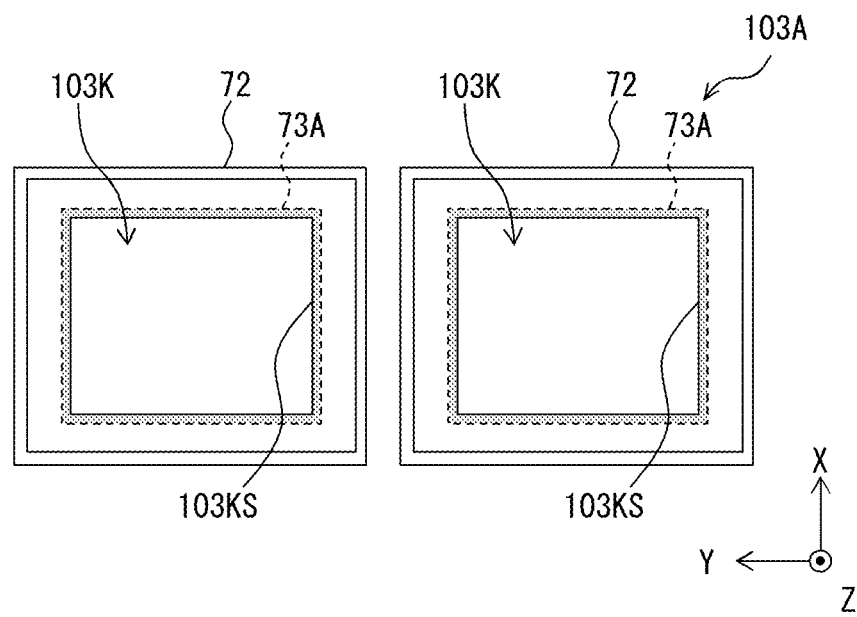

[FIG. 31B]
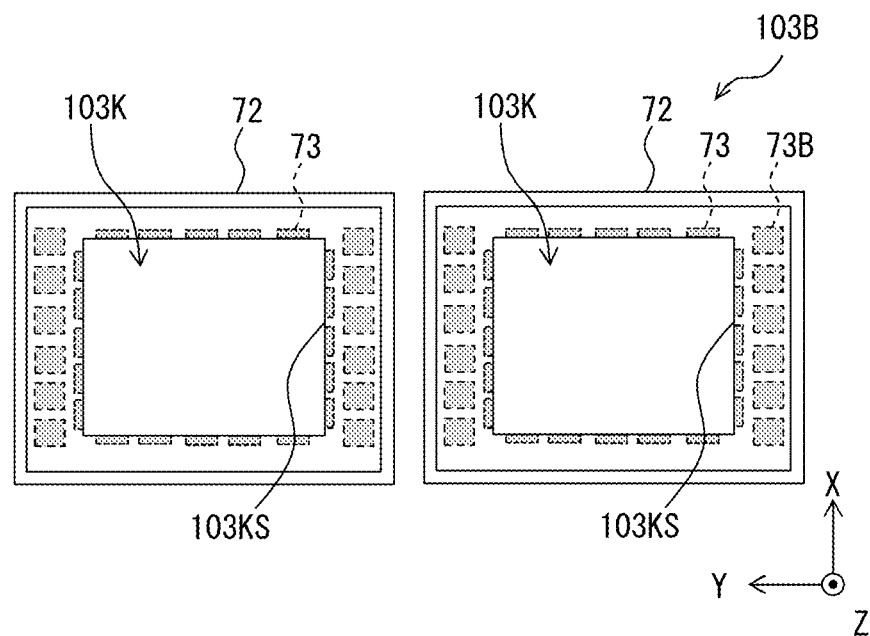
[FIG. 31C]
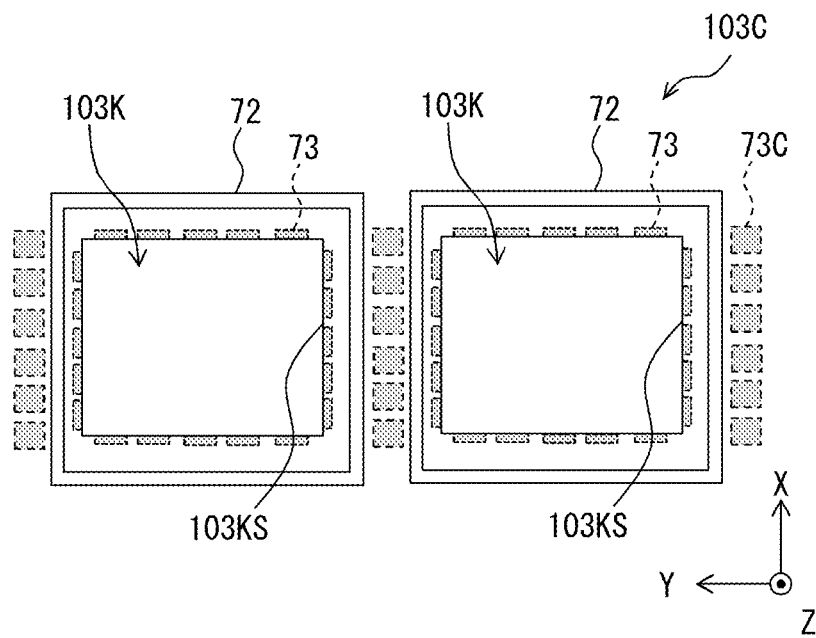

[FIG. 31D]
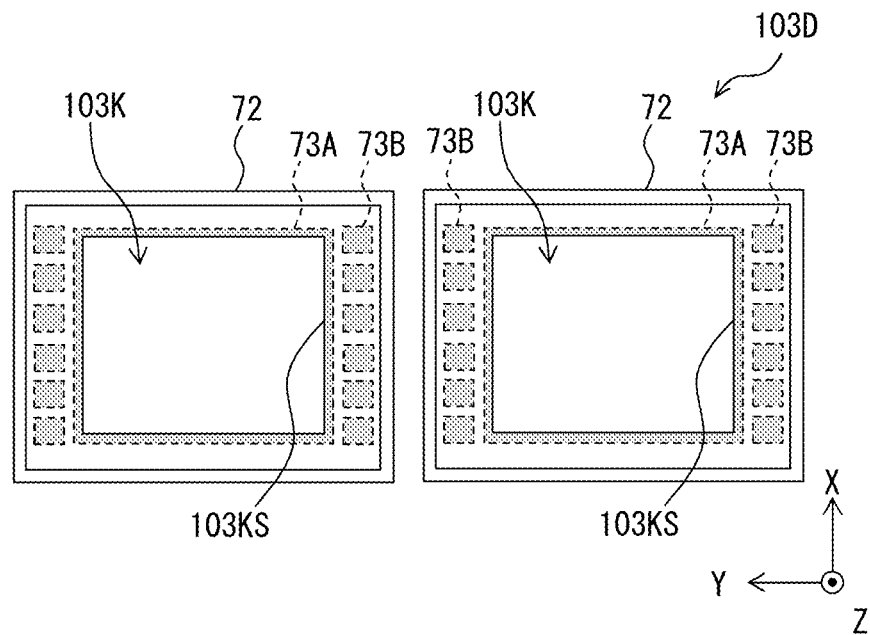
[FIG. 31E]
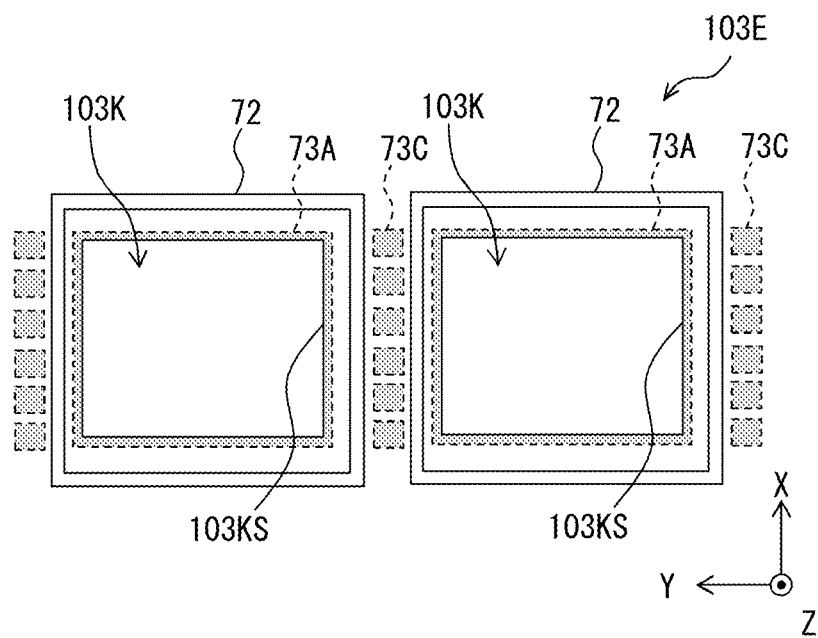

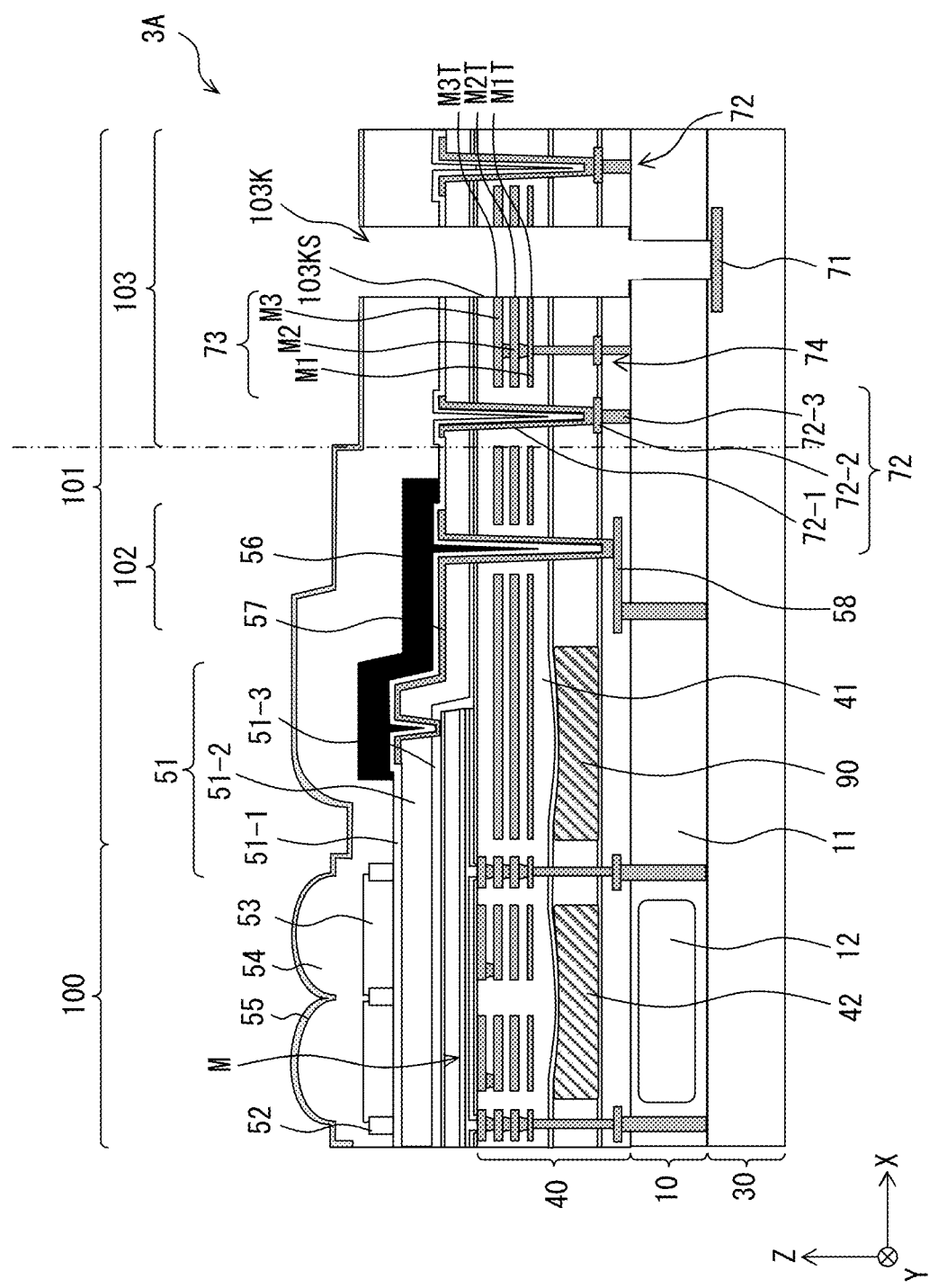
[FIG. 32]

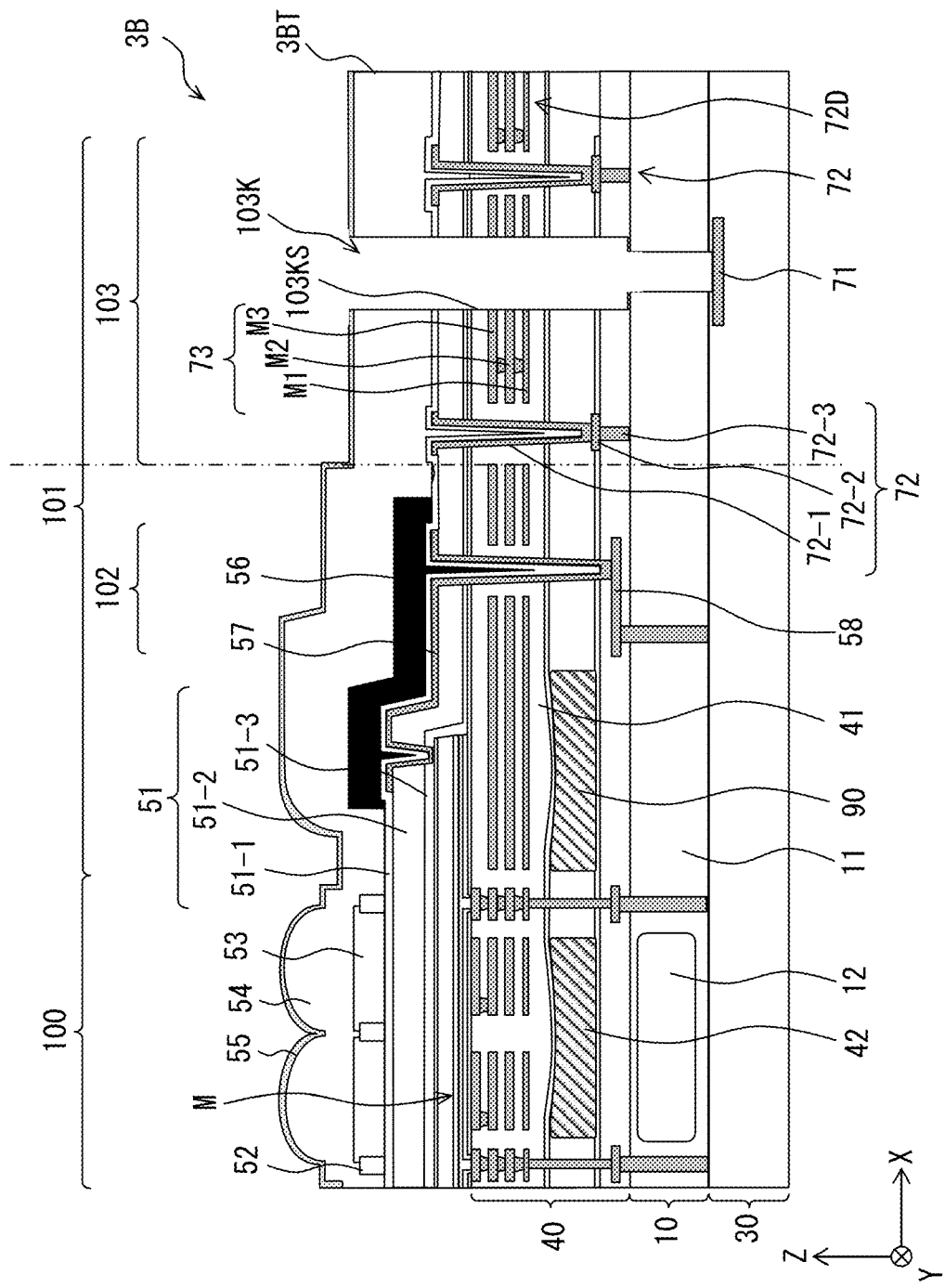
[FIG. 33]

[FIG. 34]
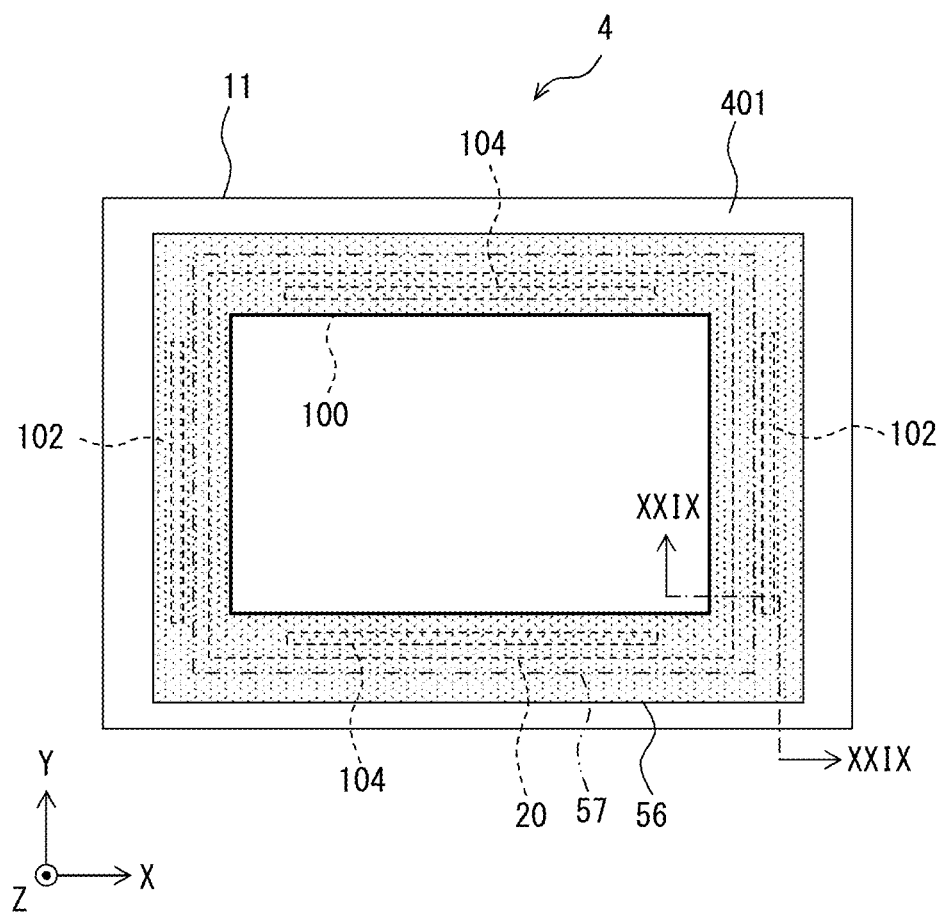

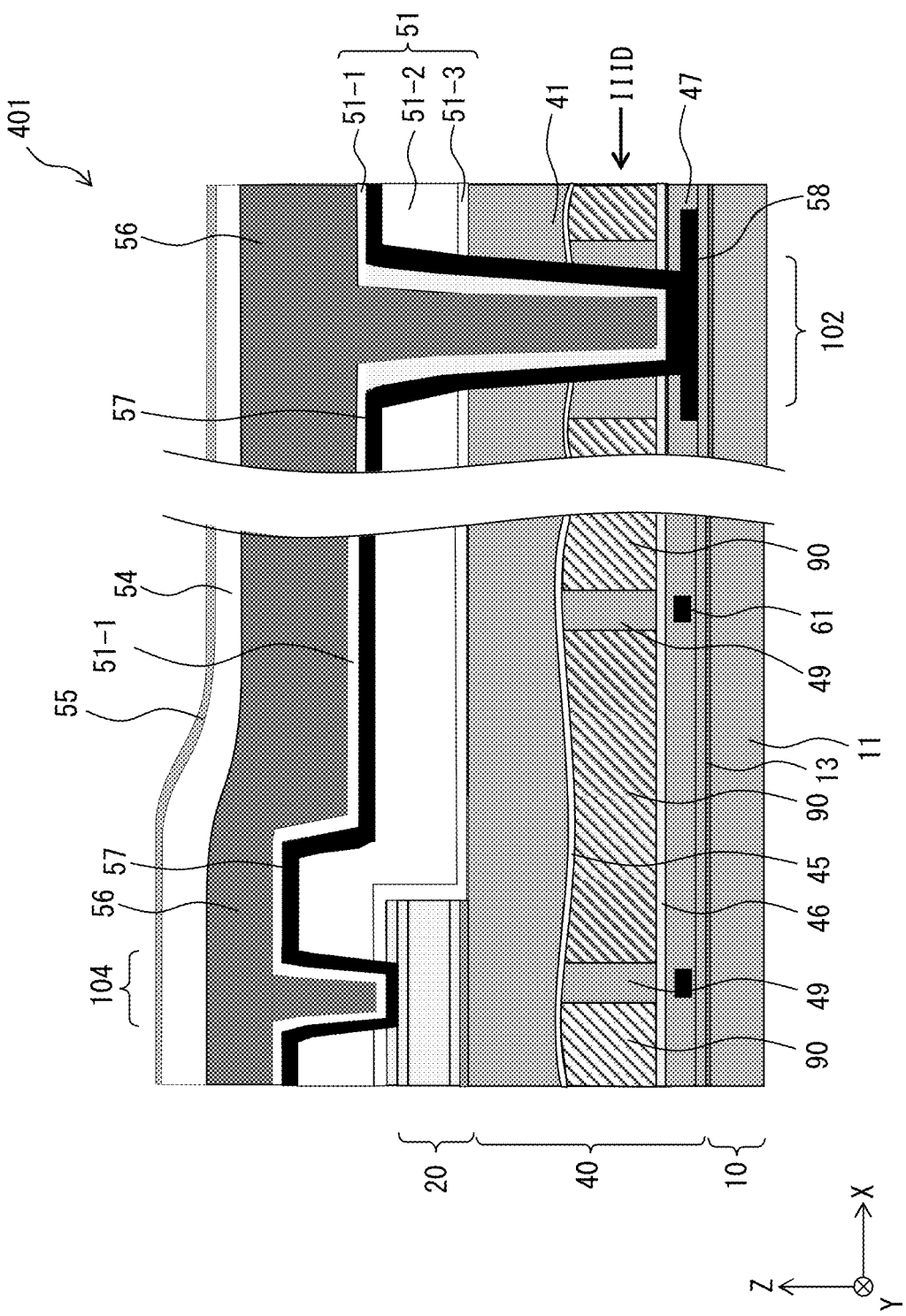
[FIG. 35]

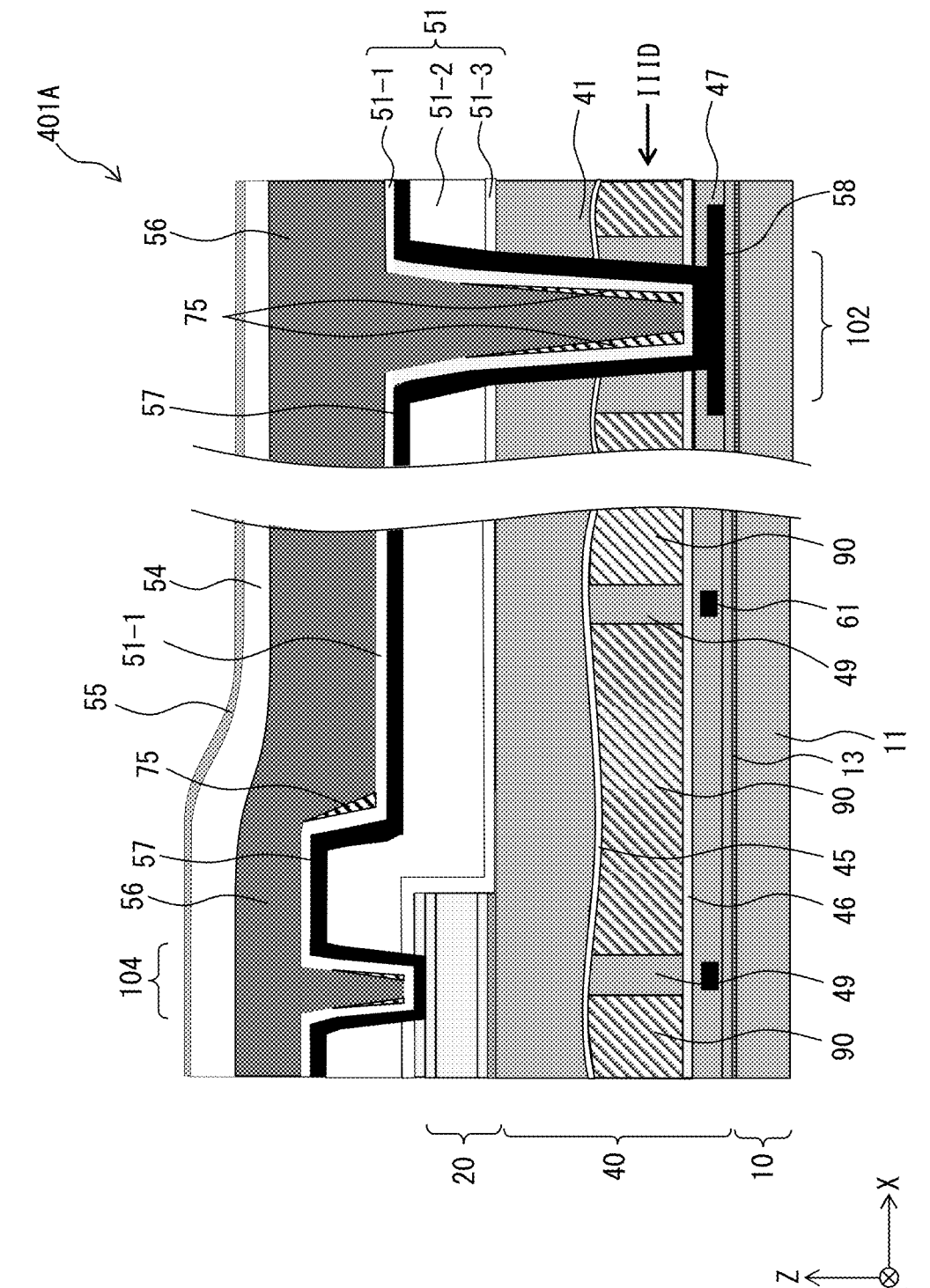
[FIG. 36]

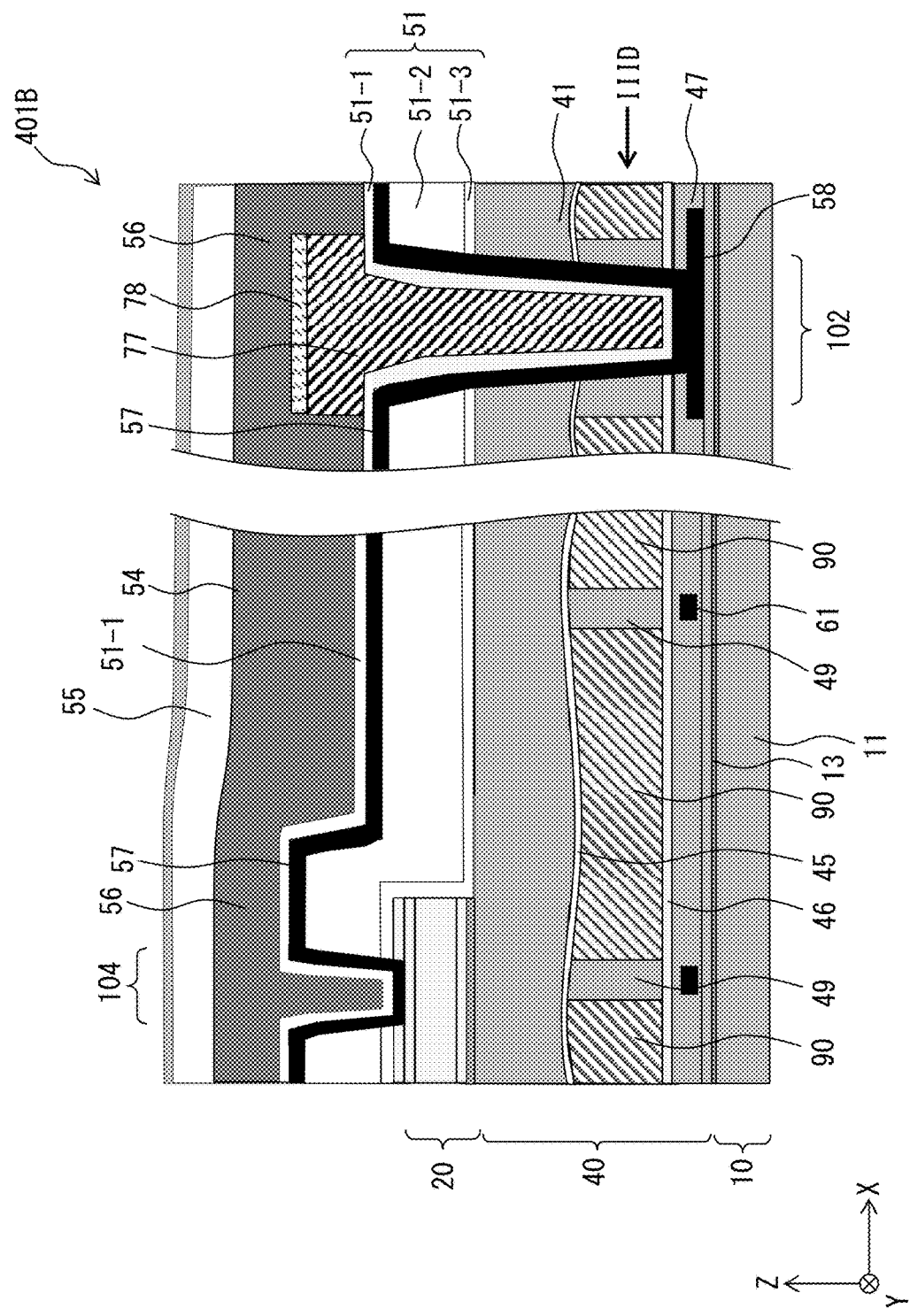
[FIG. 37]

LIGHT DETECTION APPARATUS, LIGHT DETECTION SYSTEM, ELECTRONIC EQUIPMENT, AND MOBILE BODY

CROSS REFERENCE TO RELATED APPLICATIONS

This application is a U.S. National Phase of International Patent Application No. PCT/JP2021/038761 filed on Oct. 20, 2021, which claims priority benefit of Japanese Patent Application No. JP 2020-208717 filed in the Japan Patent Office on Dec. 16, 2020. Each of the above-referenced applications is hereby incorporated herein by reference in its entirety.

TECHNICAL FIELD

The present disclosure relates to a light detection apparatus, a light detection system, electronic equipment, and a mobile body each including a photoelectric converter that performs photoelectric conversion.

BACKGROUND ART

A solid-state imaging apparatus has been proposed that has a stacked structure of a first photoelectric conversion region that mainly receives visible light and performs photoelectric conversion and a second photoelectric conversion region that mainly receives infrared light and performs photoelectric conversion (refer to PTL 1, for example).

CITATION LIST

Patent Literature

PTL 1: Japanese Unexamined Patent Application Publication No. 2017-208496

SUMMARY OF THE INVENTION

Meanwhile, there has been a demand for an improvement in a function of a solid-state imaging apparatus.

Accordingly, it is desired to provide a light detection apparatus having high functionality.

A light detection apparatus according to an embodiment of the present disclosure includes an effective region provided with a photoelectric converter that detects irradiation light and performs photoelectric conversion, and a peripheral region provided adjacent to the effective region. The photoelectric converter has a stacked structure including a first photoelectric conversion unit, a second photoelectric conversion unit, and a first optical filter. The first photoelectric conversion unit detects light in a first wavelength range of the irradiation light and performs photoelectric conversion. The second photoelectric conversion unit is provided so as to overlap with the first photoelectric conversion unit, detects light in a second wavelength range of the irradiation light, and performs photoelectric conversion. The optical filter is provided between the first photoelectric conversion unit and the second photoelectric conversion unit and through which the light in the second wavelength range transmits more easily than the light in the first wavelength range. The peripheral region is provided with a second optical filter through which the light in the second wavelength range transmits more easily than the second wavelength range.

According to the light detection apparatus according to an embodiment of the present disclosure, the second optical filter through which the light in the second wavelength range transmits more easily than the light in the first wavelength range is provided also in the peripheral region provided adjacent to the effective region that detects the light in the first wavelength range and performs photoelectric conversion. Thus, it is possible to prevent the light in the first wavelength range of unwanted light incident on the peripheral region from entering the second photoelectric conversion unit directly or through the optical filter.

BRIEF DESCRIPTION OF DRAWINGS

FIG. 1A is a schematic configuration diagram illustrating an exemplary solid-state imaging apparatus according to a first embodiment of the present disclosure.

FIG. 1B is an explanatory diagram schematically illustrating a configuration example of a pixel unit illustrated in FIG. 1A and a periphery of the pixel unit.

FIG. 2A is a vertical cross-sectional view illustrating an exemplary schematic configuration of an imaging element applied to the pixel unit illustrated in FIG. 1A.

FIG. 2B is a horizontal cross-sectional view illustrating an exemplary schematic configuration of the imaging element applied to the pixel unit illustrated in FIG. 1A.

FIG. 2C is another horizontal cross-sectional view illustrating an exemplary schematic configuration of the imaging element applied to the pixel unit illustrated in FIG. 1A.

FIG. 3A is a vertical cross-sectional view illustrating a main portion of the imaging element illustrated in FIG. 2A in an enlarged manner.

FIG. 3B is another vertical cross-sectional view illustrating a main portion of the imaging element illustrated in FIG. 2A in an enlarged manner.

FIG. 3C is a vertical cross-sectional view illustrating an exemplary schematic configuration in the periphery illustrated in FIG. 1B.

FIG. 3D is a horizontal cross-sectional view illustrating a portion of the periphery illustrated in FIG. 3C in an enlarged manner.

FIG. 4A is a schematic cross-sectional view illustrating a through-electrode and a periphery of the through-electrode illustrated in FIG. 2A in an enlarged manner.

FIG. 4B is a schematic plan view illustrating the through-electrode and the periphery of the through-electrode illustrated in FIG. 2A in an enlarged manner.

FIG. 5 is a circuit diagram illustrating an exemplary read-out circuit of an iTOF sensor illustrated in FIG. 2A.

FIG. 6 is a circuit diagram illustrating an exemplary read-out circuit of an organic photoelectric conversion unit illustrated in FIG. 2A.

FIG. 7 is a cross-sectional view illustrating an exemplary schematic configuration of an imaging element according to a first modification example of the first embodiment applied to the pixel unit illustrated in FIG. 1A.

FIG. 8A is a horizontal cross-sectional view of an exemplary schematic configuration of an imaging element according to a second modification example of the first embodiment applied to the pixel unit illustrated in FIG. 1B.

FIG. 8B is a horizontal cross-sectional view illustrating an example of a periphery of the imaging element according to the second modification example of the first embodiment illustrated in FIG. 8A.

FIG. 9A is a vertical cross-sectional view illustrating a main portion of the imaging element illustrated in FIG. 8A in an enlarged manner.

FIG. 9B is another vertical cross-sectional view illustrating the main portion of the imaging element illustrated in FIG. 8A in an enlarged manner.

FIG. 9C is a vertical cross-sectional view illustrating an exemplary schematic configuration of the periphery illustrated in FIG. 8B.

FIG. 10A is a vertical cross-sectional view illustrating a main portion of an imaging element according to a third modification example of the first embodiment applied to the pixel unit illustrated in FIG. 1A in an enlarged manner.

FIG. 10B is another vertical cross-sectional view illustrating the main portion of the imaging element according to the third modification example of the first embodiment applied to the pixel unit illustrated in FIG. 1A in an enlarged manner.

FIG. 10C is a vertical cross-sectional view illustrating an exemplary schematic configuration of the periphery illustrated in FIG. 10B.

FIG. 11A is a vertical cross-sectional view of a main portion of an imaging element according to a fourth modification example of the first embodiment applied to the pixel unit illustrated in FIG. 1A in an enlarged manner.

FIG. 11B is another vertical cross-sectional view of the main portion of the imaging element according to the fourth modification example of the first embodiment applied to the pixel unit illustrated in FIG. 1A in an enlarged manner.

FIG. 11C is a vertical cross-sectional view illustrating an exemplary schematic configuration of the periphery illustrated in FIG. 11B.

FIG. 12A is a vertical cross-sectional view of a main portion of an imaging element according to a fifth modification example of the first embodiment applied to the pixel unit illustrated in FIG. 1A in an enlarged manner.

FIG. 12B is another vertical cross-sectional view of the main portion of the imaging element according to the fifth modification example of the first embodiment illustrated in FIG. 1A in an enlarged manner.

FIG. 12C is a vertical cross-sectional view illustrating an exemplary schematic configuration of the periphery illustrated in FIG. 12B.

FIG. 13 is a horizontal cross-sectional view illustrating an exemplary schematic configuration of an imaging element according to a sixth modification example of the first embodiment applied to the pixel unit illustrated in FIG. 1A.

FIG. 14A is a vertical cross-sectional view of a main portion of the imaging element according to the sixth modification example of the first embodiment illustrated in FIG. 13 in an enlarged manner.

FIG. 14B is a vertical cross-sectional view illustrating an exemplary schematic configuration of the periphery illustrated in FIG. 14A.

FIG. 15A is a vertical cross-sectional view illustrating an exemplary schematic configuration of an imaging element applied to a pixel unit of a solid-state imaging apparatus according to a second embodiment of the present disclosure.

FIG. 15B is a vertical cross-sectional view illustrating an exemplary schematic configuration of a black level reference element applied to the periphery of the solid-state imaging apparatus according to the second embodiment of the present disclosure.

FIG. 16 is a schematic cross-sectional view illustrating an exemplary schematic configuration of an imaging element according to a first modification example of the second embodiment applied to the periphery illustrated in FIG. 15B.

FIG. 17 is a schematic cross-sectional view illustrating an exemplary schematic configuration of an imaging element according to a second modification example of the second embodiment applied to the periphery illustrated in FIG. 15B.

FIG. 18 is a schematic cross-sectional view illustrating an exemplary schematic configuration of an imaging element according to a third modification example of the second embodiment applied to the periphery illustrated in FIG. 15B.

FIG. 19 is a schematic cross-sectional view illustrating an exemplary schematic configuration of an imaging element according to a fourth modification example of the second embodiment applied to the periphery illustrated in FIG. 15B.

FIG. 20A is a schematic diagram illustrating an exemplary overall configuration of a light detection system according to a third embodiment of the present disclosure.

FIG. 20B is a schematic diagram illustrating an exemplary circuit configuration of the light detection system illustrated in FIG. 20A.

FIG. 21 is a schematic diagram illustrating an exemplary overall configuration of electronic equipment.

FIG. 22 is a block diagram depicting an example of a schematic configuration of an in-vivo information acquisition system.

FIG. 23 is a view depicting an example of a schematic configuration of an endoscopic surgery system.

FIG. 24 is a block diagram depicting an example of a functional configuration of a camera head and a camera control unit (CCU).

FIG. 25 is a block diagram depicting an example of schematic configuration of a vehicle control system.

FIG. 26 is a diagram of assistance in explaining an example of installation positions of an outside-vehicle information detecting section and an imaging section.

FIG. 27 is an explanatory diagram schematically illustrating another configuration example of the pixel unit and the periphery of the pixel unit illustrated in FIG. 1A.

FIG. 28 is a plan view schematically illustrating a configuration example of a pixel unit and a periphery of the pixel unit of a solid-state imaging apparatus according to another first modification example of the present disclosure.

FIG. 29 is a vertical cross-sectional view illustrating an exemplary schematic configuration of the pixel unit and the periphery illustrated in FIG. 28.

FIG. 30 is a schematic plan view illustrating the vicinity of a pad opening region illustrated in FIG. 29 in an enlarged manner.

FIG. 31A is a schematic plan view illustrating the vicinity of the pad opening region illustrated in FIG. 29 in an enlarged manner.

FIG. 31B is a schematic plan view illustrating the vicinity of the pad opening region illustrated in FIG. 29 in an enlarged manner.

FIG. 31C is a schematic plan view illustrating the vicinity of the pad opening region illustrated in FIG. 29 in an enlarged manner.

FIG. 31D is a schematic plan view illustrating the vicinity of the pad opening region illustrated in FIG. 29 in an enlarged manner.

FIG. 31E is a schematic plan view illustrating the vicinity of the pad opening region illustrated in FIG. 29 in an enlarged manner.

FIG. 32 is a vertical cross-section schematically illustrating a configuration example of a pixel unit and the periphery of the pixel unit of a solid-state imaging apparatus according to another second modification example of the present disclosure.

FIG. 33 is a vertical cross-section schematically illustrating a configuration example of a pixel unit and the periphery of the pixel unit of a solid-state imaging apparatus according to another third modification example of the present disclosure.

FIG. 34 is a plan view schematically illustrating a configuration example of a pixel unit and the periphery of the pixel unit of a solid-state imaging apparatus according to another fourth modification example of the present disclosure.

FIG. 35 is a vertical cross-section schematically illustrating a configuration example of a pixel unit and the periphery of the pixel unit of a solid-state imaging apparatus according to the other fourth modification example of the present disclosure.

FIG. 36 is a vertical cross-section schematically illustrating a configuration example of a pixel unit and the periphery of the pixel unit of a solid-state imaging apparatus according to another fifth modification example of the present disclosure.

FIG. 37 is a vertical cross-section schematically illustrating a configuration example of a pixel unit and the periphery of the pixel unit of a solid-state imaging apparatus according to a sixth modification example of the present disclosure.

MODES FOR CARRYING OUT THE INVENTION

In the following, some embodiments of the present disclosure are described in detail with reference to the drawings. It is to be noted that the description is given in the following order.

1. First Embodiment
An exemplary solid-state imaging apparatus in which an optical filter is provided also in a periphery surrounding a pixel unit including longitudinal spectroscopic imaging elements
2. Second Embodiment
An exemplary imaging element in which a black level reference element including two or more light shielding films is provided in the periphery surrounding the pixel unit including the longitudinal spectroscopic imaging elements
3. Third Embodiment
An exemplary light detection system including a light emission apparatus and a light detection apparatus
4. Exemplary Application to Electronic Equipment
5. Application Example to In-vivo Information Acquisition System
6. Application Example to Endoscopic Surgery System
7. Exemplary Application to Mobile Body
8. Other Modification Example

1. First Embodiment

[Configuration of Solid-State Imaging Apparatus 1]
(Exemplary Overall Configuration)

FIG. 1A illustrates an exemplary overall configuration of a solid-state imaging apparatus 1 according to a first embodiment of the present disclosure. FIG. 1B is a schematic diagram illustrating a pixel unit 100 and a periphery of the pixel unit 100 in an enlarged manner. The solid-state imaging apparatus 1 is a complementary metal oxide semiconductor (CMOS) image sensor. The solid-state imaging apparatus 1 receives incident light (image light) from an object through an optical lens system, for example, converts the incident light focused on an imaging face into an electric signal on a pixel unit basis, and outputs the electric signal as a pixel signal. The solid-state imaging apparatus 1 includes, for example, the pixel unit 100 as an effective region, and a peripheral unit 101 as a peripheral region adjacent to the pixel unit 100 on a semiconductor substrate 11. The peripheral unit 101 is provided so as to surround the pixel unit 100, for example. The peripheral unit 101 includes a vertical drive circuit 111, column signal processing circuits 112, a horizontal drive circuit 113, an output circuit 114, a control circuit 115, and an input-output terminal 116, for example.

It is to be noted that the solid-state imaging apparatus 1 is a specific example corresponding to a "light detection apparatus" of the present disclosure.

As illustrated in FIG. 1A, the pixel unit 100 includes multiple pixels P arranged in a two-dimensional matrix, for example. In a portion of the peripheral unit 101, a contact region 102 to which a contact layer 57 to be described later and a lead-out wire 58 to be described later are coupled. The pixel unit 100 includes, for example, multiple pixel rows each including multiple pixels P arranged in a horizontal direction (a lateral direction of the drawing) and multiple pixel columns each including multiple pixels P arranged in a vertical direction (a longitudinal direction of the drawing). In the pixel unit 100, for example, one pixel drive line Lread (a row selection line or a reset control line) is provided for each pixel row, and one vertical signal line Lsig is provided for each pixel column. The pixel drive line Lread transmits a drive signal to read a signal from each pixel P. Ends of the multiple pixel drive lines Lread are coupled to multiple output terminals of the vertical drive circuit 111 corresponding to the respective pixel rows. Further, an optical filter 90 to be described later is provided in the peripheral unit 101.

The vertical drive circuit 111 is configured by a shift register or an address decoder, for example. The vertical drive circuit 111 is a pixel drive unit that drives each pixel P in the pixel unit 100 on a pixel-row unit basis, for example. A signal outputted from each pixel P of a pixel row selectively scanned by the vertical drive circuit 111 is supplied to the column signal processing circuit 112 via a corresponding vertical signal line Lsig.

The column signal processing circuit 112 is configured by an amplifier and a horizontal selection switch that are provided for each vertical signal line Lsig, for example.

The horizontal drive circuit 113 is configured by a shift register and an address decoder, for example. The horizontal drive circuit 113 drives the horizontal selection switches of the column signal processing circuits 112 in sequence while scanning the horizontal selection switches. Owing to the selective scanning by the horizontal drive circuit 113, the signal of each pixel P transmitted via each of the multiple vertical signal lines Lsig is sequentially outputted to the horizontal signal line 121, and transmitted via the horizontal signal line 121 to the outside of the semiconductor substrate 11.

The output circuit 114 conducts signal processing on the signals sequentially supplied from the column signal processing circuits 112 via the horizontal signal line 121, and outputs the resultant signals. For example, the output circuit 114 performs only buffering in some cases, and performs a black level adjustment, column variation correction, and a variety of digital signal processing in other cases.

A circuit portion including the vertical drive circuit 111, the column signal processing circuits 112, the horizontal drive circuit 113, the horizontal signal line 121, and the output circuit 114 may be formed directly on the semiconductor substrate 11, or may be provided on an external control IC. Alternatively, the circuit portion may be formed on another substrate coupled with a cable, for example.

The control circuit 115 receives, for example, a clock or data on a command for an operation mode supplied from the outside of the semiconductor substrate 11, and outputs data such as internal information on the pixels P that are imaging elements. The control circuit 115 further includes a timing generator that generates various timing signals. On the basis of the various timing signals generated by the timing generator, the control circuit 115 controls driving of peripheral circuitry including the vertical drive circuit 111, the column signal processing circuits 112, and the horizontal drive circuit 113.

The input-output terminal 116 exchanges signals with an external device.

(Exemplary Cross-Sectional Configuration of Pixel P)

FIG. 2A schematically illustrates an exemplary vertical cross-sectional configuration, along a thickness direction, of one pixel P1 of the multiple pixels P arranged in a matrix in the pixel unit 100. FIG. 2B schematically illustrates an exemplary horizontal cross-sectional configuration along a lamination plane direction perpendicular to the thickness direction at a height position in a Z-axis direction indicated by an arrow IIB in FIG. 2A. Further, FIG. 2C schematically illustrates an exemplary horizontal cross-sectional configuration along the lamination plane direction perpendicular to the thickness direction at a height position in the Z-axis direction indicated by an arrow IIC in FIG. 2A. In FIGS. 2A, 2B, and 2C, the thickness direction (lamination direction) of the pixel P1 is the Z-axis direction, and planar directions parallel to the lamination plane perpendicular to the Z-axis direction are an X-axis direction and a Y-axis direction. It is to be noted that the X-axis direction, the Y-axis direction, and the Z-axis direction are perpendicular to each other.

As illustrated in FIG. 2A, the pixel P1 is a so-called longitudinal spectroscopic imaging element having a structure including one photoelectric conversion unit 10 and one organic photoelectric conversion unit 20 that are stacked in the Z-axis direction or the thickness direction, for example. The pixel P1 that is an imaging element is a specific example corresponding to a "light detection element" of the present disclosure. The pixel P1 further includes an intermediate layer 40 provided between the photoelectric conversion unit 10 and the organic photoelectric conversion unit 20, and a multilayer wiring layer 30 provided opposite to the organic photoelectric conversion unit 20 as seen from the photoelectric conversion unit 10. Further, as seen from the organic photoelectric conversion unit 20, on a light incident side opposite to the photoelectric conversion unit 10, a sealing film 51, a partition wall 52, multiple color filters 53, and a lens layer 54 including on-chip lenses (OCL) provided corresponding to the respective color filters 53 are stacked in order along the Z-axis direction from a position close to the organic photoelectric conversion unit 20, for example. The partition wall 52 may include a low reflective index material, such as SiOx, having a lower reflective index than that of the color filter 53, for example. It is to be noted that the sealing film 51 and the partition wall 52 may be common between the multiple pixels P. The sealing film 51 has a stacked structure including transparent insulating films 51-1 to 51-3 such as AlOx. Further, an antireflection film 55 (illustrated in FIG. 3A to be described later) may be provided so as to cover the lens layer 54. A black filter 56 (illustrated in FIG. 3A to be described later) may be provided in the peripheral unit 101. The multiple color filters 53 may each include, for example, a color filter that passes mainly red light, a color filter that passes mainly green light, and a color filter that passes mainly blue light. It is to be noted that each pixel P1 of the present embodiment includes red, green, and blue color filters 53, and the organic photoelectric conversion unit 20 receives red light, green light, and blue light to obtain a colored visible light image.

(Photoelectric Conversion Unit 10)

The photoelectric conversion unit 10 is an indirect TOF (hereinafter referred to as iTOF) sensor that acquires an distance image (distance information) on the basis of Time-of-Flight (TOF), for example. The photoelectric conversion unit 10 includes, for example, the semiconductor substrate 11, a photoelectric conversion region 12, a fixed charge layer 13, a pair of transfer transistors (TGs) 14A and 14B, charge-voltage converters (FDs) 15A an 15B that are floating diffusion regions, an inter-pixel region light shielding wall 16, and a through-electrode 17.

The semiconductor substrate 11 is, for example, an n-type silicon (Si) substrate having a front face 11A and a rear face 11B. The semiconductor substrate 11 has a p-well in a predetermined region. The front face 11A faces the multilayer wiring layer 30. The rear face 11B faces the intermediate layer 40. The rear face 11B preferably has a micro-irregular structure (RIG structure). One reason for this is that light having a wavelength in an infrared light range as a second wavelength range (e.g., a wavelength within a range from 880 nm or greater to 1040 nm or less) and incident on the semiconductor substrate 11 is effectively confined inside the semiconductor substrate 11. It is to be noted that the front face 11A may also have a similar micro-irregular structure.

The photoelectric conversion region 12 is, for example, a photoelectric converter configured by a positive intrinsic negative (PIN) photodiode (PD), and includes a pn junction formed in a predetermined region of the semiconductor substrate 11. Out of the light received from the object, light having a wavelength particularly in the infrared light range is detected and received by the photoelectric conversion region 12. The photoelectric conversion region 12 generates an electric charge corresponding to the amount of received light through photoelectric conversion and accumulates the electric charge.

The fixed charge layer 13 is provided so as to cover the rear face 11B of the semiconductor substrate 11, for example. The fixed charge layer 13 has a negative fixed charge, for example, to suppress the occurrence of a dark current due to the interface state of the rear face 11B that serves as a light receiving face of the semiconductor substrate 11. A hole accumulation layer is formed in the vicinity of the rear face 11B of the semiconductor substrate 11 by an electrical field induced by the fixed charge layer 13. The hole accumulation layer suppresses the generation of electrons from the rear face 11B. It is to be noted that the fixed charge layer 13 includes a portion extending between the inter-pixel region light shielding wall 16 and the photoelectric conversion region 12 in the Z-axis direction. The fixed charge layer 13 is preferably formed using an insulating material. Specific example of the constituting material of the fixed charge layer 13 may include hafnium oxide (HfOx), aluminum oxide (AlOx), zirconium oxide (ZrOx), tantalum oxide (TaOx), titanium oxide (TiOx), lanthanum oxide (LaOx), praseodymium oxide (PrOx), cerium oxide (CeOx), neodymium oxide (NdOx), promethium oxide (PmOx), samarium oxide (SmOx), europium oxide (EuOx), gadolinium oxide (GdOx), terbium oxide (TbOx), dysprosium oxide (DyOx), holmium oxide (HoOx), thulium oxide (TmOx), ytterbium oxide (YbOx), lutetium oxide (LuOx), yttrium oxide (YOx), hafnium oxide (HfNx), aluminum nitride (AlNx), hafnium oxynitride (HfOxNy), and aluminum oxynitride (AlOxNy).

The paired TGs 14A and 14B each extend in the Z-axis direction from the front face 11A to the photoelectric conversion region 12, for example. The TG 14A and the TG 14B transfer the electric charges accumulated in the photoelectric conversion region 12 to the paired FDs 15A and 15B in response to a drive signal applied.

The paired FDs 15A and 15B are floating diffusion regions that convert electric charges transferred from the photoelectric conversion region 12 via the TGs 14A and 14B into electric signals (e.g., voltage signals) and output the signals. As illustrated in FIG. 5 to be described later, reset transistors (RSTs) 143A and 143B are coupled to the FD 15A and the FD 15B, respectively. Further, the RSTs 143A and 143B are coupled to the vertical signal lines Lsig (FIG. 1A) via transistor amplifiers (AMPs) 144A and 144B and selection transistors (SELs) 145A and 145B, respectively.

FIGS. 3A and 3B are enlarged cross-sectional views illustrating a main portion of the pixel P1 illustrated in FIG. 2A in an enlarged manner. It is to be noted that FIG. 3A illustrates a cross-section in an arrow direction along a cut line IIIA-IIIA indicated in FIGS. 2B and 2C, and FIG. 3B illustrates a cross-section in an arrow direction along a cut line IIIB-IIIB indicated in FIGS. 2B and 2C. In addition, FIG. 3C is a vertical cross-sectional view illustrating an exemplary schematic configuration in the peripheral unit 101 illustrated in FIG. 1B. In addition, FIG. 3D is a horizontal cross-sectional view illustrating a portion of the peripheral unit 101 illustrated in FIG. 3C in an enlarged manner. FIG. 3D schematically illustrates an exemplary horizontal cross-sectional configuration at a height position in Z-axis direction indicated by an arrow IIID in FIG. 3C. It is to be noted that FIG. 3C corresponds to a cross-section in an arrow direction along a cut line IIIC-IIIC indicated in FIG. 3D. Further, FIG. 4A is a cross-sectional view along the Z-axis, illustrating the inter-pixel region light shielding wall 16 surrounding the through-electrode 17 in an enlarged manner. FIG. 4B is a cross-sectional view along an XY plane, illustrating the inter-pixel region light shielding wall 16 surrounding the through-electrode 17 in an enlarged manner. FIG. 4A illustrates a cross-section in an arrow direction along a line IVB-IVB indicated in FIG. 4B. The inter-pixel region light shielding wall 16 is provided in an interface portion between two pixels P adjacent to each other in the XY plane. For example, the inter-pixel region light shielding wall 16 includes a portion extending along an XZ plane and a portion extending along an YZ plane, and is provided so as to surround the photoelectric conversion region 12 of each pixel P. Further, the inter-pixel region light shielding wall 16 may be provided so as to surround the through-electrode 17. This suppresses oblique incidence of unwanted light on the photoelectric conversion region 12 between two adjacent pixels P, thereby preventing color mixture.

The inter-pixel region light shielding wall 16 includes, for example, a material containing at least one of a single metal, a metal alloy, a metal nitride, and a metal silicide having a light-shielding property. More specifically, examples of the constituent material of the inter-pixel region light shielding wall 16 include Al (aluminum), Cu (copper), Co (cobalt), W (tungsten), Ti (titanium), Ta (tantalum), Ni (nickel), Mo (molybdenum), Cr (chromium), Ir (iridium), platinum-iridium, TiN (titanium nitride), and tungsten-silicon compounds. It is to be noted that the constituent material of the inter-pixel region light shielding wall 16 is not limited to a metal material, and may be formed using graphite. In addition, the material of the inter-pixel region light shielding wall 16 is not limited to an electrically conductive material, and the inter-pixel region light shielding wall 16 may include a non-electrically conductive material having a light shielding property such as an organic material. Further, an insulating layer Z1 including an insulating material such as SiOx (silicon oxide) or aluminum oxide may be provided between the inter-pixel region light shielding wall 16 and the through-electrode 17. Alternatively, a void may be provided between the inter-pixel region light shielding wall 16 and the through-electrode 17 to insulate the inter-pixel region light shielding wall 16 and the through-electrode 17 from each other. It is to be noted that no insulating layer Z1 may be provided in a case where the inter-pixel region light shielding wall 16 includes a non-electrically conductive material. Furthermore, an insulating layer Z2 may be provided outside the inter-pixel region light shielding wall 16, that is, between the inter-pixel region light shielding wall 16 and the fixed charge layer 13. The insulating layer Z2 includes an insulating material such as SiOx (silicon oxide) or aluminum oxide. Alternatively, a void may be provided between the inter-pixel region light shielding wall 16 and the fixed charge layer 13 to insulate the inter-pixel region light shielding wall 16 and the fixed charge layer 13 from each other. In a case where the inter-pixel region light shielding wall 16 includes an electrically conductive material, the insulating layer Z2 secures electrical insulation between the inter-pixel region light shielding wall 16 and the semiconductor substrate 11. In a case where the inter-pixel region light shielding wall 16 is provided so as to surround the through-electrode 17 and includes an electrically conductive material, the insulating layer Z1 secures electrical insulation between the inter-pixel region light shielding wall 16 and through-electrode 17.

The through-electrode 17 is, for example, a coupling member that electrically couples a read-out electrode 26 of the organic photoelectric conversion unit 20 provided on the rear face 11B of the semiconductor substrate 11 and a FD 131 and an AMP 133 (refer to FIG. 6 to be described later) provided on the front face 11A of the semiconductor substrate 11. The through-electrode 17 is, for example, a transmission path for transmitting a signal charge generated in the organic photoelectric conversion unit 20 and a voltage for driving the charge accumulation electrode 25. For example, the through-electrode 17 may be provide so as to extend from the read-out electrode 26 of the organic photoelectric conversion unit 20 through the semiconductor substrate 11 to the multilayer wiring layer 30 in the Z-axis direction. The through-electrode 17 is configured to favorably transfer the signal charge generated in the organic photoelectric conversion unit 20 provided on the rear face 11B of the semiconductor substrate 11 to the front face 11A of the semiconductor substrate 11. As illustrated in FIGS. 2B and 3B, the through-electrode 17 penetrates the inside of the inter-pixel region light shielding wall 44 in the Z-axis direction. That is, the fixed charge layer 13 and the inter-pixel region light shielding wall 44 (to be described later) having electrical insulating properties are provided around the through-electrode 17, and the through-electrode 17 and the p-well region of the semiconductor substrate 11 are thereby electrically insulated from each other. Further, the through-electrode 17 includes a first through-electrode section 17-1 penetrating the inside of the inter-pixel region light shielding wall 44 in the Z-axis direction and a second through-electrode section 17-2 penetrating the inside of the inter-pixel region light shielding wall 16 in the Z-axis direction. The first through-electrode section 17-1 and the second through-electrode section 17-2 are coupled, for example, via a coupling electrode section 17-3. The maximum dimension of the coupling electrode section 17-3 in an XY in-plane direction is, for example, greater than both of the maximum dimension of the first through-electrode section 17-1 in the XY in-plane direction and the maximum dimension of the second through-electrode section 17-2 in the in-plane direction.

The through-electrode 17 may be formed using, for example, one or more of aluminum (Al), tungsten (W), titanium (Ti), cobalt (Co), platinum (Pt), palladium (Pd), copper (Cu), hafnium (Hf), and tantalum (Ta), in addition to an impurity-doped silicon material such as phosphorus-doped amorphous silicon (PDAS).

(Multilayer Wiring Layer 30)

The multilayer wiring layer 30 includes, for example, the RSTs 143A and 143B, the AMPs 144A and 144B, the SELs 145A and 145B, and the like that constitute the read-out circuit together with the TGs 14A and 14B.

(Intermediate Layer 40)

The intermediate layer 40 may include, for example, an insulating layer 41 and an optical filter 42 embedded in the insulating layer 41. The intermediate layer 40 may further include the inter-pixel region light shielding wall 44 as a first light shielding member that blocks light having at least a wavelength in an infrared light range (for example, a wavelength within a range from 880 nm or greater to 1040 nm or less) as the second wavelength range. The insulating layer 41 is formed of, for example, a single-layer film including one of inorganic insulating materials including, for example, silicon oxide (SiOx), silicon nitride (SiNx), and silicon oxynitride (SiON), or a laminated film including two or more of these materials. Further, as a material constituting the insulating layer 41, an organic insulating material such as polymethyl methacrylate (PMMA), polyvinyl phenol (PVP), polyvinyl alcohol (PVA), polyimide, polycarbonate (PC), polyethylene terephthalate (PET), polystyrene, N-2 (aminoethyl)3-aminopropyl trimethoxy silane (AEAPTMS), 3-mercaptopropyl trimethoxysilane (MPTMS), tetraethoxysilane (TEOS), octadecyl trichlorosilane (OTS), or the like may be used. Further, a wiring layer M including various wires including a transparent electrically conductive material is embedded in the insulating layer 41. The wiring layer M is coupled to a charge accumulation electrode 25 to be described later. The inter-pixel region light shielding wall 44 is formed of a single-layer film mainly including a material that blocks light in the infrared light range, for example, one of inorganic insulating materials including silicon oxide (SiOx), silicon nitride (SiNx), and silicon oxynitride (SiON), or a laminated film including two or more of these materials. The inter-pixel region light shielding wall 44 may be formed integrally with the insulating layer 41. The inter-pixel region light shielding wall 44 surrounds the optical filter 42 along the XY plane so as to overlap with the optical filter 42 at least partially in the XY plane perpendicular to the thickness direction (Z-axis direction). Like the inter-pixel region light shielding wall 16, the inter-pixel region light shielding wall 44 suppresses oblique incidence of unwanted light on the photoelectric conversion region 12 between adjacent pixels P1, thereby preventing color mixture.

The optical filter 42 has a transmission band in the infrared light range where the photoelectric conversion region 12 performs photoelectric conversion. That is, light having a wavelength in the infrared light range, i.e., infrared light transmits through the optical filter 42 more easily than light having a wavelength in the visible light range (for example, a wavelength within a range from 400 nm or greater to 700 nm or less) as a first wavelength range, i.e., visible light. Specifically, the optical filter 42 may include, for example, an organic material, and is configured to absorb at least a part of light having a wavelength in the visible light range while selectively passing light in the infrared light range. The optical filter 42 includes an organic material such as a phthalocyanine derivative, for example. In addition, the multiple optical filters 42 provided in the pixel unit 100 may have substantially the same shape and substantially the same size.

A SiN layer 45 may be provided on a rear face of the optical filter 42, that is, a face of the optical filter 42 facing the organic photoelectric conversion unit 20. In addition, a SiN layer 46 may be provided on a front face of the optical filter 42, that is, a face of the optical filter 42 facing the photoelectric conversion unit 10. Further, an insulating layer 47 including, for example, SiOx may be provided between the semiconductor substrate 11 and the SiN layer 46.

(Organic Photoelectric Conversion Unit 20)

The organic photoelectric conversion unit 20 includes, for example, the read-out electrode 26, a semiconductor layer 21, an organic photoelectric conversion layer 22, and an upper electrode 23 that are stacked in this order from a position close to the photoelectric conversion unit 10. The organic photoelectric conversion unit 20 further includes an insulating layer 24 provided below the semiconductor layer 21, and the charge accumulation electrode 25 provided opposed to the semiconductor layer 21 with the insulating layer 24 interposed therebetween. The charge accumulation electrode 25 and the read-out electrode 26 are spaced apart from each other, and are provided, for example, at the same layer level. The read-out electrode 26 is in contact with an upper end of the through-electrode 17. Further, as illustrated in FIG. 3C, for example, the organic photoelectric conversion unit 20 is coupled to a lead-out wire 58 via the contact layer 57 in the peripheral unit 101. It is to be noted that each of the upper electrode 23, the organic photoelectric conversion layer 22, and the semiconductor layer 21 may be common between some pixels P1 of the multiple pixels P1 (FIG. 2A) in the pixel unit 100, or may be common between all of the multiple pixels P in the pixel unit 100. The same applies to modification examples described below.

It is to be noted that another organic layer may be provided between the organic photoelectric conversion layer 22 and the semiconductor layer 21 and between the organic photoelectric conversion layer 22 and the upper electrode 23.

The read-out electrode 26, the upper electrode 23, and the charge accumulation electrode 25 are formed of a light-transmissive electrically conductive film, and includes, for example, indium-tin-oxide (ITO). However, as the constituent material of the read-out electrode 26, the upper electrode 23, and the charge accumulation electrode 25, a tin oxide (SnOx)-based material to which a dopant is added, or a zinc oxide-based material obtained by adding a dopant to zinc oxide (ZnO) may be used in addition to ITO. Examples of the zinc oxide-based material include aluminum zinc oxide (AZO) to which aluminum (Al) is added as a dopant, gallium zinc oxide (GZO) to which gallium (Ga) is added, and indium zinc oxide (IZO) to which indium (In) is added. In addition, as the constituent material of the read-out electrode 26, the upper electrode 23, and the charge accumulation electrode 25, CuI, $InSbO_4$, ZnMgO, $CuInO_2$, $MgIN_2O_4$, CdO, $ZnSnO_3$, $TiO_2$, or the like may be used. Further, a spinel-type oxide or an oxide having a $YbFe_2O_4$ configuration may be used.

The organic photoelectric conversion layer 22 converts light energy into electric energy, and includes two or more kinds of organic materials that function as a p-type semiconductor and an n-type semiconductor, for example. A p-type semiconductor relatively functions as an electron donor, and an n-type semiconductor relatively functions as an n-type semiconductor that functions as an electron acceptor. The organic photoelectric conversion layer 22 has a bulk hetero-junction structure in the layer. The bulk hetero-junction structure is a p/n junction face formed by the mixing of a p-type semiconductor and an n-type semiconductor, and excitons generated upon light absorption are separated into electrons and holes at the p/n junction interface.

In addition to the p-type semiconductor and the n-type semiconductor, the organic photoelectric conversion layer 22 may further include three types of so-called dye materials that photoelectrically convert light in a predetermined wavelength range while passing light in another wavelength range. The p-type semiconductor, the n-type semiconductor, and the dye materials preferably have absorption maximum wavelengths different from each other. This makes it possible to absorb the wavelength in the visible light region in a wide range.

The organic photoelectric conversion layer 22 may be formed, for example, by mixing the various organic semiconductor materials described above and using a spin coating technique. Alternatively, the organic photoelectric conversion layer 22 may be formed using, for example, a vacuum deposition method, a printing technique, or the like.

As the material constituting the semiconductor layer 21, a material having a large bandgap value (for example, a bandgap value of 3.0 eV or greater) and a higher mobility than the constituting material of the organic photoelectric conversion layer 22 is preferably used. Specific examples thereof include oxide semiconductor materials such as IGZO; transition-metal dichalcogenide; silicon carbide; diamond; graphene; a carbon nanotube; and organic semiconductor materials such as condensed polycyclic hydrocarbon compounds and condensed heterocyclic compounds.

The charge accumulation electrode 25 forms a kind of capacitor together with the insulating layer 24 and the semiconductor layer 21, and accumulates charges generated in the organic photoelectric conversion layer 22 in a portion of the semiconductor layer 21, for example, a region portion of the semiconductor layer 21 corresponding to the charge accumulation electrode 25 via the insulating layer 24. In the present embodiment, for example, one charge accumulation electrode 25 is provided corresponding to each of one color filter 53 and one on-chip lens. The charge accumulation electrode 25 is coupled to, for example, the vertical drive circuit 111.

The insulating layers 24 may be formed of, for example, an inorganic insulating material and an organic insulating material similar to those of the insulating layer 41.

As described above, the organic photoelectric conversion unit 20 detects some or all of the wavelengths in the visible light range. Further, it is desirable that the organic photoelectric conversion unit 20 be insensitive to the infrared range.

In the organic photoelectric conversion unit 20, light incident from the upper electrode 23 side is absorbed by the organic photoelectric conversion layer 22. An exciton (a pair of an electron and a hole) generated thereby moves to the interface between the electron donor and the electron acceptor constituting the organic photoelectric conversion layer 22, and causes exciton separation, that is, dissociates into an electron and a hole. The charges generated here, i.e., electrons and holes, are transferred to the upper electrode 23 or the semiconductor layer 21 by diffusion due to a difference in concentration of carriers or an internal electric field due to a difference in potential between the upper electrode 23 and the charge accumulation electrode 25, and are detected as a photocurrent. For example, the read-out electrode 26 is set to a positive potential, and the upper electrode 23 is set to a negative potential. In this case, the holes generated by the photoelectric conversion in the organic photoelectric conversion layer 22 move to the upper electrode 23. The electrons generated by the photoelectric conversion in the organic photoelectric conversion layer 22 are attracted to the charge accumulation electrode 25 and accumulated in a portion of the semiconductor layer 21, for example, a region portion of the semiconductor layer 21 corresponding to the charge accumulation electrode 25 via the insulating layer 24.

The charge (e.g., electrons) accumulated in the region portion of the semiconductor layer 21 corresponding to the charge accumulation electrode 25 via the insulating layer 24 is read as follows. Specifically, a potential V26 is applied to the read-out electrode 26, and a potential V25 is applied to the charge accumulation electrode 25. Here, the potential V26 is higher than the potential V25 (V25<V26). In this way, the electrons accumulated in the region portion of the semiconductor layer 21 corresponding to the charge accumulation electrode 25 are transferred to the read-out electrode 26.

As described above, the semiconductor layer 21 is provided below the organic photoelectric conversion layer 22, and charges (e.g., electrons) are accumulated in the region portion of the semiconductor layer 21 corresponding to the charge accumulation electrode 25 via the insulating layer 24. The following effects may be thereby obtained. That is, as compared with the case where charges (e.g., electrons) are accumulated in the organic photoelectric conversion layer 22 without providing the semiconductor layer 21, recombination of holes and electrons during charge accumulation is prevented, and the transfer efficiency of the accumulated charges (e.g., electrons) to the read-out electrode 26 is increased. Further, the generation of dark currents is suppressed. Although electrons are read in the example described above, holes may be read. In the case of reading holes, the above-described potential is exemplified as the potential sensed by the holes.

As illustrated in FIGS. 3C and 3D, the peripheral unit 101 is provided with an optical filter 90 as a second optical filter. Like the optical filter 42 provided in the pixel unit 100, the optical filter 90 passes infrared light more easily than visible light. The optical filter 90 may be provided at the same layer level as the optical filter 42, for example. The constituent material of optical filter 90 may be substantially the same as or different from the constituent material of the optical filter 42. For example, both of the optical filter 42 and the optical filter may include substantially the same organic material. Alternatively, the peripheral unit 101 may be provided with multiple optical filters 90, and each of the multiple optical filters 90 may be surrounded by a peripheral region light-shielding wall 49 along the XY plane perpendicular to the Z-axis direction. The peripheral region light-shielding wall 49 serves as a second light-shielding member that shields at least infrared light. Alternatively, the multiple optical filters provided in the peripheral unit 101 may have substantially the same shape and substantially the same size.

Further, for example, an arrangement pitch WX44 (see FIG. 2B) of the inter-pixel region light shielding walls 44 arranged in the X-axis direction may be substantially equal to an arrangement pitch WX49 (see FIG. 3D) of the peripheral region light-shielding walls 49 arranged in the X-axis direction. Similarly, an arrangement pitch WY44 (see FIG.

2B) of the inter-pixel region light shielding walls 44 arranged in the Y-axis direction may be substantially equal to an arrangement pitch WY49 (see FIG. 3D) of the peripheral region light-shielding walls 49 arranged in the Y-axis direction. It is to be noted that the arrangement pitch WX44 and the arrangement pitch WX49 may be substantially equal to the arrangement pitch WY44 and the arrangement pitch WY49. Alternatively, the arrangement pitch WX44 and the arrangement pitch WX49 may be different from the arrangement pitch WY44 and the arrangement pitch WY49. Further, the planar shape along the XY plane of the optical filter 90 partitioned by the peripheral region light-shielding wall 49 is not limited to a substantially rectangular shape, and may be a polygon other than a quadrangle such as a hexagon, for example, or may be a circular shape or an oval shape, for example.

The peripheral unit 101 may further be provided with a light shielding film 60 provided so as to overlap with the peripheral region light-shielding wall 49 in the Z-axis direction. The light shielding film 60 is provided in a layer between the semiconductor substrate 11 and the SiN layer 46, for example, but is not limited thereto. The light shielding film 60 may include a metal material such as W (tungsten), for example. The light shielding film 60 reflects visible light or absorbs visible light.

(Read-Out Circuit of Photoelectric Conversion Unit 10)

FIG. 5 is a circuit diagram illustrating an exemplary read-out circuit of the photoelectric conversion unit 10 constituting the pixel P illustrated in FIG. 2A.

The read-out circuit of the photoelectric conversion unit 10 includes, for example, the TGs 14A and 14B, the OFG 146, the FDs 15A and 15B, the RSTs 143A and 143B, the AMP 144A and 144B, and the SEL 145A and 145B.

The TG 14A is coupled to between the photoelectric conversion region 12 and the FD and the TG14B is coupled to between the photoelectric conversion region 12 and the FD When drive signal are applied to gate electrodes of the TGs 14A and 14B and the TGs 14A and 14B are activated, transfer gates of the TGs 14A and 14B are energized. Consequently, the signal charges converted in the photoelectric conversion region 12 are transferred to the FDs 15A and 15B via the TGs 14A and 14B.

The OFG 146 is coupled to between the photoelectric conversion region 12 and a power supply. When a drive signal is applied to a gate electrode of the OFG 146, and the OFG 146 is thereby activated, the OFG 146 is brought into an electrically conductive state. Consequently, the signal charges converted in the photoelectric conversion region 12 are discharged to the power supply via the OFG 146.

The FD 15A is coupled between the TG 14A and the AMP 144A, and the FD15B is coupled to between the TG 14B and the AMP 144B. The FDs 15A and 15B convert the signal charges transferred by the TGs 14A and 14B into voltage signals and output the voltage signals to the AMPs 144A and 144B.

The RST 143A is coupled to between the FD 15A and the power supply, and the RST 143B is coupled to between the FD 15B and the power supply. When drive signals are applied to gate electrodes of the RSTs 143A and 143B, and the RSTs 143A and 143B are thereby activated, reset gates of the RSTs 143A and 143B are brought into an electrically conductive state. Consequently, the potentials of the FDs 15A and 15B are reset to the level of the power supply.

The AMPs 144A and 144B have gate electrodes coupled to the FDs 15A and 15B and drain electrodes coupled to the power supply, respectively. The AMPs 144A and 144B serve as input sections of voltage-signal readout circuits of the FDs 15A and 15B, so-called source follower circuits. That is, source electrodes of the AMPs 144A and 144B are coupled to the vertical signal lines Lsig via the SELs 145A and 145B, respectively, and each of the AMPs 144A and 144B thereby constitutes a constant current source and a source follower circuit that are coupled to one end of the vertical signal line Lsig.

The SELs 145A and 145B are coupled to between the source-electrodes of the AMPs 144A and 144B and the vertical signal lines Lsig, respectively. When drive signals are applied to gate electrodes of the SELs 145A and 145B, and the SELs 145A, and 145B are thereby activated, the SELs 145A and 145B are each brought into an electrically conductive state, and the pixel P is selected. As a result, read signals (pixel signals) outputted from the AMPs 144A and 144B are outputted to the vertical signal lines Lsig via the SELs 145A and 145B, respectively.

In the solid-state imaging apparatus 1, a light pulse in the infrared range is incident on an object, and a light pulse reflected from the object is received at the photoelectric conversion region 12 of the photoelectric conversion unit 10. In the photoelectric conversion region 12, multiple charges are generated by the incidence of light pulses in the infrared range. The multiple charges generated in the photoelectric conversion region 12 are alternately distributed to the FD 15A and the FD 15B by alternately supplying drive signals to the paired TGs 14A and 14B for equal periods of time. By changing the shutter phase of the drive signal to be applied to the TGs 14A and 14B with respect to incident light pulses, the charge accumulation amount in the FD 15A and the charge accumulation amount in the FD 15B become phase-modulated values. By demodulating these values, the round-trip time of the light pulse is estimated, so that the distance between the solid-state imaging apparatus 1 and the object is determined.

(Read-Out Circuit of Organic Photoelectric Conversion Unit 20)

FIG. 6 is a circuit diagram illustrating an exemplary read-out circuit of the organic photoelectric conversion unit 20 constituting the pixel P1 illustrated in FIG. 2A.

The read-out circuit of the organic photoelectric conversion unit 20 includes, for example, the FD 131, the RST 132, the AMP 133, and the SEL 134.

The FD 131 is coupled to between the read-out electrode 26 and the AMP 133. The FD 131 converts the signal charge transferred by the read-out electrode 26 into a voltage signal and outputs the voltage signal to the AMP 133.

The FD 132 is coupled to between the FD 131 and the power supply. When a drive signal is applied to a gate electrode of the RST 132, and the RST 132 is thereby activated, a reset gate of the RST 132 is brought into an electrically conductive state. Consequently, the potential of the FD 131 is reset to the level of the power supply.

The AMP 133 has a gate electrode coupled to the FD 131 and a drain electrode coupled to the power supply. The AMP 133 has a source electrode coupled to the vertical signal line Lsig via the SEL 134.

The SEL 134 is coupled to between the source electrode of the AMP 133 and the vertical signal line Lsig. When a drive signal is applied to a gate electrode of the SEL 134, and the SEL 134 is thereby activated, the SEL 134 is brought into an electrically conductive state, and the pixel P1 is selected. As a result, a read signal (pixel signal) outputted from the AMP 133 is outputted to the vertical signal line Lsig via the SEL 134.

[Workings and Effects of Solid-State Imaging Apparatus 1]

The solid-state imaging apparatus 1 of the present embodiment includes the organic photoelectric conversion unit 20, the optical filter 42, and the photoelectric conversion unit 10 that are stacked in this order from an incident side. The organic photoelectric conversion unit 20 detects light having a wavelength in a visible light range and performs photoelectric conversion. The optical filter 42 has a transmission band in an infrared light range. The photoelectric conversion unit 10 detects light having a wavelength in an infrared light range and performs photoelectric conversion. Therefore, it is possible to obtain a visible light image composed of a red light signal, a green light signal, and a blue light signal obtained from a red pixel PR, a green pixel PG, and a blue pixel PB, respectively, and an infrared light image using infrared light signals acquired from all of the multiple pixels P at the same time and at the same position in the XY in-plane direction. Therefore, it is possible to achieve high integration in the XY in-plane direction.

Further, since the photoelectric conversion unit 10 includes the pair of TGs 14A and 14B and the pair of FDs 15A and 15B, it is possible to obtain an infrared light image as a distance image including information on the distance to the object. Therefore, according to the solid-state imaging apparatus 1 of the present embodiment, it is possible to achieve both acquisition of a high-resolution visible light image and acquisition of an infrared light image including depth data.

Further, in the pixel P1 of the present embodiment, the inter-pixel region light shielding wall 44 is provided so as to surround the optical filter 42. This helps to prevent leakage light from another adjacent pixel P1 or unwanted light from the surroundings from entering the photoelectric conversion unit 10 directly or through the optical filter 42. Therefore, noises received by the photoelectric conversion unit 10 is reduced, and improvements in S/N ratio, resolution, ranging accuracy, and the like of the solid-state imaging apparatus 1 are expected.

In the solid-state imaging apparatus 1 according to an embodiment of the present disclosure, the optical filter 90 that passes infrared light more easily than visible light is provided in the peripheral unit 101 adjacent to the pixel unit 100 that detects visible light and performs photoelectric conversion. This prevents visible light of the unwanted light incident on the peripheral unit 101 from entering the photoelectric conversion unit 10 directly or through the optical filter 90. Therefore, noises received by the photoelectric conversion unit is further reduced, and improvements in S/N ratio, resolution, ranging accuracy, and the like of the solid-state imaging apparatus 1 are expected.

Further, for the solid-state imaging apparatus 1, in a case where the optical filter 42 and the optical filter 90 includes an organic material, the optical filter 42 and the optical filter may be collectively formed by, for example, a coating method. In this case, the optical filter 90 is provided so as to surround the optical filter 42 provided in the pixel unit 100. This improves the flatness of the multiple optical filters 42 on the XY plane, and further reduces the variation in thicknesses of the multiple optical filters 42. Accordingly, the variation in detection sensitivity of the pixels P1 in the pixel unit 100 to infrared light is reduced, and the solid-state imaging apparatus 1 thus exhibits superior imaging performance.

Further, in the pixel P1 of the present embodiment, the organic photoelectric conversion unit 20 includes the insulating layer 24 provided below the semiconductor layer 21, and the charge accumulation electrode 25 provided opposed to the semiconductor layer 21 with the insulating layer 24 interposed therebetween in addition to the structure in which the read-out electrode 26, the semiconductor layer 21, the organic photoelectric conversion layer 22, and the upper electrode 23 are stacked in this order. Therefore, the charges generated by the photoelectric conversion in the organic photoelectric conversion layer 22 may be accumulated in the portion of the semiconductor layer 21, for example, the region portion of the semiconductor layer 21 corresponding to the charge accumulation electrode 25 via the insulating layer 24. Therefore, it is possible to remove charges in the semiconductor layer 21 at the start of exposure, for example, that is, it is possible to achieve complete depletion of the semiconductor layer 21. Consequently, kTC noises are reduced, which suppresses deterioration of image quality due to random noises. Further, as compared with the case where charges (e.g., electrons) are accumulated in the organic photoelectric conversion layer 22 without providing the semiconductor layer 21, recombination of holes and electrons during charge accumulation is prevented, and the transfer efficiency of the accumulated charges (e.g., electrons) to the read-out electrode 26 is increased. Further, the generation of dark currents is suppressed.

Further, in the pixel P1 of the present embodiment, the plurality of on-chip lens, the plurality of color filters 53, and the plurality of charge accumulation electrodes 25 are provided at positions overlapping with each other in the Z-axis direction with respect to one photoelectric conversion region 12. Accordingly, if at least some of the plurality of color filters 53 are different in color from each other, the difference in infrared light detection sensitivity is reduced as compared with a case where one on-chip lens, one color filter 53, one charge accumulation electrode 25, and one photoelectric conversion region 12 are provided at positions overlapping with each other in the Z-axis direction. In general, in a case where one on-chip lens, one color filter 53, one charge accumulation electrode 25, and one photoelectric conversion region 12 are provided at respective positions in the Z-axis direction, the transmittance of infrared light transmitting through the color filter 53 differs depending on the color of the color filter 53. Therefore, the intensity of the infrared light reaching the photoelectric conversion region 12 differs between the red pixel, the blue pixel, and the green pixel, for example. This results in variations in infrared light detection sensitivity between the multiple pixels. However, according to the pixel P1 of the present embodiment, the infrared light transmitting through the plurality of color filters 53 enters each photoelectric conversion region 12. Therefore, it is possible to reduce the difference in infrared light detection sensitivity generated between the plurality of pixels P1.

It is to be noted that, in the present embodiment, the red, green, and blue color filters 53 are provided, and the red light, green light, and blue light are received to obtain a colored visible light image; however, a black-and-white visible light image may be obtained without providing the color filters 53.

First Modification Example of First Embodiment

FIG. 7 schematically illustrates an exemplary vertical cross-sectional configuration, along the thickness direction, of a pixel P1A according to a first modification example (a modification example 1-1) of the first embodiment. In the present disclosure, as illustrated in FIG. 7, the semiconductor layer 21 may not be provided in the pixel P1A. In the pixel P1A illustrated in FIG. 7, the organic photoelectric conversion layer 22 is coupled to the read-out electrode 26, and the charge accumulation electrode 25 is provided opposed to the organic photoelectric conversion layer 22 with the insulating layer 24 interposed therebetween. In such a configuration, charges generated by the photoelectric conversion in the organic photoelectric conversion layer 22 are accumulated in the organic photoelectric conversion layer 22. Even in this case, a kind of capacitor is formed by the organic photoelectric conversion layer 22, the insulating layer 24, and the charge accumulation electrode 25 at the time of photoelectric conversion in the organic photoelectric conversion layer 22. Therefore, it is possible to remove charges in the organic photoelectric conversion layer 22 at the start of exposure, for example, that is, it is possible to achieve complete depletion of the organic photoelectric conversion layer 22. Consequently, kTC noises are reduced, which suppresses deterioration of image quality due to random noises.

Second Modification Example of First Embodiment

FIGS. 8A and 8B schematically illustrates an exemplary horizontal cross-section configuration of a pixel P1B provided in a pixel unit 100B according to a second modification example (a modification example 1-2) of the first embodiment and including the optical filter 42. FIG. 8B is a horizontal cross-sectional view of a portion of a peripheral unit 101 B adjacent to the pixel unit 100B in an enlarged manner. In addition, FIGS. 9A and 9B each illustrate an exemplary vertical cross-sectional configuration of the pixel P1B illustrated in the FIG. 8A along the Z-axis direction in an enlarged manner. It is to be noted that FIG. 9A illustrates a vertical cross-section in an arrow direction along a cut line IXA-IXA indicated in FIGS. 8A and 8B, and FIG. 9B illustrates a vertical cross-section in an arrow direction along a cut line IXB-IXB indicated in FIGS. 8A and 8B. Further, FIG. 9C illustrates a vertical cross-section of a peripheral unit 101B in an arrow direction along a cut line IXC-IXC indicated in FIG. 8B. It is to be noted that 8B schematically illustrates an exemplary horizontal cross-sectional configuration at a height position in the Z-axis direction indicated by an arrow VIIIB in FIG. 9C.

The pixel P1B according to the second modification example of the first embodiment further includes a metal partition wall 48 provided in a gap between adjacent optical filters 42. The metal partition wall 48 is embedded in the inter-pixel region light shielding wall 44, and surrounds the optical filter 42 along the XY plane so as to overlap the optical filter 42 at least partially in the XY plane direction perpendicular to the thickness direction (Z-axis direction). The pixel P1B has substantially the same configuration as the pixel P1 except that the pixel P1B further includes the metal partition wall 48. Further, in the second modification example of the first embodiment, as illustrated in FIGS. 8B and 9C, the metal partition wall 48 may also be provided in the peripheral unit 101B adjacent to the pixel unit 100B. In this case, the metal partition wall 48 is preferably embedded, for example, in the peripheral region light-shielding wall 49, and surrounds the optical filter 90 along the XY plane so as to overlap with the optical filter 90 at least partially in the XY plane direction.

The metal partition wall 48 includes an electrically conductive material containing a metal element such as Al (aluminum), W (tungsten), and Cu (copper). Thus, as illustrated in FIGS. 8A, 8B, and 9B, the inter-pixel region light shielding wall 44 having an electrically insulating property is provided between the through-electrode 17 and the metal partition wall 48.

According to the pixel P1B of the second modification example, the metal partition wall 48 is provided so as to surround each of the optical filter 42 and the optical filter 90. This further helps to prevent leakage light from another adjacent pixel P1B or unwanted light from the surroundings from entering the photoelectric conversion unit 10 directly or through the optical filter 42. Therefore, noises received by the photoelectric conversion unit 10 is further reduced, and further improvements in S/N ratio, resolution, ranging accuracy, and the like of the solid-state imaging apparatus 1 are expected.

Third Modification Example of First Embodiment

FIGS. 10A and 10B schematically illustrate an exemplary vertical cross-sectional configuration of a pixel PC1 provided in a pixel unit 100C according to a third modification example (a modification example 1-3) of the first embodiment and including the optical filter 42. FIG. 10C is a vertical cross-sectional view illustrating an exemplary schematic configuration of a peripheral unit 101C adjacent to the pixel unit 100C. FIGS. 10A, 10B, and 10C correspond to FIGS. 9A, 9B, and 9C illustrating the pixel unit 100B and the peripheral unit 101B according to the second modification example of the first embodiment, respectively. However, the pixel unit 100C and the peripheral unit 101C according to the third modification example of the first embodiment have thicknesses smaller than than those of the pixel unit 100B and the peripheral unit 101B according to the second modification example. Specifically, in the pixel unit 100B and the peripheral unit 101 B according to the second modification example, the insulating layer 47 covering the rear face 11B forming the RIG structure of the semiconductor substrate 11 is made relatively thick, so that the upper face of the insulating layer 47 becomes a flat face. In contrast, in the pixel unit 100C and the peripheral unit 101C according to the third modification example, the insulating layer 47 covering the rear face 11B is made relatively thin. In the pixel unit 100C and the peripheral unit 101C according to the third modification example as well, as in the case of the pixel unit 100B and the peripheral unit 101B, it is possible to help to prevent leakage light from another adjacent pixel P1C or unwanted light from the surroundings from entering the photoelectric conversion unit 10 directly or through the optical filter 42. It is to be noted that a coupling electrode section 17-3 is provided at a position overlapping with the optical filter 42 in the XY plane direction. This contributes to a reduction in the entire thickness as compared with the pixel unit 100 and the peripheral unit 101 that includes the coupling electrode section 17-3 provided on a layer different from the layer in which the optical filter 42 is provided.

Fourth Modification Example of First Embodiment

FIGS. 11A and 11B schematically illustrate an exemplary horizontal cross-sectional configuration of a pixel P1D provided in a pixel unit 100D according to a fourth modification example (a modification example 1-4) of the first embodiment and including an optical filter 42A. FIG. 11C is a vertical cross-sectional view illustrating an exemplary schematic configuration of a peripheral unit 101D adjacent to the pixel unit 100D. FIGS. 11A, 11B, and 11C correspond to FIGS. 9A, 9B, and 9C illustrating the pixel unit 100B and the peripheral unit 101B according to the second modification example of the first embodiment, respectively. However, in the pixel unit 100D and the peripheral unit 101D according to the fourth modification example, optical filters 42A and 90A each having a multilayer structure in which multiple inorganic layers each including an inorganic material are stacked are employed in place of the optical filters 42 and 90 including an organic material, for example. Except for this point, the pixel unit 100D and the peripheral unit 101D have configurations substantially the same as those of the pixel unit 100B and the peripheral unit 101B. Specifically, the optical filter 42A has a stacked structure in which a first inorganic layer 421 having a relatively high refractive index with respect to visible light and a second inorganic layer 422 having a relatively low refractive index with respect to visible light are alternately stacked. Similarly, the optical filter 90A specifically has a stacked structure in which a first inorganic layers 901 having a relatively high refractive index with respect to visible light and a second inorganic layer 902 having a relatively low refractive index with respect to visible light are alternately stacked. The first inorganic layers 421 and 901 may include, for example, hydrogenated amorphous silicon (a-Si:H). The second inorganic layers 422 and 902 may include, for example, silicon oxide (SiO). In the examples illustrated in FIGS. 11A and 11B, the optical filter 42A has a five-layer structure in which a first inorganic layer 421A, a second inorganic layer 422A, a first inorganic layer 421B, a second inorganic layer 422B, and a first inorganic layer 421C are stacked in this order on the insulating layer 47. In the example illustrated in FIG. 11C, the optical filter 90A has a five-layer structure in which a first inorganic layer 901A, a second inorganic layer 902A, a first inorganic layer 901B, a second inorganic layer 902B, and a first inorganic layer 901C are stacked in this order on the insulating layer 47. However, the present disclosure is not limited thereto.

In such optical filters 42A and 92A, multiple reflections of visible light occur, while infrared light transmits without being reflected. Thus, the visible light transmitting through the organic photoelectric conversion unit 20 is reflected from the optical filter 42A or 92A and then incident on the organic photoelectric conversion unit 20 again. Therefore, an improvement in photoelectric conversion efficiency of the organic photoelectric conversion unit 20 is expected.

Also in the pixel unit 100D and the peripheral unit 101D according to the fourth modification example, the inter-pixel region light shielding wall 44, the peripheral region light-shielding wall 49, and the metal partition wall 48 are provided. This helps to prevent leakage light from another adjacent pixel P1D or unwanted light from the surroundings from entering the photoelectric conversion unit 10 directly or through the optical filter 42A, as in the case with the pixel unit 100B and the peripheral unit 101B.

Fifth Modification Example of First Embodiment

FIGS. 12A and 12B schematically illustrate an exemplary vertical cross-sectional configuration of a pixel P1E provided in a pixel unit 100E according to a fifth modification example (a modification example 1-5) of the first embodiment and including an optical filter 42B. FIG. 12C is a vertical cross-sectional view illustrating an exemplary schematic configuration of a peripheral unit 101E adjacent to the pixel unit 100E. FIGS. 12A, 12B, and 12C correspond to FIGS. 9A, 9B, and 9C illustrating the pixel unit 100B and the peripheral unit 101B according to the second modification example of the first embodiment, respectively. However, in the pixel unit 100E and the peripheral unit 101E according to the fifth modification example, optical filters 42B and 90B each having a single-layer structure including, for example, an inorganic material are used in place of the optical filters 42 and 90. Except for this point, the pixel unit 100E and the peripheral unit 101 E have configurations substantially the same as those of the pixel unit 100B and the peripheral unit 101B. Specifically, the optical filters 42B and 90B include, for example, hydrogenated amorphous silicon (a-Si:H) or a-Si/Ge:H.

In such an optical filter 42B, visible light is absorbed while infrared light transmits without being absorbed. This allows the infrared light to be detected by the photoelectric conversion unit 10.

In addition, the pixel unit 100E and the peripheral unit 101 E according to the fifth modification example have configurations substantially the same as those of the pixel unit 100B and the peripheral unit 101B. Also in the pixel unit 100E and the peripheral unit 101E according to the fifth modification example, the inter-pixel region light shielding wall 44, the peripheral region light-shielding wall 49, and the metal partition wall 48 are provided. This helps to prevent leakage light from another adjacent pixel P1E or unwanted light from the surroundings from entering the photoelectric conversion unit 10 directly or through the optical filter 42B, as in the case with the pixel unit 100B and the peripheral unit 101B.

Sixth Modification Example of First Embodiment

FIG. 13 schematically illustrates an exemplary horizontal cross-sectional configuration of a pixel P1F provided in a pixel unit 100F according to a sixth modification example (a modification example 1-6) of the first embodiment and including the coupling electrode section 17-3. FIG. 14A schematically illustrates an exemplary vertical cross-sectional configuration of the pixel P1F. FIG. 14B is a vertical cross-sectional view illustrating an exemplary schematic configuration of the peripheral unit 101F adjacent to the pixel unit 100F. FIG. 13 corresponds to FIG. 2C illustrating the pixel unit 100 of the first embodiment. FIGS. 14A and 14B correspond to FIGS. 3A and 3C illustrating the pixel unit 100 and the peripheral unit 101 of the first embodiment, respectively. However, in the pixel unit 100F and the peripheral unit 101F according to the sixth modification example, an occupied area of the coupling electrode section 17-3 and an occupied area of the light shielding film 60 are larger than those in the pixel unit 100 and the peripheral unit 101 of the first embodiment. For example, in the pixel unit 100, the coupling electrode section 17-3 having a dimension smaller than the distance of a gap between adjacent optical filters 42 is provided. That is, the coupling electrode section 17-3 is provided so as not to overlap with the optical filter 42 in the Z-axis direction. In contrast, in the pixel unit 100F according to the sixth modification, the coupling electrode section 17-3 is provided so as to extend in the X-axis direction or the Y-axis direction to a region where the coupling electrode section 17-3 overlaps with the optical filter 42 in the Z-axis direction. In addition, in the peripheral unit 101, the light shielding film 60 having a dimension smaller than the distance of a gap between adjacent optical filters 90 is provided. That is, the light shielding film 60 is provided so as not to overlap with the optical filter 90 in the Z-axis direction. In contrast, in the peripheral unit 101F according to the sixth modification example, the light shielding film 60 is provided so as to extend in the X-axis direction or the Y-axis direction to a region where the light shielding film 60 overlaps with the optical filter 42 in the Z-axis direction. Except for these points, the pixel unit 100F and the peripheral unit 101 F according to the sixth modification example have configurations substantially the same as those of the pixel unit 100 and the peripheral unit 101 the pixel P1 according to the first embodiment. In the pixel unit 100F according to the sixth modification example, the coupling electrode section 17-3 extends along the XY plane. This allows the infrared light entering the semiconductor substrate 11 to be confined inside the semiconductor substrate 11, increasing the photoelectric conversion efficiency of the photoelectric conversion region 12. Further, in the peripheral unit 101F according to the sixth modification example, the light shielding film 60 extends along the XY plane. This makes it possible to block surrounding light transmitting through the peripheral region light-shielding wall 49.

2. Second Embodiment

[Exemplary Cross-Sectional Configurations of Pixel Unit 200 and Peripheral Unit 201]

FIG. 15A is a schematic view of a vertical cross-section illustrating a portion of a pixel unit 200 in a solid-state imaging apparatus 2 according to a second embodiment of the present disclosure in an enlarged manner. FIG. 15B is a schematic view of a vertical cross-section illustrating a portion of a peripheral unit 201 adjacent to the pixel unit 200 in an enlarged manner. The peripheral unit 201 may be provided so as to surround the pixel unit 200 along the XY in-plane, for example. The solid-state imaging apparatus 2 has substantially the same configuration as that of the solid-state imaging apparatus 1 according to the first embodiment except that the solid-state imaging apparatus 2 has the pixel unit 200 and the peripheral unit 201 in place of the pixel unit 100 and the peripheral unit 101, respectively. The pixel unit 200 is a specific example corresponding to an "effective region" of the present disclosure. The peripheral unit 201 is a specific example corresponding to a "peripheral region" of the present disclosure. In the following description, components in the pixel unit 200 and the peripheral unit 201 that are the same as those in the pixel unit 100 and the peripheral unit 101 are denoted by the same reference numerals, and the description thereof is omitted as appropriate.

FIG. 15A schematically illustrates an exemplary vertical cross-sectional configuration, along the Z-axis direction, of one pixel P2 among a plurality of pixels P2 arranged in a matrix in the pixel unit 200. As illustrated in FIG. 2A, the pixel P2 is, for example, a so-called vertical spectral imaging element having a configuration in which the photoelectric conversion unit 10 and the organic photoelectric conversion unit 20 are stacked in the Z-axis direction, like the pixel P1. The optical filter 42 is provided between the photoelectric conversion unit 10 and the organic photoelectric conversion unit 20. It is to be noted that the pixel P2 is a specific example corresponding to a "photodetector" of the present disclosure.

FIG. 15B schematically illustrates an exemplary vertical cross-sectional configuration, along the Z-axis axis, of a black-level reference pixel BP among a plurality of black-level reference pixels BP arranged surrounding the pixel unit 200 in the XY in-plane, for example. As illustrated in FIG. 15B, the black-level reference pixel BP includes an organic photoelectric conversion unit 20B as a third photoelectric conversion unit, a photoelectric conversion unit 10B as a fourth photoelectric conversion unit, a light shielding film 61 as a first light shielding unit, and a light shielding film 62 as a second light shielding unit. The black-level reference pixel BP may further include the optical filter 90. The black-level reference pixel BP is an element that detects a black level reference value, and is a specific example corresponding to a "black level reference element" of the present disclosure.

Like the organic photoelectric conversion unit 20, the organic photoelectric conversion unit 20B detects light (e.g., visible light) in the first wavelength range of irradiation light L incident on the solid-state imaging apparatus 2 and performs photoelectric conversion. The photoelectric conversion unit 10B is provided so as to overlap with the organic photoelectric conversion unit 20B in the Z-axis direction, and detects light (e.g., infrared light) in the second wavelength range of the irradiation light L incident on the solid-state imaging apparatus 2 and performs photoelectric conversion like the photoelectric conversion unit 10. The light shielding film 61 and the light shielding film 62 suppress transmission of the irradiation light L incident on the solid-state imaging apparatus 2. The light shielding film 61 is provided on a side on which the irradiation light L is incident as viewed from the organic photoelectric conversion unit 20B, that is, on the side opposite to the photoelectric conversion unit 10B as viewed from the organic photoelectric conversion unit 20B. The light shielding film 62 is provided between the organic photoelectric conversion unit 20B and the photoelectric conversion unit 10B in the Z-axis direction. In the example illustrated in FIG. the light shielding film 62 is provided between the optical filter 90 and the wiring layer M in the Z-axis direction. However, the present disclosure is not limited thereto. Note that the light shielding film 61 may also serve as the contact layer 57 coupled to the lead-out wire 58, for example.

At least one of the light shielding film 61 and the light shielding film 62 may include a metal layer including, for example, a metal material. The metal layer includes a metal material including at least one of Al (aluminum), W (tungsten), Ta (tantalum), TaN (tantalum nitride), Ti (titanium), and Cu (copper), for example. In a case where metal layers including W (tungsten) are employed as the light shielding film 61 and the light shielding film 62, for example, in order to set the attenuation amount of light in a wavelength of 700 nm to 120 dB and the attenuation amount of light in a wavelength of 950 nm to 120 dB, the film thickness of the light shielding film 61 may be set to 205 nm, and the film thickness of the light shielding film 62 may be set to 35 nm. In contrast, for example, in a case where only the light shielding film 61 is provided without the light-shielding film 62 being provided, the thickness of the light shielding film 61 is 240 nm.

Further, as illustrated in FIGS. 15A and 15B, the photoelectric conversion unit 10 and the photoelectric conversion unit 10B may be integrally provided so as to extend from the pixel unit 200 to the peripheral unit 201 at a first layer level Lv1. In addition, the organic photoelectric conversion unit 20 and the organic photoelectric conversion unit 20B may be integrally provided so as to extend from the pixel unit 200 to the peripheral unit 201 at a second layer level Lv2. Furthermore, both of the optical filter 42 and the optical filter 90 may be provided at a third layer level Lv3.

[Workings and Effects of Solid-State Imaging Apparatus 2]

In the solid-state imaging apparatus 2 of the present embodiment, the two light shielding films 61 and 62 overlapping with each other in the Z-axis direction are provided in the black-level reference pixel BP arranged so as to surround the periphery of the pixel unit 200. This makes it possible to make the light shielding film 61 and the light shielding film 62 thinner while maintaining the light shielding performance with respect to the irradiation light L, as compared with the case where only one of the light shielding film 61 and the light shielding film 62 is provided, for example. Therefore, it is possible to reduce steps between the light shielding films 61 and 62 and the peripheral region around the light shielding films 61 and 62. Accordingly, it is possible to reduce uneven application of the surrounding structure caused by the steps, for example, uneven application of the color filters 53. Consequently, for example, it is possible to reduce color unevenness of the visible light detected by the pixel P2 of the pixel unit 200, for example.

In addition, in a case where the photoelectric conversion unit 10 and the photoelectric conversion unit 10B are integrally provided, the photoelectric conversion unit 10 and the photoelectric conversion unit 10B may be collectively formed. This simplifies the manufacturing process of the solid-state imaging apparatus 2. Likewise, in a case where the organic photoelectric conversion unit 20 and the organic photoelectric conversion unit 20B are integrally provided, the organic photoelectric conversion unit 20 and the organic photoelectric conversion unit 20B may be collectively formed. This simplifies the manufacturing process of the solid-state imaging apparatus 2. Further, in a case where both of the optical filter 42 and the optical filter 90 are provided at the third layer level Lv3, the optical filter 42 and the optical filter 90 may be collectively formed. This simplifies the manufacturing process of the solid-state imaging apparatus 2.

First Modification Example of Second Embodiment

FIG. 16 schematically illustrates an exemplary vertical cross-sectional configuration, along the thickness direction, of a black-level reference pixel BP1 according to a first modification example (a modification example 2-1) of the second embodiment.

In the black-level reference pixel BP1 according to the first modification example, the light shielding film 62 is provided between the optical filter 90 and the photoelectric conversion unit 10B.

Second Modification Example of Second Embodiment

FIG. 17 schematically illustrates an exemplary vertical cross-sectional configuration, along the thickness direction, of a black-level reference pixel BP2 according to a second modification example (a modification example 2-2) of the second embodiment. This modification example differs from the black-level reference pixel BP of the second embodiment in that the optical filter 90 is replaced with the light shielding film 62.

Third Modification Example of Second Embodiment

FIG. 18 schematically illustrates an exemplary vertical cross-sectional configuration, along the thickness direction, of a black-level reference pixel BP3 according to a third modification example (a modification example 2-3) of the second embodiment. This modification example differs from the black-level reference pixel BP of the second embodiment in that the light shielding film 62 is provided as a metal film formed by, for example, a CVD method without providing the optical filter 90.

Fourth Modification Example of Second Embodiment

FIG. 19 schematically illustrates an exemplary vertical cross-sectional configuration, along the thickness direction, of a black-level reference pixel BP4 according to a fourth modification example (a modification example 2-4) of the second embodiment. This modification example differs from the black-level reference pixel BP of the second embodiment in that the light shielding film 62 is provided so as to be distributed in three locations. Specifically, the light shielding film 62 is divided into three portions: light shielding films 62-1 to 62-3. The light shielding film 62-1 is provided between the wiring layer M and the optical filter 90, the light shielding film 62-2 is provided at the same layer level as the coupling electrode section 17-3. The light shielding film 62-3 is provided so as to cover the rear face 11B of the semiconductor substrate 11. As described above, the light shielding film 62 is divided into a plurality of portions and disposed at a plurality of locations. This makes it possible to achieve desired light shielding performance while reducing the thicknesses of each of the plurality of light shielding films 62.

3. Third Embodiment

FIG. 20A is a schematic diagram illustrating an exemplary overall configuration of a light detection system 301 according to a third embodiment of the present disclosure. FIG. 20B is a schematic diagram illustrating an exemplary circuit configuration of the light detection system 301. The light detection system 301 includes a light-emitting apparatus 310 as a light source that emits light L2, and a light detection apparatus 320 as a light-receiving unit that includes a photoelectric converter. As the light detection apparatus 320, the above-described solid-state imaging apparatus 1 may be used. The light detection system 301 may further include a system control unit 330, a light source driving unit 340, a sensor control unit 350, a light-source-side optical system 360, and a camera-side optical system 370.

The light detection apparatus 320 is configured to detect light L1 and light L2. The light L1 is external environment light reflected from an object (an object to be measured) 300 (FIG. 20A). The light L2 is light emitted from the light-emitting apparatus 310 and then reflected from the object 300. The light L1 is, for example, visible light, and the light L2 is, for example, infrared light. The light L1 is detectable by an organic photoelectric conversion unit in the light detection apparatus 320, and the light L2 is detectable by a photoelectric conversion unit in the light detection apparatus 320. Image information on the object 300 may be acquired from the light L1, and distance information on the distance between the object 300 and the light detection system 301 may be acquired from the light L2. The light detection system 301 may be mounted on, for example, electronic equipment such as a smartphone or a mobile body such as a car. The light-emitting apparatus 310 may be configured by, for example, a semiconductor laser, a surface-emitting semiconductor laser, or a vertical-cavity surface-emitting laser (VCSEL). As a method of detecting the light L2 emitted from the light-emitting apparatus 310 by the light detection apparatus 320, for example, an iTOF method may be employed; however, the method is not limited thereto. In the iTOF method, the distance to the object 300 may be measured by a photoelectric conversion unit on the basis of, for example, optical time-of-flight (Time-of-Flight; TOF). As a method of detecting the light L2 emitted from the light-emitting apparatus 310 by light detection apparatus 320, for example, a structured light method or a stereo-vision method may be employed. For example, in the structured light method, the distance between the light detection system 301 and the object 300 may be measured by projecting light of a predetermined pattern onto the object 300 and analyzing the distortion degree of the pattern. Further, in the stereo-vision method, for example, the distance between the light detection system 301 and the object 300 may be measured by capturing two or more images of the object 300 viewed from two or more different viewpoints using two or more cameras. It is to be noted that the light-emitting apparatus 310 and the light detection apparatus 320 may be synchronously controlled by the system control unit 330.

4. Exemplary Application to Electronic Equipment

FIG. 21 is a block diagram illustrating a configuration example of electronic equipment 2000 to which the present technology is applied. The electronic equipment 2000 has a function as a camera, for example.

The electronic equipment 2000 includes an optical unit 2001 including a lens group or the like, a light detection apparatus 2002 to which the above-described solid-state imaging apparatus 1 or the like (hereinafter, referred to as the solid-state imaging apparatus 1 and the like) is applied, and a digital signal processor (DSP) circuit 2003 that is a camera signal processing circuit. The electronic equipment 2000 further includes a frame memory 2004, a display unit 2005, a recording unit 2006, an operation unit 2007, and a power supply unit 2008. The DSP circuit 2003, the frame memory 2004, the display unit 2005, the recording unit 2006, the operation unit 2007, and the power supply unit 2008 are coupled to each other via a bus line 2009.

The optical unit 2001 takes in incident light (image light) from the object and forms an image on an imaging surface of the light detection apparatus 2002. The light detection apparatus 2002 converts the amount of incident light focused on the imaging surface by the optical unit 2001 into an electric signal on a pixel-by-pixel basis, and outputs the electric signal as a pixel signal.

The display unit 2005 includes, for example, a panel-type display device such as a liquid crystal panel or an organic EL panel, and displays a moving image or a still image captured by the light detection apparatus 2002. The recording unit 2006 records the moving image or the still image captured by light detection apparatus 2002 in a recording medium such as a hard disk or a semiconductor memory.

The operation unit 2007 issues an operation command for various functions of the electronic equipment 2000 in response to an operation by the user. The power supply unit 2008 appropriately supplies various types of power to be used as the operation power of the DSP circuit 2003, the frame memory 2004, the display unit 2005, the recording unit 2006, and the operation unit 2007 to these supply targets.

As described above, favorable images are expected to be obtained by using the above-described solid-state imaging apparatus 1 or the like as the light detection apparatus 2002.

5. Application Example to In-Vivo Information Acquisition System

The technology according to the present disclosure (the present technology) is applicable to various products. For example, the technology according to the present disclosure may be applied to an endoscopic surgery system.

FIG. 22 is a block diagram depicting an example of a schematic configuration of an in-vivo information acquisition system of a patient using a capsule type endoscope, to which the technology according to an embodiment of the present disclosure (present technology) can be applied.

The in-vivo information acquisition system 10001 includes a capsule type endoscope 10100 and an external controlling apparatus 10200.

The capsule type endoscope 10100 is swallowed by a patient at the time of inspection. The capsule type endoscope 10100 has an image pickup function and a wireless communication function and successively picks up an image of the inside of an organ such as the stomach or an intestine (hereinafter referred to as in-vivo image) at predetermined intervals while it moves inside of the organ by peristaltic motion for a period of time until it is naturally discharged from the patient. Then, the capsule type endoscope 10100 successively transmits information of the in-vivo image to the external controlling apparatus 10200 outside the body by wireless transmission.

The external controlling apparatus 10200 integrally controls operation of the in-vivo information acquisition system 10001. Further, the external controlling apparatus 10200 receives information of an in-vivo image transmitted thereto from the capsule type endoscope 10100 and generates image data for displaying the in-vivo image on a display apparatus (not depicted) on the basis of the received information of the in-vivo image.

In the in-vivo information acquisition system 10001, an in-vivo image imaged a state of the inside of the body of a patient can be acquired at any time in this manner for a period of time until the capsule type endoscope 10100 is discharged after it is swallowed.

A configuration and functions of the capsule type endoscope 10100 and the external controlling apparatus 10200 are described in more detail below.

The capsule type endoscope 10100 includes a housing 10101 of the capsule type, in which a light source unit 10111, an image pickup unit 10112, an image processing unit 10113, a wireless communication unit 10114, a power feeding unit 10115, a power supply unit 10116 and a control unit 10117 are accommodated.

The light source unit 10111 includes a light source such as, for example, a light emitting diode (LED) and irradiates light on an image pickup field-of-view of the image pickup unit 10112.

The image pickup unit 10112 includes an image pickup element and an optical system including a plurality of lenses provided at a preceding stage to the image pickup element. Reflected light (hereinafter referred to as observation light) of light irradiated on a body tissue which is an observation target is condensed by the optical system and introduced into the image pickup element. In the image pickup unit 10112, the incident observation light is photoelectrically converted by the image pickup element, by which an image signal corresponding to the observation light is generated. The image signal generated by the image pickup unit 10112 is provided to the image processing unit 10113.

The image processing unit 10113 includes a processor such as a central processing unit (CPU) or a graphics processing unit (GPU) and performs various signal processes for an image signal generated by the image pickup unit 10112. The image processing unit 10113 provides the image signal for which the signal processes have been performed thereby as RAW data to the wireless communication unit 10114.

The wireless communication unit 10114 performs a predetermined process such as a modulation process for the image signal for which the signal processes have been performed by the image processing unit 10113 and transmits the resulting image signal to the external controlling apparatus 10200 through an antenna 10114A. Further, the wireless communication unit 10114 receives a control signal relating to driving control of the capsule type endoscope 10100 from the external controlling apparatus 10200 through the antenna 10114A. The wireless communication unit 10114 provides the control signal received from the external controlling apparatus 10200 to the control unit 10117.

The power feeding unit 10115 includes an antenna coil for power reception, a power regeneration circuit for regenerating electric power from current generated in the antenna coil, a voltage booster circuit and so forth. The power feeding unit 10115 generates electric power using the principle of non-contact charging.

The power supply unit 10116 includes a secondary battery and stores electric power generated by the power feeding unit 10115. In FIG. 22, in order to avoid complicated illustration, an arrow mark indicative of a supply destination of electric power from the power supply unit 10116 and so forth are omitted. However, electric power stored in the power supply unit 10116 is supplied to and can be used to drive the light source unit 10111, the image pickup unit 10112, the image processing unit 10113, the wireless communication unit 10114 and the control unit 10117.

The control unit 10117 includes a processor such as a CPU and suitably controls driving of the light source unit 10111, the image pickup unit 10112, the image processing unit 10113, the wireless communication unit 10114 and the power feeding unit 10115 in accordance with a control signal transmitted thereto from the external controlling apparatus 10200.

The external controlling apparatus 10200 includes a processor such as a CPU or a GPU, a microcomputer, a control board or the like in which a processor and a storage element such as a memory are mixedly incorporated. The external controlling apparatus 10200 transmits a control signal to the control unit 10117 of the capsule type endoscope 10100 through an antenna 10200A to control operation of the capsule type endoscope 10100. In the capsule type endoscope 10100, an irradiation condition of light upon an observation target of the light source unit 10111 can be changed, for example, in accordance with a control signal from the external controlling apparatus 10200. Further, an image pickup condition (for example, a frame rate, an exposure value or the like of the image pickup unit 10112) can be changed in accordance with a control signal from the external controlling apparatus 10200. Further, the substance of processing by the image processing unit 10113 or a condition for transmitting an image signal from the wireless communication unit 10114 (for example, a transmission interval, a transmission image number or the like) may be changed in accordance with a control signal from the external controlling apparatus 10200.

Further, the external controlling apparatus 10200 performs various image processes for an image signal transmitted thereto from the capsule type endoscope 10100 to generate image data for displaying a picked up in-vivo image on the display apparatus. As the image processes, various signal processes can be performed such as, for example, a development process (demosaic process), an image quality improving process (bandwidth enhancement process, a super-resolution process, a noise reduction (NR) process and/or image stabilization process) and/or an enlargement process (electronic zooming process). The external controlling apparatus 10200 controls driving of the display apparatus to cause the display apparatus to display a picked up in-vivo image on the basis of generated image data. Alternatively, the external controlling apparatus 10200 may also control a recording apparatus (not depicted) to record generated image data or control a printing apparatus (not depicted) to output generated image data by printing.

The example of the in-vivo information acquisition system to which the technology according to the present disclosure is applicable has been described above. The technology according to the present disclosure may be applied to, for example, the image pickup unit 10112 of the configuration described above. This achieves a small-size device with high image detection accuracy.

14. Application Example to Endoscopic Surgery System

The technology according to the present disclosure (the present technology) is applicable to various products. For example, the technology according to the present disclosure may be applied to an endoscopic surgery system.

FIG. 23 is a view depicting an example of a schematic configuration of an endoscopic surgery system to which the technology according to an embodiment of the present disclosure (present technology) can be applied.

In FIG. 23, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy treatment tool 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body lumen of the patient 11132, and a camera head 11102 connected to a proximal end of the lens barrel 11101. In the example depicted, the endoscope 11100 is depicted which includes as a hard mirror having the lens barrel 11101 of the hard type. However, the endoscope 11100 may otherwise be included as a soft mirror having the lens barrel 11101 of the soft type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body lumen of the patient 11132 through the objective lens. It is to be noted that the endoscope 11100 may be a direct view mirror or may be a perspective view mirror or a side view mirror.

An optical system and an image pickup element are provided in the inside of the camera head 11102 such that reflected light (observation light) from the observation target is condensed on the image pickup element by the optical system. The observation light is photoelectrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy treatment tool 11112 for cautery or incision of a tissue, sealing of a blood vessel or the like. A pneumoperitoneum apparatus 11206 feeds gas into a body lumen of the patient 11132 through the pneumoperitoneum tube 11111 to inflate the body lumen in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

FIG. 24 is a block diagram depicting an example of a functional configuration of the camera head 11102 and the CCU 11201 depicted in FIG. 23.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy treatment tool 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

The example of the endoscopic surgery system to which the technology according to the present disclosure is applicable has been described above. The technology according to the present disclosure may be applied to, for example, the image pickup unit 11402 of the camera head 11102 of the configuration described above. By applying the technology according to the present disclosure to the image pickup unit 10402, clearer surgical site images can be obtained. This improves viewability of a surgical site for a surgeon.

It is to be noted that, although an endoscopic surgery system is exemplified here, the technology according to the present disclosure may be applied to other systems such as a microscopic surgery system, for example.

7. Application Example to Mobile Body

The technology according to the present disclosure (the present technology) is applicable to various products. For example, the technology according to the present disclosure (the present technology) may be achieved in the form of an apparatus to be mounted on a mobile body of any kind. Examples of the mobile body may include an automobile, an electric vehicle, a hybrid electric vehicle, a motorcycle, a bicycle, a personal mobility device, an airplane, a drone, a vessel, and a robot.

FIG. 25 is a block diagram depicting an example of schematic configuration of a vehicle control system as an example of a mobile body control system to which the technology according to the present disclosure can be applied.

The vehicle control system 12000 includes a plurality of electronic control units connected to each other via a communication network 12001. In the example depicted in FIG. the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12030 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 25, an audio speaker 12061, a display section 12062, and an instrument panel 12063 are illustrated as the output device. The display section 12062 may, for example, include at least one of an on-board display and a head-up display.

FIG. 26 is a diagram depicting an example of the installation position of the imaging section 12031.

In FIG. 26, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 26 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure is applicable has been described above. The technology according to the present disclosure may be applied to, for example, the imaging section 12031 of the configuration described above. By applying the technology according to the present disclosure to the imaging section 12031, more visible captured image can be obtained. This reduces the fatigue of a driver.

8. Other Modification Examples

Although the present disclosure has been described above with reference to some embodiments and modification examples, and application examples or exemplary applications thereof (hereinafter referred to as embodiments and the like), the present disclosure is not limited to the above-described embodiments and the like, and various modifications may be made. For example, the present disclosure is not limited to a backside illumination type image sensor, and is also applicable to a surface illumination type image sensor.

Further, the imaging apparatus of the present disclosure may be in the form of a module in which an imaging unit and a signal processing unit or an optical system are packaged together.

Further, in the above-described embodiments and the like, the solid-state imaging apparatus that converts the amount of incident light focused on the imaging surface via the optical lens system into an electric signal on a pixel-by-pixel basis and outputs the electric signal as a pixel signal, and the image sensor mounted thereon have been described as examples; however, the photoelectric converter of the present disclosure is not limited to such an imaging element. For example, the photoelectric converter only has to detect and receive light from an object, generate electric charges corresponding to the amount of received light by photoelectric conversion, and accumulate the electric charges. The output signal may be a signal of image information or a signal of ranging information.

Further, in the above-described embodiments and the like, an iTOF sensor is exemplified as the photoelectric conversion unit 10 serving as the second photoelectric conversion; however, the present disclosure is not limited thereto. That is, the second photoelectric conversion unit is not limited to a photoelectric conversion unit that detects light having a wavelength in the infrared light range, and may be a photoelectric conversion unit that detects light having a wavelength in another wavelength range. In a case where the photoelectric conversion unit 10 is not an iTOF sensor, only one transfer transistor (TG) may be provided.

Further, in the above-described embodiments and the like, the imaging element in which the photoelectric conversion unit 10 including the photoelectric conversion region 12 and the organic photoelectric conversion unit 20 including the organic photoelectric conversion layer 22 are stacked with the intermediate layer 40 interposed therebetween is exemplified as the photoelectric converter of the present disclosure; however the present disclosure is not limited thereto. For example, the photoelectric converter of the present disclosure may have a structure in which two organic photoelectric conversion regions are stacked, or may have a structure in which two inorganic photoelectric conversion regions are stacked. Further, in the above-described embodiments and the like, the photoelectric conversion unit 10 performs photoelectric conversion by mainly detecting light having a wavelength in the infrared light range, and the organic photoelectric conversion unit 20 performs photoelectric conversion by mainly detecting light having a wavelength in the visible light region; however, the photoelectric converter of the present disclosure is not limited thereto. In the photoelectric converter of the present disclosure, the wavelength range sensitive to the first photoelectric conversion unit and the second photoelectric conversion unit may be freely set.

In addition, the constituent materials of the constituent elements of the photoelectric converter of the present disclosure are not limited to the materials described in the above embodiments and the like. For example, in a case where the first photoelectric conversion unit or the second photoelectric conversion unit receives light in a visible light region and photoelectrically converts the light, the first photoelectric conversion unit or the second photoelectric conversion unit may include quantum dots.

In addition, in the first embodiment and the second embodiment, the example in which the peripheral region surrounds the effective region is described; however, the light detection apparatus of the present disclosure is not limited thereto. For example, as illustrated in FIG. 27, in the solid-state imaging apparatus 1 of the first embodiment, the peripheral unit 101 as the peripheral region faces two sides of the pixel unit 100 as the effective region. The same applies to the solid-state imaging apparatus 2 of the second embodiment.

Further, the present disclosure may have an aspect as a solid-state imaging apparatus 3 according to another first modification example illustrated in FIGS. 28 and 29. FIG. 28 is a schematic plan view illustrating the pixel unit 100 and the periphery of the pixel unit 100 of the solid-state imaging apparatus 3 in an enlarged manner. FIG. 29 is a schematic cross-sectional view of the pixel unit 100 and the periphery of the pixel unit 100 of the solid-state imaging apparatus 3. It is to be noted that FIG. 29 illustrates a cross-section in an arrow direction along a cut line XXIX-XXIX indicated in FIG. 29. The solid-state imaging apparatus 3 includes the pixel unit 100 as the effective region and the peripheral unit 101 as the peripheral region adjacent to the pixel unit 100. A portion of the peripheral unit 101 is provided with the contact region 102 and a pad opening region 103 having multiple pad openings 103K. FIG. 30 is an enlarged schematic plan view of the vicinity of two adjacent pad openings 103K among the multiple pad openings 103K. In the pad opening region 103, a pad 71 is provided at the bottom of each of the multiple pad openings 103K. The pad 71 is a connection terminal for electrically coupling the solid-state imaging apparatus 3 and an external device. The pad 71 is provided in the multilayer wiring layer 30, for example. The pad 71 includes a highly electrically conductive metal material such as Al (aluminum) or an aluminum alloy. Further, a guard ring 72 is formed in the pad opening region 103 so as to surround a corresponding pad opening 103K. The guard ring 72 is formed by stacking a first conductive layer 72-1, a second conductive layer 72-2, and a third conductive layer 72-3 in this order in the thickness direction. Thus, the guard ring 72 extends through the intermediate layer 40 in the thickness direction. In addition, wiring layers 73 are provided in the pad opening region 103. As illustrated in FIG. 30, the multiple wiring layers 73 are provided so as to the pad opening 103K in the region inside the guard ring 72. The wiring layers 73 are provided at the same layer level as the wiring layer M of the pixel unit 100. The wiring layers 73 each include, for example, a structure in which a wire M1, a wire M2, and a wire M3 are stacked with the insulating layer 41 interposed therebetween. The wire M1, the wire M2, and the wire M3 may be electrically coupled to each other by a coupling layer extending in the thickness direction. The wire M1, the wire M2, and the wire M3 include a highly electrically conductive material such as ITO, for example. However, the wiring layer 73 is not electrically coupled to the outside, and is thus an electrically isolated dummy wire. The multiple pad opening portions 103K are provided so as to extend through the wiring layer 73 in the thickness direction. Thus, end faces M1T, M2T, and M3T of the wire M1, the wire M2, and the wire M3 of the wiring layer 73 are exposed to an inner wall face 103KS of the pad opening portion 103K.

According to the solid-state imaging apparatus 3 illustrated in FIGS. 28 and 29, the wiring layer 73 exposed to the inner wall face 103KS of the pad opening 103K of the peripheral unit 101 is provided. Thus, it is possible to prevent the formation of a step between the pixel unit 100 and the peripheral unit 101 in the manufacturing process of the solid-state imaging apparatus 3. Specifically, in a case where the wiring layer 73 is not provided, a step may be formed between the pixel unit 100 and the peripheral unit 101 during the formation of the wiring layer M in the pixel unit 100, for example. Consequently, accuracy in processing such as patterning of the organic photoelectric conversion unit 20 may be reduced, and the yield of the manufacturing process may be reduced. According to the solid-state imaging apparatus 3 according to the present modification example, the wiring layer 73 is provided on the intermediate layer 40 of the peripheral unit 101. Thus, it is possible to improve the flatness of the peripheral unit 101. Consequently, it is possible to further reduce the possibility of generation of processing defects of, for example, the organic photoelectric conversion unit 20.

It is to be noted that the layout of the pad opening region 103 is not limited to that illustrated in FIG. 30. The solid-state imaging apparatus 3 may employ, for example, layouts illustrated in FIGS. 31A, 31B, 31C, 31D, and 31E. In the example illustrated in FIG. 30, the multiple wiring layers 73 are arranged to surround the pad opening 103K; however, the present disclosure is not limited thereto. For example, as in a pad opening region 103A illustrated in FIG. 31A, one annular wiring layer 73A may be provided so as to surround the pad opening 103K. In the pad opening region 103A illustrated in FIG. 31A, the inner side faces of the annular wiring layer 73A are exposed to the inner wall face 103KS of the pad opening 103K.

In addition, as in a pad opening region 103B illustrated in FIG. 31B, for example, multiple wiring layers 73B may be provided inside the guard ring 72 separately from the wiring layers 73 partially exposed to the inner wall face 103KS of the pad opening 103K. In addition, for example, multiple wiring layers 73C may be provided outside the guard ring 72 as in a pad opening region 103C illustrated in FIG. 31C.

In addition, as in a pad opening region 103D illustrated in FIG. 31D, for example, the present disclosure may include an annular wiring layer 73A partially exposed to the inner wall face 103KS of the pad opening portion 103K, and a wiring layer 73B provided inside the guard ring 72. Alternatively, as in a pad opening region 103E illustrated in FIG. 31E, for example, the present disclosure may include the annular wiring layer 73A and a wiring layer 73C provided outside the guard ring 72.

The present disclosure may have an aspect as a solid-state imaging apparatus 3A according to another second modification example illustrated in FIG. 32. FIG. 32 is a schematic cross-sectional view of the pixel unit 100 and the periphery of the pixel unit 100 of the solid-state imaging apparatus 3A and corresponds to FIG. 29. In the solid-state imaging apparatus 3A, the wiring layer 73 provided in the pad opening region 103 of the peripheral unit 101 is coupled to the semiconductor substrate 11 of the photoelectric conversion unit 10 via the coupling layer 74.

The present disclosure may have an aspect as a solid-state imaging apparatus 3B according to another third modification example illustrated in FIG. 33. FIG. 33 is a schematic cross-sectional view of the pixel unit 100 and the periphery of the pixel unit 100 of the solid-state imaging apparatus 3B and corresponds to FIG. 29. In the solid-state imaging apparatus 3B, ends of some of the wiring layers 73D provided in the pad opening region 103 of the peripheral unit 101 are exposed to an edge 3BT of the solid-state imaging apparatus 3B.

Further, in the present disclosure, a recess provided in the peripheral region may be filled with a resin material. The present disclosure may have, for example, an aspect as a solid-state imaging apparatus 4 according to another fourth modification example illustrated in FIGS. 34 and 35. FIG. 34 is a schematic plan view illustrating the pixel unit 100 and the periphery of the pixel unit 100 of the solid-state imaging apparatus 4 in an enlarged manner. FIG. 35 is a schematic cross-sectional view of a peripheral unit 401 of the solid-state imaging apparatus 4 in an enlarged manner. It is to be noted that FIG. 35 corresponds to FIG. 3C of the first embodiment described above. In the configuration of the solid-state imaging apparatus 4, the black filter 56 extends in the peripheral unit 401 to the contact region 102 where the contact layer 57 and the lead-out wire 58 are coupled. The configuration of the solid-state imaging apparatus 4 is substantially the same as the configuration of the solid-state imaging apparatus 1 except this point. In the peripheral unit 401, the black filter 56 is formed so as to cover the contact region 102 and the contact region 104 in a larger area than the area where the contact layer 57 is formed. The black filter 56 is, for example, a resin material containing a black pigment such as carbon black. The contact region 104 is a region in which the contact layer 57 and the organic photoelectric conversion unit 20 are coupled.

According to the solid-state imaging apparatus 4, the black filter 56 is formed in a larger range. This improves the flatness of the peripheral unit 401. In the manufacturing process, for example, in a stage prior to manufacturing the color filters 53, the step between the surface of pixel unit 100 and the surface of the peripheral unit 401 is reduced. This improves the flatness of a base on which the color filter 53 is to be formed. Thus, it is possible to reduce variations in film thicknesses of the color filters 53. In addition, when the color filter 53 is etched into a desired shape, it is possible to reduce the possibility of generation of defects such as a residue of the film to be the color filter 53 in an unnecessary region or variations in thicknesses of the patterned color filters 53. Therefore, it is possible to avoid occurrence of color unevenness.

It is to be noted that the solid-state imaging apparatus 4 may have a peripheral unit 401A (another fifth modification example) having a configuration illustrated in FIG. 36. In the peripheral unit 401A, an additional film 75 is formed so as to cover a steeper wall face of the surface to be covered by the black filter 56. Specifically, in the contact region 102 and the contact region 104 in the peripheral unit 401A, additional films are formed between an insulating film 51-1 provided along a bottom face and a sidewall face of a groove and the black filter 56. The additional films 75 include, for example, the same constituent material as the partition wall 52, and are formed together with the partition wall 52. That is, for example, the partition wall 52 is formed at a predetermined position on the pixel unit 100, and at the same time, the additional films 75 are formed at portions of the groove of the contact region 102 and the groove of the contact region 104 of the peripheral unit 401A by forming a low-temperature oxide film (LTO film) by a thermal CVD method or the like such that the pixel unit 100 and the peripheral unit 401A are entirely covered by the low-temperature oxide film, and selectively etching the low-temperature oxide film. It is to be noted that the additional films may be formed in stepped portions other than the contact region 102 and the contact region 104.

In general, a void is likely to be formed in a gap between the vicinity of a portion where a steep wall face having an angle close to vertical and a horizontal surface intersect with each other and a film covering the steep wall face. Specifically, at the bottom of the groove in the contact region 102 and the bottom of the groove in the contact region 104, voids are likely to be formed between the insulating film 51-1 and the black filter 56 covering the insulating film 51-1. Thus, by providing the additional film 75 as in the peripheral unit 401A illustrated in FIG. 36, it is possible to suppress generation of a void between the insulating film 51-1 and the black filter 56. Consequently, structure stabilization of the solid-state imaging apparatus 4 is achievable. This effectively prevents the occurrence of cracks due to changes in a temperature environment or aging degradation, for example. Accordingly, it is possible to further improve the reliability.

Further, the solid-state imaging apparatus 4 may include a peripheral unit 401B (another sixth modification example) having a configuration illustrated in FIG. 37. Specifically, in the present disclosure, for example, a low refractive index resin 76 may be formed separately from the black filter 56 so as to fill a portion having a particularly large step, for example, a groove in the contact region 102, and the black filter 56 may be formed so as to cover the low refractive index resin 76. In this case, it is preferable to provide a low-temperature oxide film (LTO film) 77 between the low refractive index resin 76 and the black filter 56. If a resist pattern is directly formed on the low refractive index resin 76 when the low refractive index resin 76 is selectively etched, the resist may enter a void inside the low refractive index resin 76. Thus, the entry of the resist into the low refractive index resin 76 is prevented by covering the upper surface of the low refractive index resin 76 with the low-temperature oxide film 77 and then with a resist pattern. It is to be noted that the height position of the upper surface of the low refractive index resin 76 is, for example, substantially the same as the height position of an upper end of the partition wall 52 in the pixel unit 100.

According to the light detection apparatus of an embodiment of the present disclosure, unwanted light is cut by the second optical filter. This suppresses noises received by the second photoelectric conversion unit. Therefore, in a case where the light detection apparatus is used in, for example, an imaging apparatus, it is expected to improve an S/N ratio, resolution, distance measurement accuracy, and the like.

It is to be noted that the effects described herein are mere examples. The present disclosure is thus not limited to the description and other effects may be obtained. Further, the present technology may have the following configurations.

(1) A light detection apparatus including:
an effective region provided with a photodetector that detects irradiation light and performs photoelectric conversion; and
a peripheral region provided adjacent to the effective region; in which
the photodetector has a stacked structure including
a first photoelectric conversion unit that detects light in a first wavelength range of the irradiation light and performs photoelectric conversion,
a second photoelectric conversion unit that is provided so as to overlap with the first photoelectric conversion unit, detects light in a second wavelength range of the irradiation light, and performs photoelectric conversion, and
a first optical filter that is provided between the first photoelectric conversion unit and the second photoelectric conversion unit and through which the light in the second wavelength range transmits more easily than the light in the first wavelength range, and the peripheral region is provided with a second optical filter through which the light in the second wavelength range transmits more easily than the light in the first wavelength range.

(2) The light detection apparatus according to (1) described above, in which the first optical filter and the second optical filter are provided at the same layer level.

(3) The light detection apparatus according to (1) or (2) described above, in which the first optical filter and the second optical filter include substantially the same material.

(4) The light detection apparatus according to any one of (1) to (3) described above, in which
the effective region is provided with a plurality of the photodetectors,
the first optical filter in each of the plurality of the photodetectors is surrounded by a first light shielding member along a plane perpendicular to the thickness direction, the first light shielding member blocking at least the light in the second wavelength range, and
both of the first optical filter and the second optical filter include an organic material.

(5) The light detection apparatus according to (4) described above, in which a plurality of the first optical filters have substantially the same shape and substantially the same size.

(6) The light detection apparatus according to (4) or (5) described above, in which
the peripheral region is provided with a plurality of the second optical filters, and
each of the plurality of the second optical filters is surrounded by a second light shielding member along the plane perpendicular to the thickness direction, the second light shielding member blocking at least the light in the second wavelength range.

(7) The light detection apparatus according to (6) described above, in which a first arrangement interval between a plurality of the first light shielding members is substantially equal to a second arrangement interval between a plurality of the second light shielding members.

(8) The light detection apparatus according to (6) or (7) described above, in which the plurality of the second optical filters have substantially the same shape and substantially the same size.

(9) The light detection apparatus according to (8) described above, in which the first optical filter and the second optical filter are provided at the same layer level.

(10) The light detection apparatus according to any one of (6) to (9) described above, further including a light shielding film provided so as to overlap with the second light shielding member.

(11) The light detection apparatus according to (10) described above, in which the light shielding film includes a metal material.

(12) The light detection apparatus according to (11) described above, in which the light shielding film reflects the light in the first wavelength range.

(13) The light detection apparatus according to any one of (1) to (12) described above, in which the peripheral region is provided so as to surround the effective region.

(14) The light detection apparatus according to any one of (1) to (13) described above, in which
the effective region is further provided with a first wiring layer that is provided between the first optical filter and the second photoelectric conversion unit, and
the peripheral region is further provided with a second wiring layer that is provided at the same layer level as the first wiring layer.

(15) The light detection apparatus according to (14) described above, in which
the peripheral region is further provided with a pad opening and a pad exposed to a bottom of the pad opening, and
the second wiring layer includes an end face exposed to a sidewall face of the pad opening.

(16) The light detection apparatus according to any one of (1) to (15) described above, in which
the peripheral region is provided with a recess, and
the recess is filled with a resin material.

(17) A light detection system including:
a light-emitting apparatus that emits infrared light; and
a light detection apparatus, in which
the light detection apparatus includes
an effective region provided with a photodetector that detects visible light from outside and the infrared light from the light-emitting apparatus, and
a peripheral region provided adjacent to the effective region,
the photodetector has a stacked structure including
a first photoelectric conversion unit that detects the visible light and performs photoelectric conversion,
a second photoelectric conversion unit that is provided so as to overlap with the first photoelectric conversion unit, detects the infrared light, and performs photoelectric conversion, and
a first optical filter that is provided between the first photoelectric conversion unit and the second photoelectric conversion unit and through which the infrared light transmits more easily than the visible light, and
the peripheral region is provided with a second optical filter through which the infrared light transmits more easily than the visible light.

(18) Electronic equipment including:
an optical unit;
a signal processing unit; and
a light detection apparatus, in which
the light detection apparatus includes
an effective region provided with a photoelectric converter that detects irradiation light and performs photoelectric conversion, and
a peripheral region provided adjacent to the effective region,
the photoelectric converter has a stacked structure including
a first photoelectric conversion unit that detects light in a first wavelength range of the irradiation light and performs photoelectric conversion,
a second photoelectric conversion unit that is provided so as to overlap with the first photoelectric conversion unit, detects light in a second wavelength range of the irradiation light, and performs photoelectric conversion, and
a first optical filter that is provided between the first photoelectric conversion unit and the second photoelectric conversion unit and through which the light in the second wavelength range transmits more easily than the light in the first wavelength range, and
the peripheral region is provided with a second optical filter through which the light in the second wavelength range transmits more easily than the light in the first wavelength range.

(19) A mobile body including
a light detection system including a light-emitting apparatus that emits irradiation light, and a light detection apparatus, in which
the light detection apparatus includes
an effective region provided with a photoelectric converter that detects the irradiation light and performs photoelectric conversion, and
a peripheral region provided adjacent to the effective region,
the photoelectric converter has a stacked structure including
a first photoelectric conversion unit that detects light in a first wavelength range of the irradiation light and performs photoelectric conversion,
a second photoelectric conversion unit that is provided so as to overlap with the first photoelectric conversion unit, detects light in a second wavelength range of the irradiation light, and performs photoelectric conversion, and
a first optical filter that is provided between the first photoelectric conversion unit and the second photoelectric conversion unit and through which the light in the second wavelength range transmits more easily than the light in the first wavelength range, and
the peripheral region is provided with a second optical filter through which the light in the second wavelength range transmits more easily than the light in the first wavelength range.

(20) A light detection apparatus including:
an effective region provided with a photodetector that detects irradiation light; and
a peripheral region provided adjacent to the effective region and provided with a black level reference element that detects a black level reference value, in which
the photodetector includes
a first photoelectric conversion unit that detects light in a first wavelength range of the irradiation light and performs photoelectric conversion,
a second photoelectric conversion unit that is provided so as to overlap with the first photoelectric conversion unit, detects light in a second wavelength range of the irradiation light, and performs photoelectric conversion, and
an optical filter that is provided between the first photoelectric conversion unit and the second photoelectric conversion unit and through which the light in the second wavelength range transmits more easily than the light in the first wavelength range, and
the black level reference element includes
a third photoelectric conversion unit that detects the light in the first wavelength range of the irradiation light and perform photoelectric conversion,
a fourth photoelectric conversion unit that is provided so as to overlap with the third photoelectric conversion unit, detects the light in the second wavelength range of the irradiation light, and performs photoelectric conversion,
a first light shielding unit that is provided opposite to the fourth photoelectric conversion unit as seen from the third photoelectric conversion unit and suppresses transmission of the irradiation light, and
a second light shielding unit that is provided between the third photoelectric conversion unit and the fourth photoelectric conversion unit and suppresses transmission of the irradiation light.

(21) The light detection apparatus according to (20) described above, in which at least one of the first light shielding unit and the second light shielding unit includes a metal layer including a metal material.

(22) The light detection apparatus according to (21) described above, in which the metal material includes at least one of Al (aluminum), W (tungsten), Ta (tantalum), TaN (tantalum nitride), Ti (titanium), and Cu (copper).

(23) The light detection apparatus according to any one of (20) to (22) described above, in which the peripheral region is provided so as to surround the effective region.

(24) The light detection apparatus according to any one of (20) to (23) described above, in which
the first photoelectric conversion unit and the third photoelectric conversion unit are integrally provided so as to extend from the effective region to the peripheral region at a first layer level, and
the second photoelectric conversion unit and the fourth photoelectric conversion unit are integrally provided so as to extend from the effective region to the peripheral region at a second layer level.

(25) A light detection system including:
a light-emitting apparatus that emits infrared light; and
a light detection apparatus, in which
the light detection apparatus includes
an effective region provided with a photodetector that detects visible light from outside and the infrared light from the light-emitting apparatus, and
a peripheral region provided adjacent to the effective region and provided with a black level reference element that detects a black level reference value,
the photodetector has a first stacked structure including
a first photoelectric conversion unit that detects the visible light and performs photoelectric conversion,
a second photoelectric conversion unit that is provided so as to overlap with the first photoelectric conversion unit, detects the infrared light, and performs photoelectric conversion, and
an optical filter that is provided between the first photoelectric conversion unit and the second photoelectric conversion unit and through which the infrared light transmits more easily than the visible light, and
the black level reference element has a second stacked structure including
a third photoelectric conversion unit that detects the visible light and performs photoelectric conversion,
a fourth photoelectric conversion unit that is provided so as to overlap with the third photoelectric conversion unit, detects the infrared light, and performs photoelectric conversion,
a first light shielding unit that is provided opposite to the fourth photoelectric conversion unit as seen from the third photoelectric conversion unit and suppresses transmission of the visible light and transmission of the infrared light, and
a second light shielding unit that is provided between the third photoelectric conversion unit and the fourth photoelectric conversion unit and suppresses transmission of the visible light and transmission of the infrared light.

(26) Electronic equipment including:
an optical unit;
a signal processing unit; and
a light detection apparatus, in which
the light detection apparatus includes
an effective region provided with a photodetector that detects irradiation light, and
a peripheral region provided adjacent to the effective region and provided with a black level reference element that detects a black level reference value,
the photodetector has a first stacked structure including
a first photoelectric conversion unit that detects light in a first wavelength range of the irradiation light and performs photoelectric conversion,
a second photoelectric conversion unit that is provided so as to overlap with the first photoelectric conversion unit, detects light in a second wavelength range of the irradiation light, and performs photoelectric conversion, and
an optical filter that is provided between the first photoelectric conversion unit and the second photoelectric conversion unit and through which the light in the second wavelength range transmits more easily than the light in the first wavelength range, and
the black level reference element includes a second stacked structure including
a third photoelectric conversion unit that detects the light in the first wavelength range of the irradiation light and performs photoelectric conversion,
a fourth photoelectric conversion unit that is provided so as to overlap with the third photoelectric conversion unit, detects the light in the second wavelength range of the irradiation light, and performs photoelectric conversion,
a first light shielding unit that is provided opposite to the fourth photoelectric conversion unit as seen from the third photoelectric conversion unit and suppresses transmission of the irradiation light, and
a second light shielding unit that is provided between the third photoelectric conversion unit and the fourth photoelectric conversion unit and suppresses transmission of the irradiation light.
(27) A mobile body including
a light detection system including a light-emitting apparatus that emits irradiation light, and a light detection apparatus, in which
the light detection apparatus includes
an effective region provided with a photoelectric converter that detects the irradiation light, and
a peripheral region provided adjacent to the effective region and provided with a black level reference element that detects a black level reference value,
the photodetector has a first stacked structure including
a first photoelectric conversion unit that detects light in a first wavelength range of the irradiation light and performs photoelectric conversion,
a second photoelectric conversion unit that is provided so as to overlap with the first photoelectric conversion unit, detects light in a second wavelength range of the irradiation light, and performs photoelectric conversion, and
an optical filter that is provided between the first photoelectric conversion unit and the second photoelectric conversion unit and through which the light in the second wavelength range transmits more easily than the light in the first wavelength range, and
the black level reference element has a second stacked structure including
a third photoelectric conversion unit that detects the light in the first wavelength range of the irradiation light and performs photoelectric conversion,
a fourth photoelectric conversion unit that is provided so as to overlap with the third photoelectric conversion unit, detect the light in the second wavelength range of the irradiation light, and performs photoelectric conversion,
a first light shielding unit that is provided opposite to the fourth photoelectric conversion as seen from the third photoelectric conversion unit and suppresses transmission of the irradiation light, and
a second light shielding unit that is provided between the third photoelectric conversion unit and the fourth photoelectric conversion unit and suppresses transmission of the irradiation light.

This application claims the benefit of Japanese Priority Patent Application JP2020-208717 filed with the Japan Patent Office on Dec. 16, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A light detection apparatus, comprising:
an effective region provided with a photodetector that is configured to:
detect irradiation light; and
perform photoelectric conversion; and
a peripheral region provided adjacent to the effective region; wherein
the photodetector has a stacked structure including
a first photoelectric conversion unit that os configured to:
detect light in a first wavelength range of the irradiation light; and
perform photoelectric conversion,
a second photoelectric conversion unit that is provided so as to overlap with the first photoelectric conversion unit, wherein the second photoelectric conversion unit is configured to:
detect light in a second wavelength range of the irradiation light; and
perform photoelectric conversion, and
a first optical filter that is provided between the first photoelectric conversion unit and the second photoelectric conversion unit and through which the light in the second wavelength range transmits more easily than the light in the first wavelength range, and
the peripheral region is provided with a second optical filter through which the light in the second wavelength range transmits more easily than the light in the first wavelength range.

2. The light detection apparatus according to claim 1, wherein the first optical filter and the second optical filter are provided at a same layer level.

3. The light detection apparatus according to claim 1, wherein the first optical filter and the second optical filter include substantially a same material.

4. The light detection apparatus according to claim 1, wherein
the effective region is provided with a plurality of photodetectors, the first optical filter in each of the plurality of photodetectors is surrounded by a first light shielding member along a plane perpendicular to a thickness direction, the first light shielding member blocking at least the light in the second wavelength range, and both of the first optical filter and the second optical filter include an organic material.

5. The light detection apparatus according to claim 4, wherein a plurality of the first optical filters have substantially a same shape and substantially a same size.

6. The light detection apparatus according to claim 4, wherein
the peripheral region is provided with a plurality of the second optical filters, and
each of the plurality of second optical filters is surrounded by a second light shielding member along the plane perpendicular to the thickness direction, the second light shielding member blocking at least the light in the second wavelength range.

7. The light detection apparatus according to claim 6, wherein a first arrangement interval between a plurality of first light shielding members is substantially equal to a second arrangement interval between a plurality of the second light shielding members.

8. The light detection apparatus according to claim 6, wherein the plurality of second optical filters have substantially a same shape and substantially a same size.

9. The light detection apparatus according to claim 8, wherein the first optical filter and the second optical filter are provided at a same layer level.

10. The light detection apparatus according to claim 6, further comprising a light shielding film provided so as to overlap with the second light shielding member.

11. The light detection apparatus according to claim 10, wherein the light shielding film includes a metal material.

12. The light detection apparatus according to claim 11, wherein the light shielding film reflects the light in the first wavelength range.

13. The light detection apparatus according to claim 1, wherein the peripheral region is provided so as to surround the effective region.

14. The light detection apparatus according to claim 1, wherein
the effective region is further provided with a first wiring layer that is provided between the first optical filter and the second photoelectric conversion unit, and
the peripheral region is further provided with a second wiring layer that is provided at a same layer level as the first wiring layer.

15. The light detection apparatus according to claim 14, wherein
the peripheral region is further provided with a pad opening and a pad exposed to a bottom of the pad opening, and
the second wiring layer includes an end face exposed to a sidewall face of the pad opening.

16. The light detection apparatus according to claim 1, wherein
the peripheral region is provided with a recess, and
the recess is filled with a resin material.

17. A light detection system, comprising:
a light-emitting apparatus that is configured to emit infrared light; and
a light detection apparatus, wherein
the light detection apparatus includes
an effective region provided with a photodetector that is configured to detect visible light from outside and the infrared light from the light-emitting apparatus, and
a peripheral region provided adjacent to the effective region,
the photodetector has a stacked structure including
a first photoelectric conversion unit that is configured to:
detect the visible light; and
perform photoelectric conversion,
a second photoelectric conversion unit that is provided so as to overlap with the first photoelectric conversion unit, detects the infrared light, and performs photoelectric conversion, and
a first optical filter that is provided between the first photoelectric conversion unit and the second photoelectric conversion unit and through which the infrared light transmits more easily than the visible light, and
the peripheral region is provided with a second optical filter through which the infrared light transmits more easily than the visible light.

18. Electronic equipment, comprising:
an optical unit;
a signal processing unit; and
a light detection apparatus, wherein
the light detection apparatus includes
an effective region provided with a photoelectric converter that is configured to:
detect irradiation light; and
perform photoelectric conversion, and
a peripheral region provided adjacent to the effective region,
the photoelectric converter has a stacked structure including
a first photoelectric conversion unit that is configured to:
detect light in a first wavelength range of the irradiation light; and
perform photoelectric conversion,
a second photoelectric conversion unit that is provided so as to overlap with the first photoelectric conversion unit, wherein the second photoelectric conversion unit is configured to:
detect light in a second wavelength range of the irradiation light; and
perform photoelectric conversion, and
a first optical filter that is provided between the first photoelectric conversion unit and the second photoelectric conversion unit and through which the light in the second wavelength range transmits more easily than the light in the first wavelength range, and
the peripheral region is provided with a second optical filter through which the light in the second wavelength range transmits more easily than the light in the first wavelength range.

19. A mobile body, comprising
a light detection system including a light-emitting apparatus that is configured to emit irradiation light and a light detection apparatus, wherein
the light detection apparatus includes
an effective region provided with a photoelectric converter that is configured to:
detect the irradiation light; and
perform photoelectric conversion, and
a peripheral region provided adjacent to the effective region, wherein the photoelectric converter has a stacked structure including a first photoelectric conversion unit that is configured to:
  detect light in a first wavelength range of the irradiation light; and
  perform photoelectric conversion,
a second photoelectric conversion unit that is provided so as to overlap with the first photoelectric conversion unit, wherein the second photoelectric conversion unit is configured to:
  detect light in a second wavelength range of the irradiation light; and
  perform photoelectric conversion, and
a first optical filter that is provided between the first photoelectric conversion unit and the second photoelectric conversion unit and through which the light in the second wavelength range transmits more easily than the light in the first wavelength range, and
the peripheral region is provided with a second optical filter through which the light in the second wavelength range transmits more easily than the light in the first wavelength range.

20. A light detection apparatus, comprising:
an effective region provided with a photodetector that is configured to detect irradiation light; and
a peripheral region provided adjacent to the effective region and provided with a black level reference element that is configured to detect a black level reference value, wherein
the photodetector includes
  a first photoelectric conversion unit that is configured to:
    detect light in a first wavelength range of the irradiation light; and
    perform photoelectric conversion,
  a second photoelectric conversion unit that is provided so as to overlap with the first photoelectric conversion unit, wherein the second photoelectric conversion unit is configured to:
    detect light in a second wavelength range of the irradiation light; and
    perform photoelectric conversion, and
  an optical filter that is provided between the first photoelectric conversion unit and the second photoelectric conversion unit and through which the light in the second wavelength range transmits more easily than the light in the first wavelength range, and
the black level reference element includes
  a third photoelectric conversion unit that is configured to:
    detect the light in the first wavelength range of the irradiation light; and
    perform photoelectric conversion,
  a fourth photoelectric conversion unit that is provided so as to overlap with the third photoelectric conversion unit, wherein the fourth photoelectric conversion unit is configured to:
    detect the light in the second wavelength range of the irradiation light; and
    perform photoelectric conversion,
  a first light shielding unit that is provided opposite to the fourth photoelectric conversion unit as seen from the third photoelectric conversion unit, wherein the first light shielding unit is configured to suppress transmission of the irradiation light, and
  a second light shielding unit that is provided between the third photoelectric conversion unit and the fourth photoelectric conversion unit, wherein the second light shielding unit is configured to suppress transmission of the irradiation light.

21. The light detection apparatus according to claim 20, wherein at least one of the first light shielding unit and the second light shielding unit includes a metal layer including a metal material.

22. The light detection apparatus according to claim 21, wherein the metal material includes at least one of Al (aluminum), W (tungsten), Ta (tantalum), TaN (tantalum nitride), Ti (titanium), and Cu (copper).

23. The light detection apparatus according to claim 20, wherein the peripheral region is provided so as to surround the effective region.

24. The light detection apparatus according to claim 20, wherein
  the first photoelectric conversion unit and the third photoelectric conversion unit are integrally provided so as to extend from the effective region to the peripheral region at a first layer level, and
  the second photoelectric conversion unit and the fourth photoelectric conversion unit are integrally provided so as to extend from the effective region to the peripheral region at a second layer level.

25. A light detection system, comprising:
a light-emitting apparatus that is configured to emit infrared light; and
a light detection apparatus, wherein
the light detection apparatus includes
  an effective region provided with a photodetector that is configured to detect visible light from outside and the infrared light from the light-emitting apparatus, and
  a peripheral region provided adjacent to the effective region and provided with a black level reference element that is configured to detect a black level reference value,
the photodetector has a first stacked structure including
  a first photoelectric conversion unit that is configured to:
    detect the visible light; and
    perform photoelectric conversion,
  a second photoelectric conversion unit that is provided so as to overlap with the first photoelectric conversion unit, wherein the second photoelectric conversion unit is configured to:
    detects the infrared light; and
    perform photoelectric conversion, and
  an optical filter that is provided between the first photoelectric conversion unit and the second photoelectric conversion unit and through which the infrared light transmits more easily than the visible light, and
the black level reference element has a second stacked structure including
  a third photoelectric conversion unit that is configured to:
    detect the visible light; and
    perform photoelectric conversion,
  a fourth photoelectric conversion unit that is provided so as to overlap with the third photoelectric conversion unit, wherein the fourth photoelectric conversion unit is configured to:
    detect the infrared light; and
    perform photoelectric conversion,
  a first light shielding unit that is provided opposite to the fourth photoelectric conversion unit as seen from the third photoelectric conversion unit, wherein the first light shielding unit is configured to suppress transmission of the visible light and transmission of the infrared light, and
a second light shielding unit that is provided between the third photoelectric conversion unit and the fourth photoelectric conversion unit, wherein the second light shielding unit is configured to suppress transmission of the visible light and transmission of the infrared light.

26. Electronic equipment comprising:
an optical unit;
a signal processing unit; and
a light detection apparatus, wherein
the light detection apparatus includes
an effective region provided with a photodetector that is configured to detect irradiation light, and
a peripheral region provided adjacent to the effective region and provided with a black level reference element that is configured to detect a black level reference value,
the photodetector has a first stacked structure including
a first photoelectric conversion unit that is configured to:
detect light in a first wavelength range of the irradiation light; and
perform photoelectric conversion,
a second photoelectric conversion unit that is provided so as to overlap with the first photoelectric conversion unit, wherein the second photoelectric conversion unit is configured to:
detect light in a second wavelength range of the irradiation light; and
perform photoelectric conversion, and
an optical filter that is provided between the first photoelectric conversion unit and the second photoelectric conversion unit and through which the light in the second wavelength range transmits more easily than the light in the first wavelength range, and
the black level reference element includes a second stacked structure including
a third photoelectric conversion unit that is configured to:
detect the light in the first wavelength range of the irradiation light; and
perform photoelectric conversion,
a fourth photoelectric conversion unit that is provided so as to overlap with the third photoelectric conversion unit, wherein the fourth photoelectric conversion unit is configured to:
detect the light in the second wavelength range of the irradiation light; and
perform photoelectric conversion,
a first light shielding unit that is provided opposite to the fourth photoelectric conversion unit as seen from the third photoelectric conversion unit and suppresses transmission of the irradiation light, and
a second light shielding unit that is provided between the third photoelectric conversion unit and the fourth photoelectric conversion unit, wherein the second light shielding unit is configured to suppress transmission of the irradiation light.

27. A mobile body, comprising
a light detection system including a light-emitting apparatus that is configured to emit irradiation light, and a light detection apparatus, wherein
the light detection apparatus includes
an effective region provided with a photoelectric converter that is configured to detect the irradiation light, and
a peripheral region provided adjacent to the effective region and provided with a black level reference element that is configured to detect a black level reference value,
a photodetector has a first stacked structure including
a first photoelectric conversion unit that is configured to:
detect light in a first wavelength range of the irradiation light; and
perform photoelectric conversion,
a second photoelectric conversion unit that is provided so as to overlap with the first photoelectric conversion unit, wherein the second photoelectric conversion unit is configured to:
detect light in a second wavelength range of the irradiation light, and performs photoelectric conversion; and
an optical filter that is provided between the first photoelectric conversion unit and the second photoelectric conversion unit and through which the light in the second wavelength range transmits more easily than the light in the first wavelength range, and
the black level reference element has a second stacked structure including
a third photoelectric conversion unit that detects the light in the first wavelength range of the irradiation light and performs photoelectric conversion,
a fourth photoelectric conversion unit that is provided so as to overlap with the third photoelectric conversion unit, wherein the fourth photoelectric conversion unit is configured to:
detect the light in the second wavelength range of the irradiation light; and
perform photoelectric conversion,
a first light shielding unit that is provided opposite to the fourth photoelectric conversion unit as seen from the third photoelectric conversion unit, wherein the first light shielding unit is configured to suppress transmission of the irradiation light, and
a second light shielding unit that is provided between the third photoelectric conversion unit and the fourth photoelectric conversion unit, wherein the second light is configured to suppress transmission of the irradiation light.

* * * * *